Fig. 1 GENERAL METHOD STEPS

INVENTORS
WILLIAM F. GALEY
JOSEPH A. GULOTTA
FORREST K. UMBEL
by: Wolfe, Hubbard, Voit & Osann
ATTYS.

LENGTH AND AREA PARTITIONING METHODS AND APPARATUS

Filed Nov. 2, 1959 28 Sheets-Sheet 2

EXAMPLE OF DEFECT PATTERN

| DEFECT | Z | S |
|---|---|---|
| a | 6 | 22 |
| b | 8 | 47 |
| c | 25 | 17 |
| d | 25 | 43 |
| | 26 | 43 |
| | 26 | 42 |
| | 27 | 42 |
| | 28 | 42 |
| | 28 | 41 |
| | 29 | 41 |
| | 29 | 40 |
| | 30 | 40 |
| | 30 | 39 |
| | 31 | 39 |
| | 31 | 38 |
| e | 33 | 53 |
| f | 44 | 35 |
| g | 45 | 36 |

PROGRAMMED SIZES

| SIZE | Z | S | S RANK PER Z | Z X S VALUE |
|---|---|---|---|---|
| 9×6 | 9 | 6 | 2 | 6 |
| 9×8 | | 8 | 1 | 8 |
| 20×10 | 20 | 10 | 3 | 10 |
| 20×11 | | 11 | 2 | 11 |
| 20×13 | | 13 | 1 | 13 |
| 35×7 | 35 | 7 | 3 | 7 |
| 35×15 | | 15 | 2 | 15 |
| 35×29 | | 29 | 1 | 29 |

INVENTORS
WILLIAM F. GALEY
JOSEPH A. GULOTTA
FORREST K. UMBEL by: Wolfe, Hubbard, Voit & Osann ATTYS.

Fig. 2C FIRST CUT FROM LEADING EDGE
| TRIAL NO. | TRIAL Z | TRIAL S | AVAILABLE WIDTHS LARGER THAN ANY S | S FITS | ACCUMULATED VALUE | CHOSEN TRIAL |
|---|---|---|---|---|---|---|
| 1 | 35 | 7,15,29 | 16<br>15<br>9 | 1(15)<br>1(15)<br>1(7) | 37 | |
| 2 | 20 | 13,11,10 | 21<br>24<br>15 | 1(11),1(10)<br>1(13),1(11)<br>1(13) | 58 | ✓ |
| 3 | 9 | 8,6 | 21<br>24<br>15 | 3(6)<br>3(8)<br>1(8),1(6) | 56 | |
Fig. 2D TRIAL Z CUT (1)
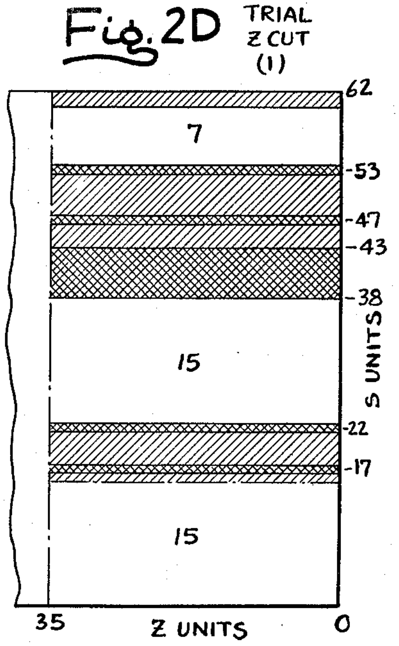
Fig. 2E TRIAL Z CUT (2) (CHOSEN)
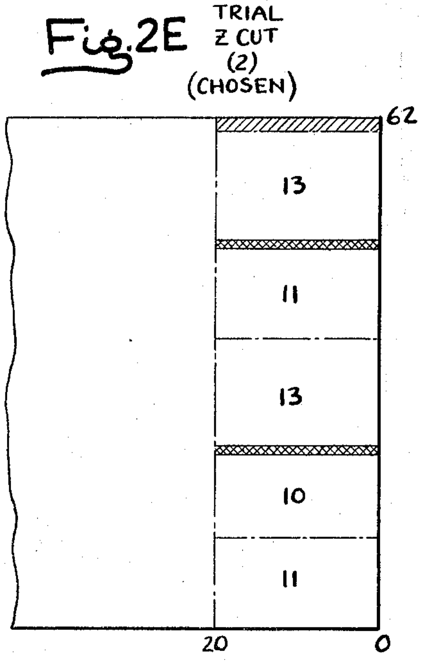
Fig. 2F TRIAL Z CUT (3)
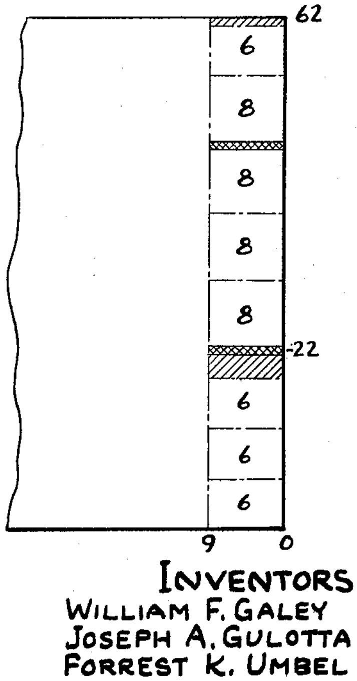
INVENTORS
WILLIAM F. GALEY
JOSEPH A. GULOTTA
FORREST K. UMBEL
by: Wolfe, Hubbard, Voit & Osann ATTYS GENERAL PARTITIONING
of $A = n_1a_1 + n_2a_2 + n_3a_3 + \cdots n_n a_n$
FOR $A = 20$
$a_i = 3, 5, 8, 12$ SELECTIVE PARTITIONING
of $A = n_1a_1 + n_2a_2 + n_3a_3 \cdots n_n a_n$
FOR $A = 12$ TO 2 INCLUSIVE
$a_i = 2, 3, 4$
$a_i$ RANK = 4, 3, 2

INVENTORS
WILLIAM F. GALEY
JOSEPH A. GULOTTA
FORREST K. UMBEL
by: Wolfe, Hubbard, Voit & Osann ATTYS

LENGTH AND AREA PARTITIONING METHODS AND APPARATUS

Filed Nov. 2, 1959

INVENTORS
WILLIAM F. GALEY
JOSEPH A. GULOTTA
FORREST K. UMBEL
by: Wolfe, Hubbard, Voit & Osann
ATTYS.

LENGTH AND AREA PARTITIONING METHODS AND APPARATUS

Filed Nov. 2, 1959 28 Sheets-Sheet 6

INVENTORS
WILLIAM F. GALEY
JOSEPH A. GULOTTA
FORREST K. UMBEL by: Wolfe, Hubbard, Voit & Osann ATTYS.

INVENTORS
WILLIAM F. GALEY
JOSEPH A. GULOTTA
FORREST K. UMBEL
by:
Wolfe, Hubbard, Voit & Osann ATTYS.

INVENTORS
WILLIAM F. GALEY
JOSEPH A. GULOTTA
FORREST K. UMBEL
by: Wolfe, Hubbard, Voit & Osann ATTYS.

INVENTORS
WILLIAM F. GALEY
JOSEPH A. GULOTTA
FORREST K. UMBEL
by:
Wolfe, Hubbard, Voit & Osann ATTYS.

INVENTORS
WILLIAM F. GALEY
JOSEPH A. GULOTTA
FORREST K. UMBEL
by:
Wolfe, Hubbard, Voit & Osann ATTYS.

INVENTORS
WILLIAM F. GALEY
JOSEPH A. GULOTTA
FORREST K. UMBEL
by: Wolfe, Hubbard, Voit & Osann ATTYS

INVENTORS
WILLIAM F. GALEY
JOSEPH A. GULOTTA
FORREST K. UMBEL by:

Wolfe, Hubbard, Voit & Osann ATTYS.

LENGTH AND AREA PARTITIONING METHODS AND APPARATUS
Filed Nov. 2, 1959 
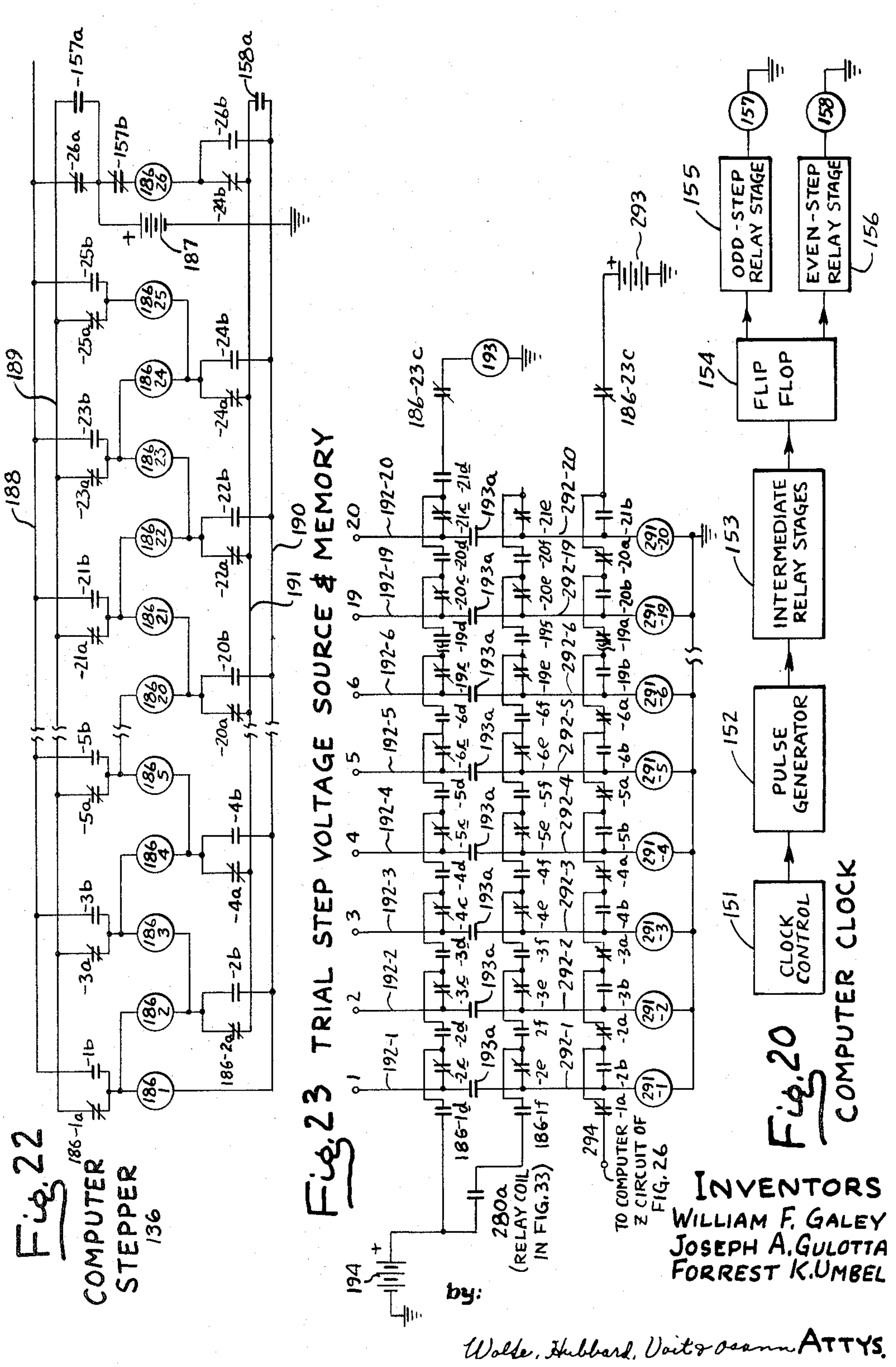
Fig. 22 COMPUTER STEPPER 136, Fig. 23 TRIAL STEP VOLTAGE SOURCE & MEMORY, Fig. 20 COMPUTER CLOCK
INVENTORS
WILLIAM F. GALEY
JOSEPH A. GULOTTA
FORREST K. UMBEL
by: Wolfe, Hubbard, Voit & Osann ATTYS.

LENGTH AND AREA PARTITIONING METHODS AND APPARATUS
Fig. 21A AUXILIARY TIMING
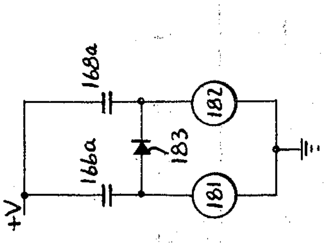
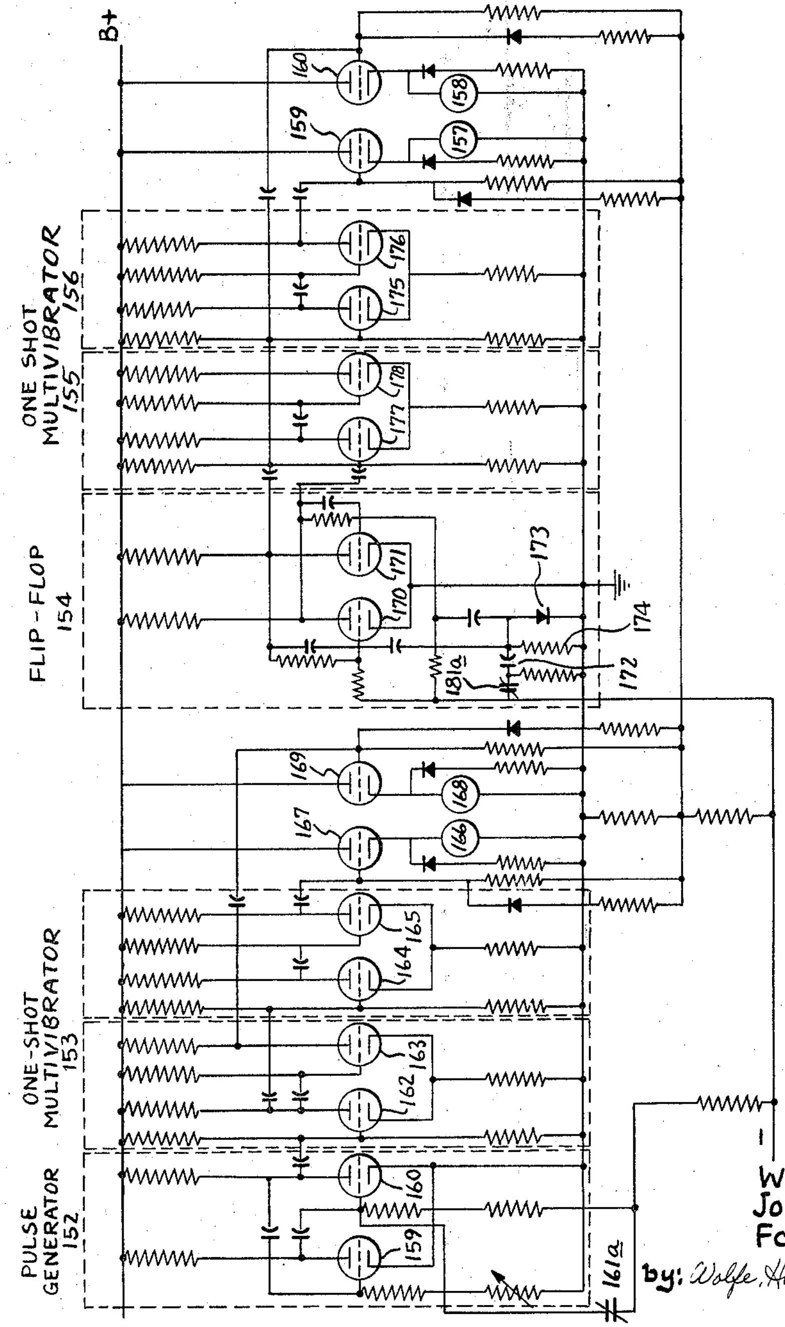
Fig. 21 COMPUTER CLOCK
INVENTORS
WILLIAM F. GALEY
JOSEPH A. GULOTTA
FORREST K. UMBEL
by: Wolfe, Hubbard, Voit & Osann
ATTYS.

Fig. 24 COMPUTER SIZE PROGRAM PANELS
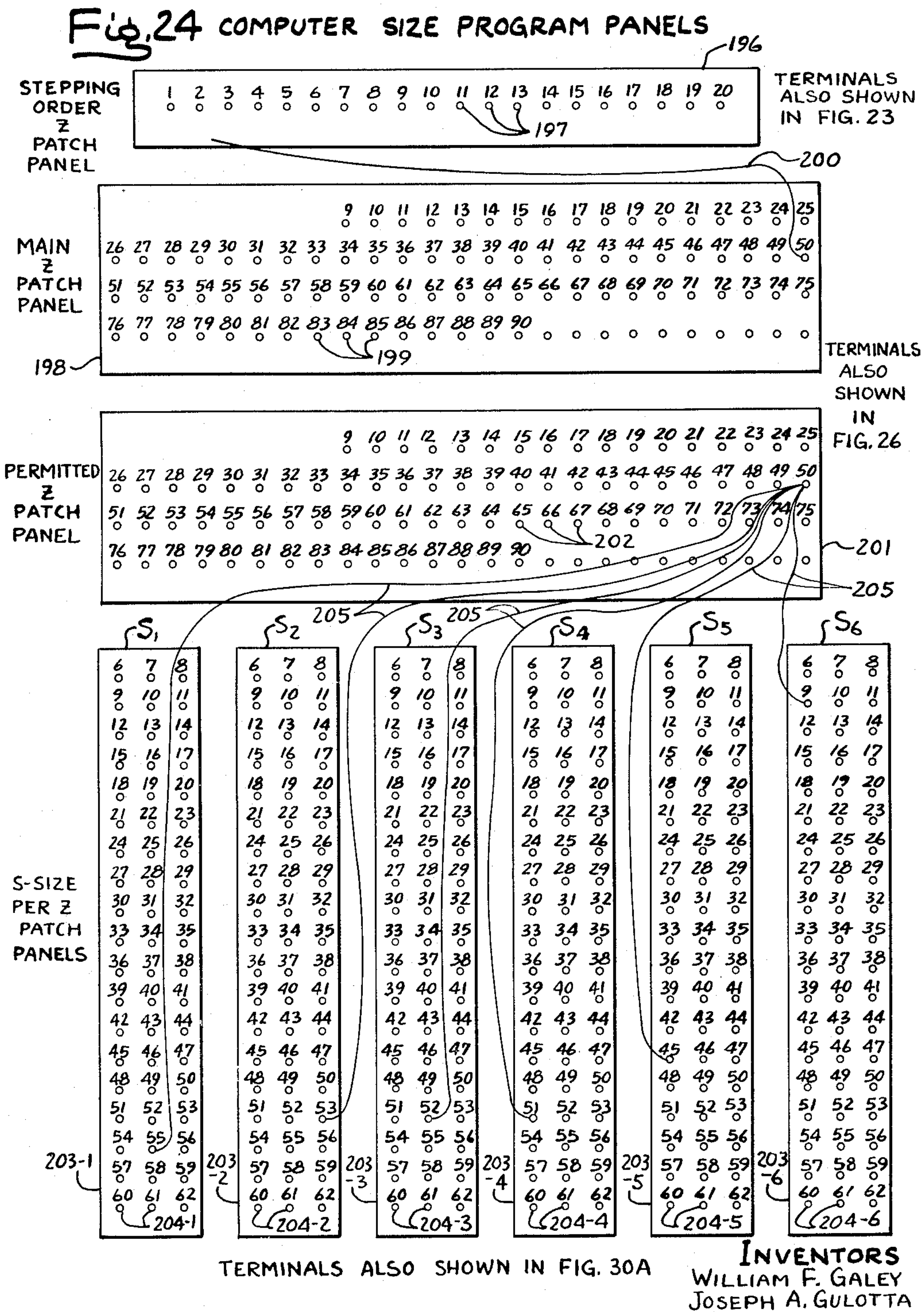
TERMINALS ALSO SHOWN IN FIG. 30A
INVENTORS
WILLIAM F. GALEY
JOSEPH A. GULOTTA
FORREST K. UMBEL
by: Wolfe, Hubbard, Voit & Osann ATTYS.

LENGTH AND AREA PARTITIONING METHODS AND APPARATUS

Filed Nov. 2, 1959 28 Sheets-Sheet 16

INVENTORS
WILLIAM F. GALEY
JOSEPH A. GULOTTA
FORREST K. UMBEL by:

ATTYS.

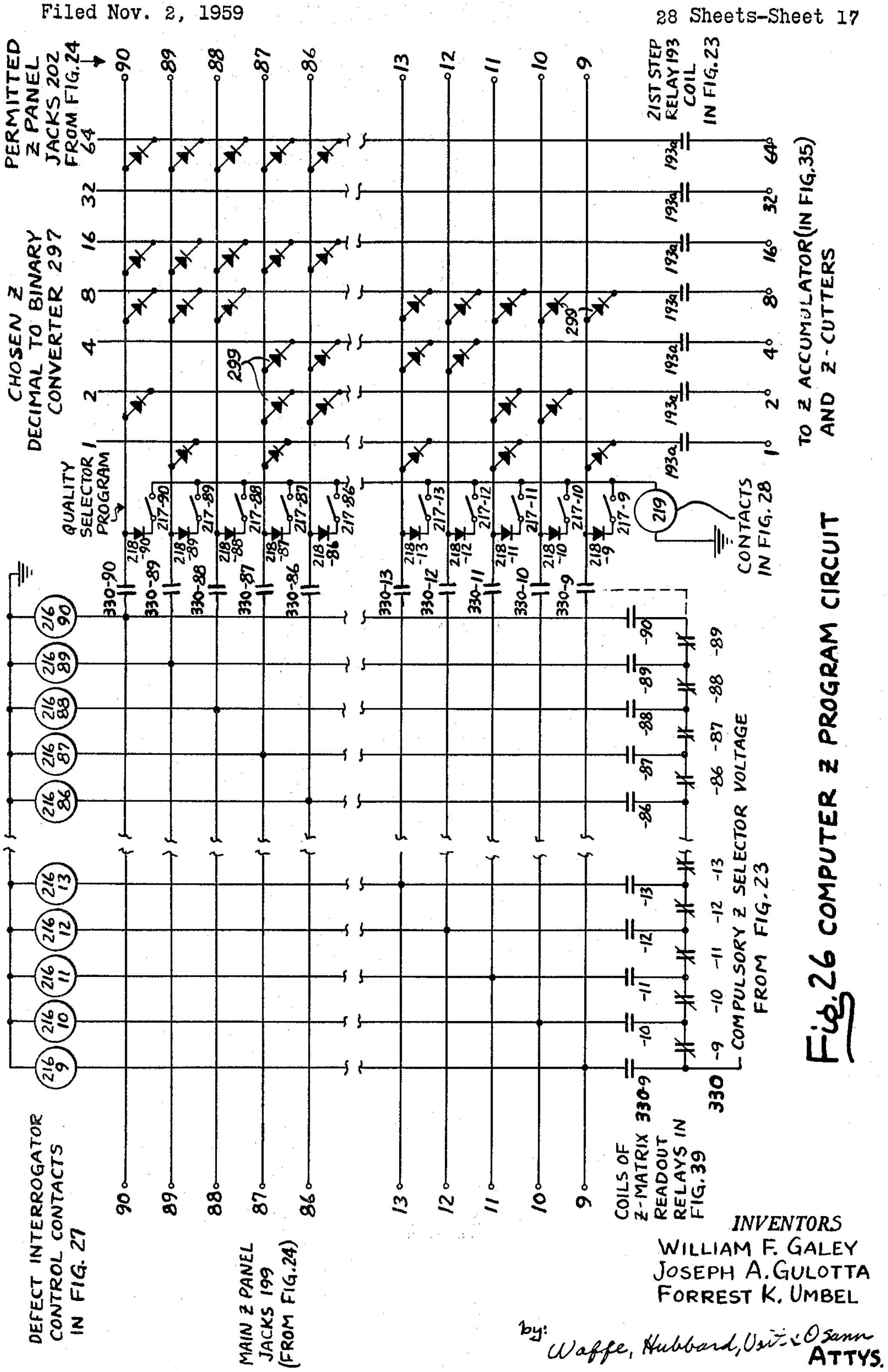
Fig. 26 COMPUTER Z PROGRAM CIRCUIT
INVENTORS
WILLIAM F. GALEY
JOSEPH A. GULOTTA
FORREST K. UMBEL
by: Wolfe, Hubbard, Voit & Osann
ATTYS.

Fig. 27 COMPUTER DEFECT STORAGE
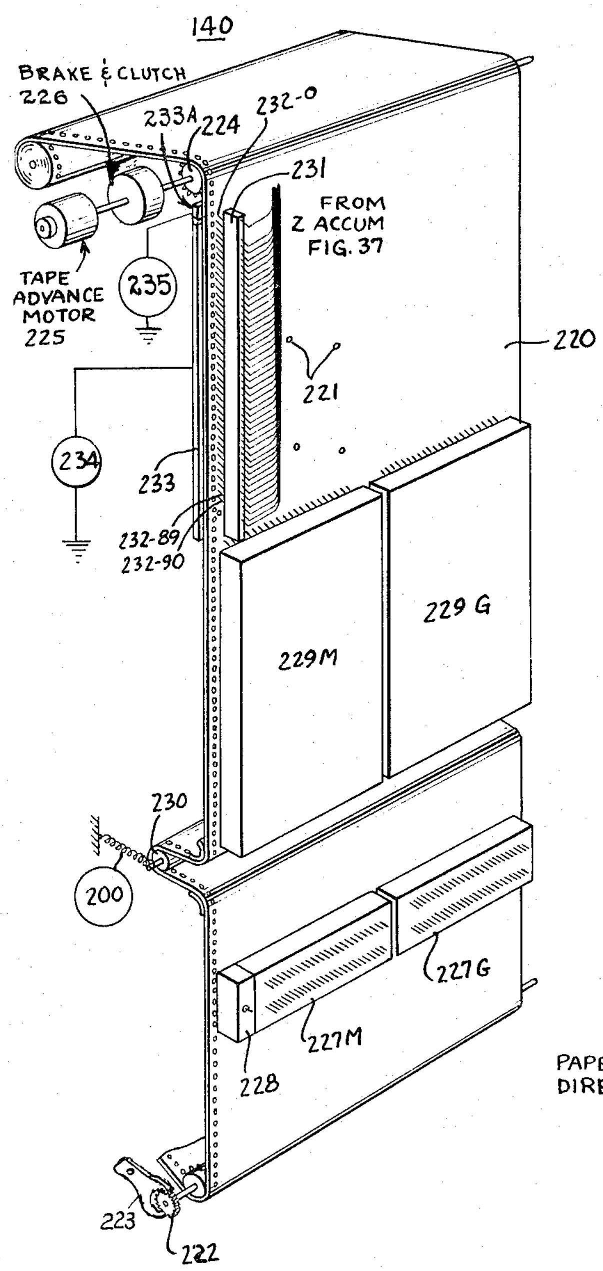
Fig. 38
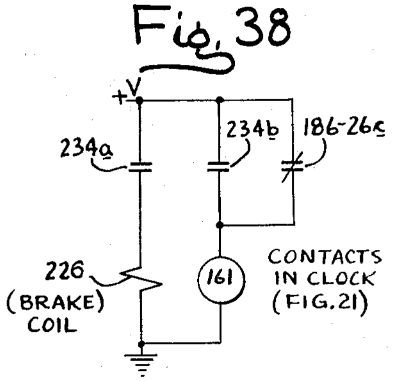
Fig. 29
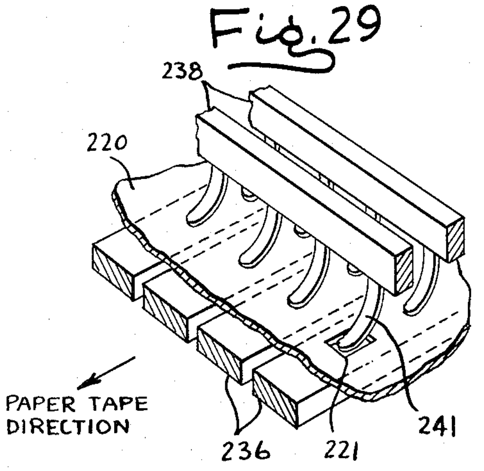
INVENTORS
WILLIAM F. GALEY
JOSEPH A. GULOTTA
FORREST K. UMBEL
by: Wolfe, Hubbard, Voit & Osann
ATTYS.

LENGTH AND AREA PARTITIONING METHODS AND APPARATUS
Fig. 28 COMPUTER DEFECT INTERROGATOR
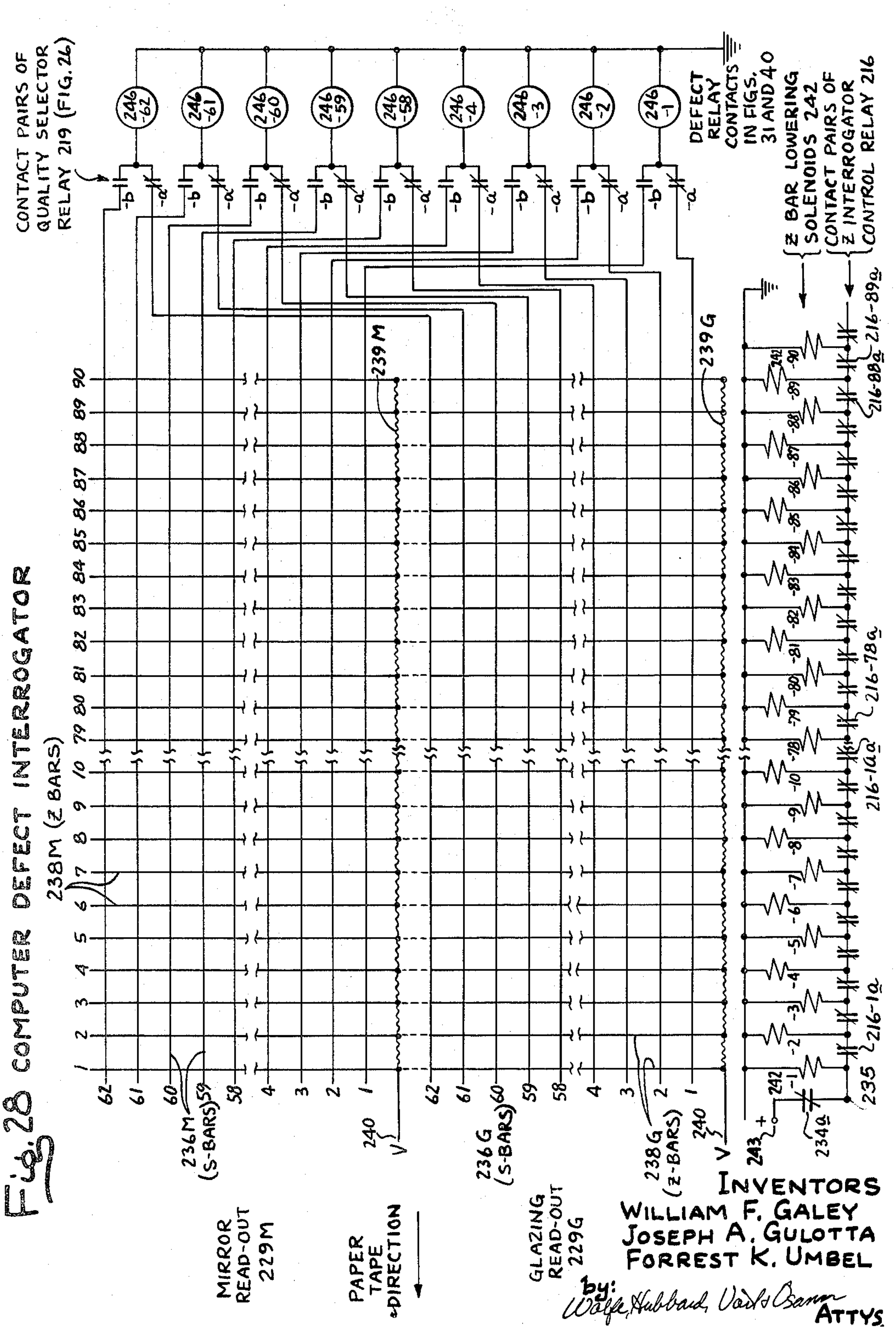
INVENTORS
WILLIAM F. GALEY
JOSEPH A. GULOTTA
FORREST K. UMBEL
by: Wolfe, Hubbard, Voit & Osann
ATTYS.

LENGTH AND AREA PARTITIONING METHODS AND APPARATUS

INVENTORS
WILLIAM F. GALEY
JOSEPH A. GULOTTA
FORREST K. UMBEL
by Wolfe, Hubbard, Voit & Osann
ATTYS.

April 19, 1966 W. F. GALEY ETAL 3,246,550

LENGTH AND AREA PARTITIONING METHODS AND APPARATUS

Filed Nov. 2, 1959 28 Sheets-Sheet 21

INVENTORS
WILLIAM F. GALEY
JOSEPH A. GULOTTA
FORREST K. UMBEL
by: Wolfe, Hubbard, Voit & Osann
ATTYS.

INVENTORS
WILLIAM F. GALEY
JOSEPH A. GULOTTA
FORREST K. UMBEL
by: Wolfe, Hubbard, Voit & Osann
ATTYS

LENGTH AND AREA PARTITIONING METHODS AND APPARATUS

Filed Nov. 2, 1959 28 Sheets-Sheet 23

Fig. 33 COMPUTER VALUE ADDER & COMPARISON

INVENTORS
WILLIAM F. GALEY
JOSEPH A. GULOTTA
FORREST K. UMBEL
by: Wolfe, Hubbard, Voit & Osann
ATTYS.

LENGTH AND AREA PARTITIONING METHODS AND APPARATUS

INVENTORS
WILLIAM F. GALEY
JOSEPH A. GULOTTA
FORREST K. UMBEL by: Wolfe, Hubbard, Voit & Osann ATTYS.

LENGTH AND AREA PARTITIONING METHODS AND APPARATUS
Fig. 37 - BINARY TO DECIMAL CONVERTER, Fig. 35 - COMPUTER Z-ACCUMULATOR
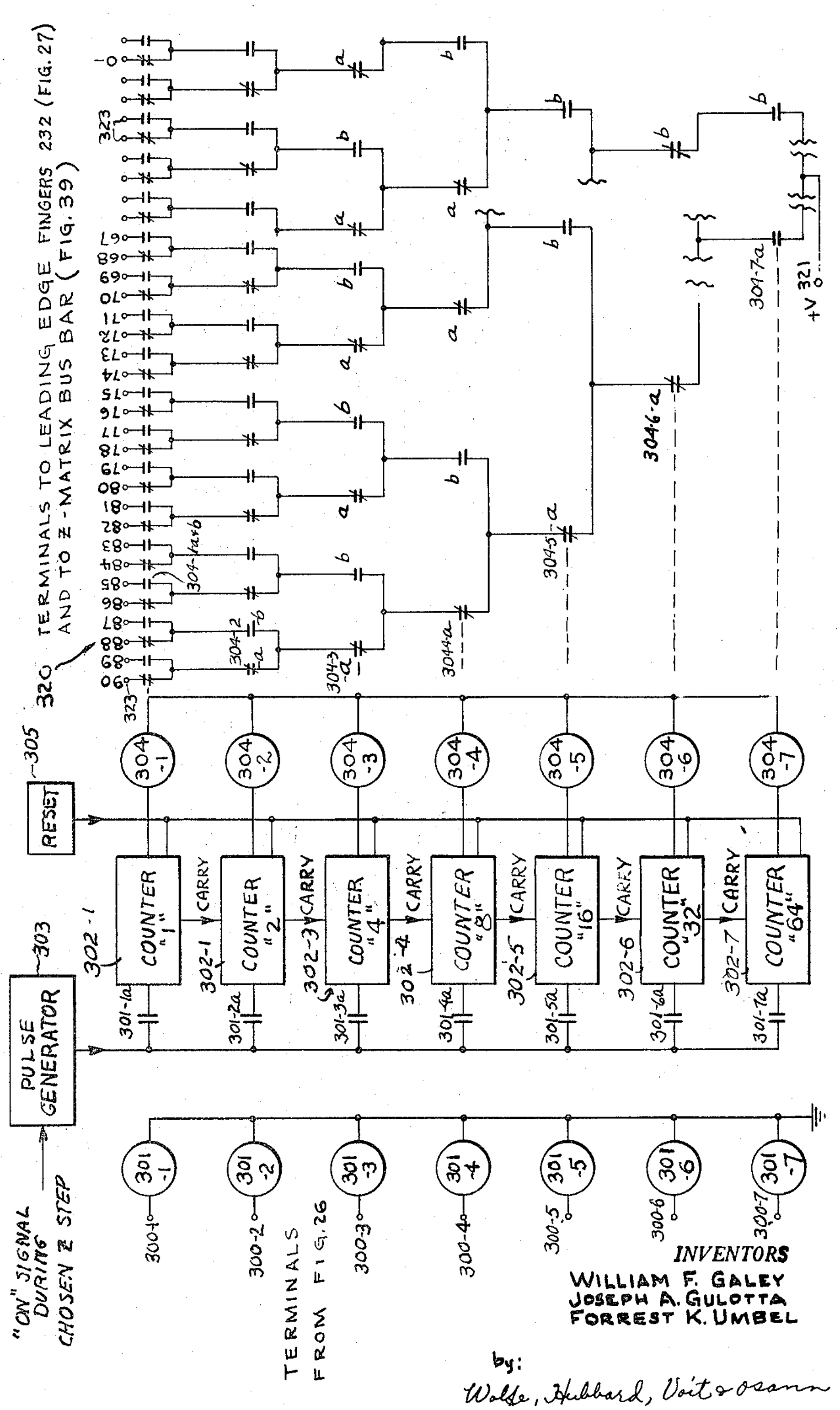
INVENTORS
WILLIAM F. GALEY
JOSEPH A. GULOTTA
FORREST K. UMBEL
by:
Wolfe, Hubbard, Voit & Osann

ACCUMULATOR CIRCUIT

INVENTORS
WILLIAM F. GALEY
JOSEPH A. GULOTTA
FORREST K. UMBEL
by:
Wolfe, Hubbard, Voit & Osann April 19, 1966 W. F. GALEY ETAL 3,246,550

LENGTH AND AREA PARTITIONING METHODS AND APPARATUS

Filed Nov. 2, 1959 28 Sheets-Sheet 27

INVENTORS
WILLIAM F. GALEY
JOSEPH A. GULOTTA
FORREST K. UMBEL
by Wolfe, Hubbard, Voit & Osann
ATTYS.

LENGTH AND AREA PARTITIONING METHODS AND APPARATUS

Filed Nov. 2, 1959 28 Sheets-Sheet 28

INVENTORS
WILLIAM F. GALEY
JOSEPH A. GULOTTA
FORREST K. UMBEL

United States Patent Office 3,246,550 Patented Apr. 19, 1966

3,246,550

LENGTH AND AREA PARTITIONING METHODS AND APPARATUS

William F. Galey, Saxonburg, Joseph A. Gulotta, New Kensington, and Forrest K. Umbel, Verona, Pa., assignors to Pittsburgh Plate Glass Company, Allegheny County, Pa., a corporation of Pennsylvania Filed Nov. 2, 1959, Ser. No. 850,360
19 Claims. (Cl. 83—56)

This invention relates to the fitting of given lengths or areas into given total lengths or areas, typically in terms of partitioning sheet material having random defect areas into predetermined defect-free sizes. It has particular reference to cutting plate glass into saleable sizes after inspection in a continuous glass manufacturing process.

Plate glass, as a sheet material, is presented for inspection after it has been ground, polished and washed, and prior to cutting it into various marketable sizes. The glass is subject to defects of various types and unpredictable size and location which may make cut sheets containing the defect areas totally unusable or which may affect the quality grading of saleable sheets. In fitting or piecing out different combinations of the various sizes from the usable areas it is desired, of course, to throw away or downgrade as little as is necessary of the glass which is free of defects of a severity affecting the glass grade being cut. Time and timing are always of concern since the operation is an adjunct of high production manufacture in which glass of given width, either as large separate sheets, or sometimes as an unbroken ribbon, moves at a continuous rate as it is formed and finished.

Efficiency goals in laying out the grade-defined defect-free area of the total glass output into usable sizes have in fact been limited by the number of factors which skilled layout men have found it practical to consider. The possible factors are many. For example, a large number of predetermined sizes are marketable and more than one saleable grade may also be involved. Inspection is required for the total output since the defect distribution is not predictable. Relative preference or demand for the various sizes may also be factors. The demand for particular sizes may change in accordance with the quantities which have already been cut. Obviously, the number of choices of possible glass sizes which must be evaluated before a cut is made is very large if all of the factors or choices are considered.

Human judgment under such conditions is often intuitive at best, making it at least difficult, and always more expensive, to reach decisions quicker by multiplying manpower. Yet complex problems usually require time for their full solution, and the economies of manufacture make the cost of the time involved part of the definition of the least wasteful cutting decision. In the interests of reducing storage and handling of the glass produced before shipping, close control of elapsed time is also involved. Desirably the sequence of inspection for defects, the presentation of all the relevant data, the making of economic cutting decisions, the actual cutting, and the routing of the cut glass sizes to respective packing stations, is an essentially on-line procedure. The present invention makes this possible.

It is, therefore, a principal object of the invention to provide methods and apparatus for making intelligently the decisions involved in cutting a large sheet into desired smaller sizes. Stated in another way, it is an object of the invention to provide methods and apparatus for correlating all supplied data on specific defect locations in a sheet to be cut on the one hand, and on desired sizes on the other hand, to reach timely, systematic, and economic cutting decisions without resort to human judgment. Another object is to provide a method and means for systematically employing defect location data and trial dimensions in laying out defect-free rectangles.

It is an object to provide a computer for automatically relating defect data and demand in reaching cutting decisions for sheet material such as plate glass.

It is also an object to provide computer circuits for quickly and reliably determining choices available and selecting the best choice according to a programmed logic. Further, it is an object to provide a computer which is readily incorporated on a continuous glass production line.

Other objects include provision of methods and apparatus for converting the output of a plate glass factory into saleable glass sizes of maximum value or with minimum waste. It is also an objective to provide automatic means for determining both length and area partitions of any total length or area. A further objective is to provide apparatus for partitioning sheet glass which is relatively fast, simple, and inexpensive.

Summarizing, it is an objective to simultaneously remove defects, meet quantity and size demands, and reduce waste all within the bounds of new but economically available technology.

In addition to the partitioning of glass or other sheet materials, it will be appreciated that the lengths or area quantities are represented generally by integers to be partitioned into combinations of numbers representing members of a set of partitioning element numbers.

It is therefore a general object to provide methods and apparatus for partitioning.

Further, it is an object to provide means for determining either general or selective integral partitions for any integral quantity.

It is another object to provide digitally exact partitioning without resort to binary arithmetic systems.

It is also an object to provide means for computing partitions without requiring read-out of previously stored solutions.

In terms of computer apparatus, it is a further object to provide partitioning computers having logic circuits minimizing storage and programming of arithmetic steps. It is also an object to provide a computer apparatus operable at reasonable speeds with relatively simple and inexpensive electromagnetic switch components.

Other features, objects and advantages of the invention will become apparent from the following detailed description illustrated in the accompanying drawings in which:

FIGURE 1 outlines the steps of a two-cut logic in piecing out sheet material in accordance with the invention.

FIG. 2C is a table illustrating the trial partitions of the sheet of FIG. 2 leading to choice of a particular set of cutting commands according to the programmed sizes of FIG. 2B.

FIGS. 2D, 2E, and 2F graphically portray the trail partitions that establish the table of FIG. 2C.

Figure 3:
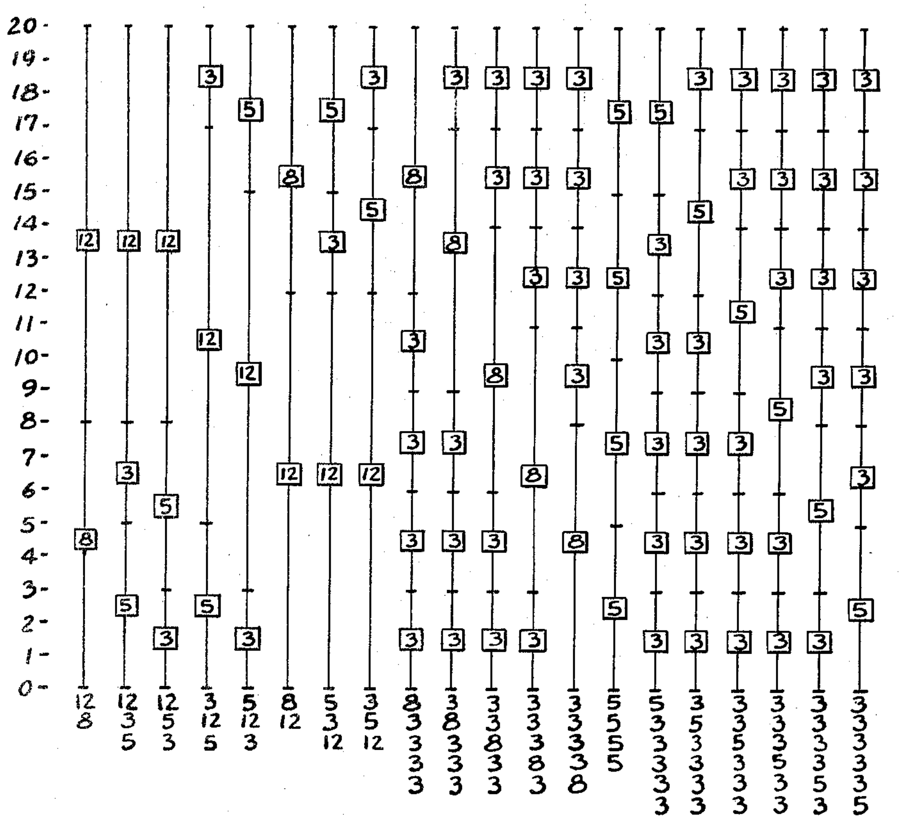

FIG. 3 is a graphical representation of a general solution to a partitioning problem.

Figure 4:
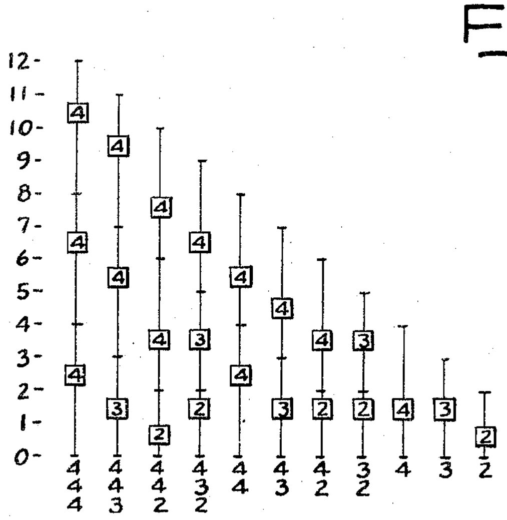

FIG. 4 is a graphical representation of a selective solution to a partitioning problem.

Figure 5:
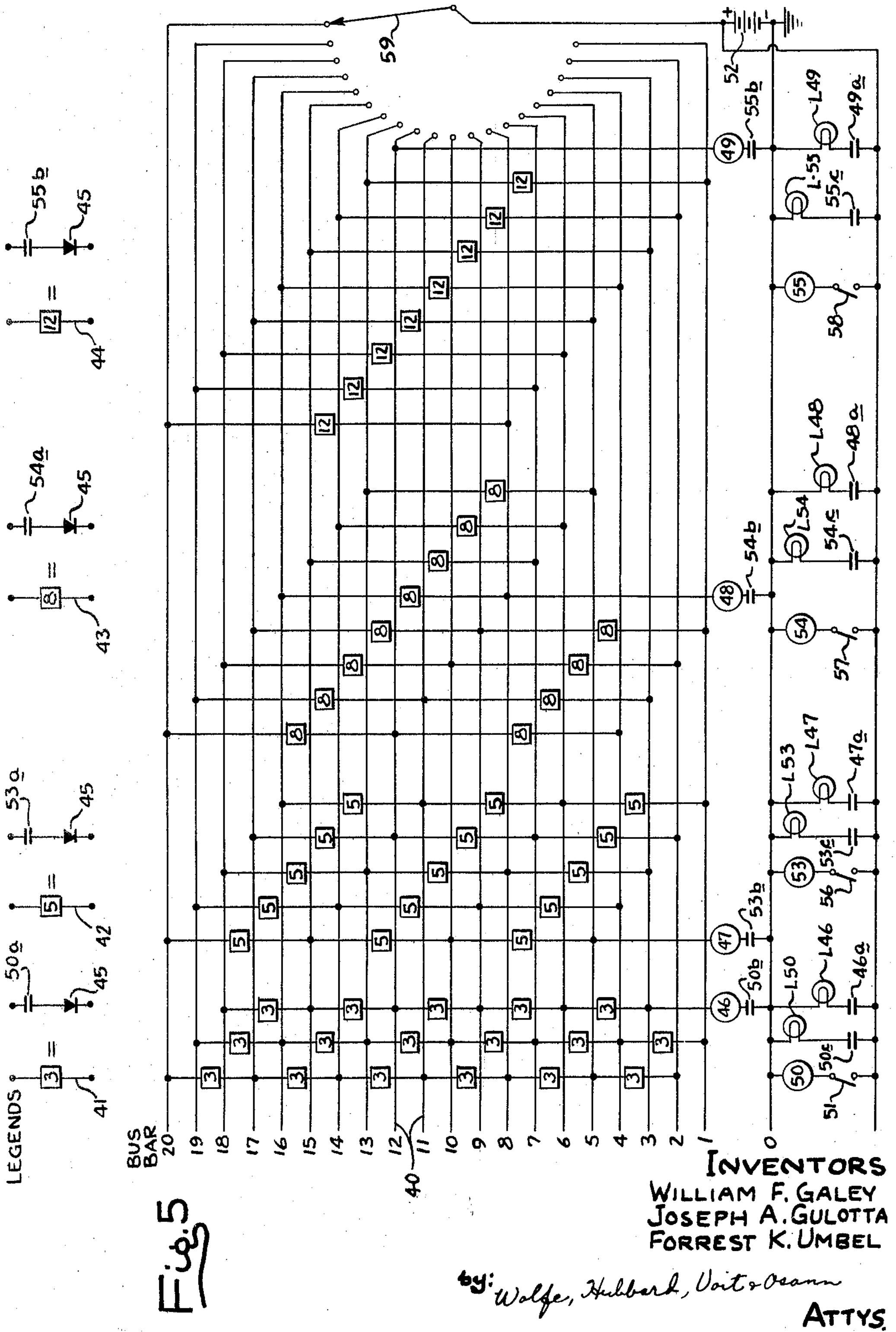

FIG. 5 illustrates an electrical permission matrix analog of the partitioning definition and example of FIG. 3.

Figure 6:
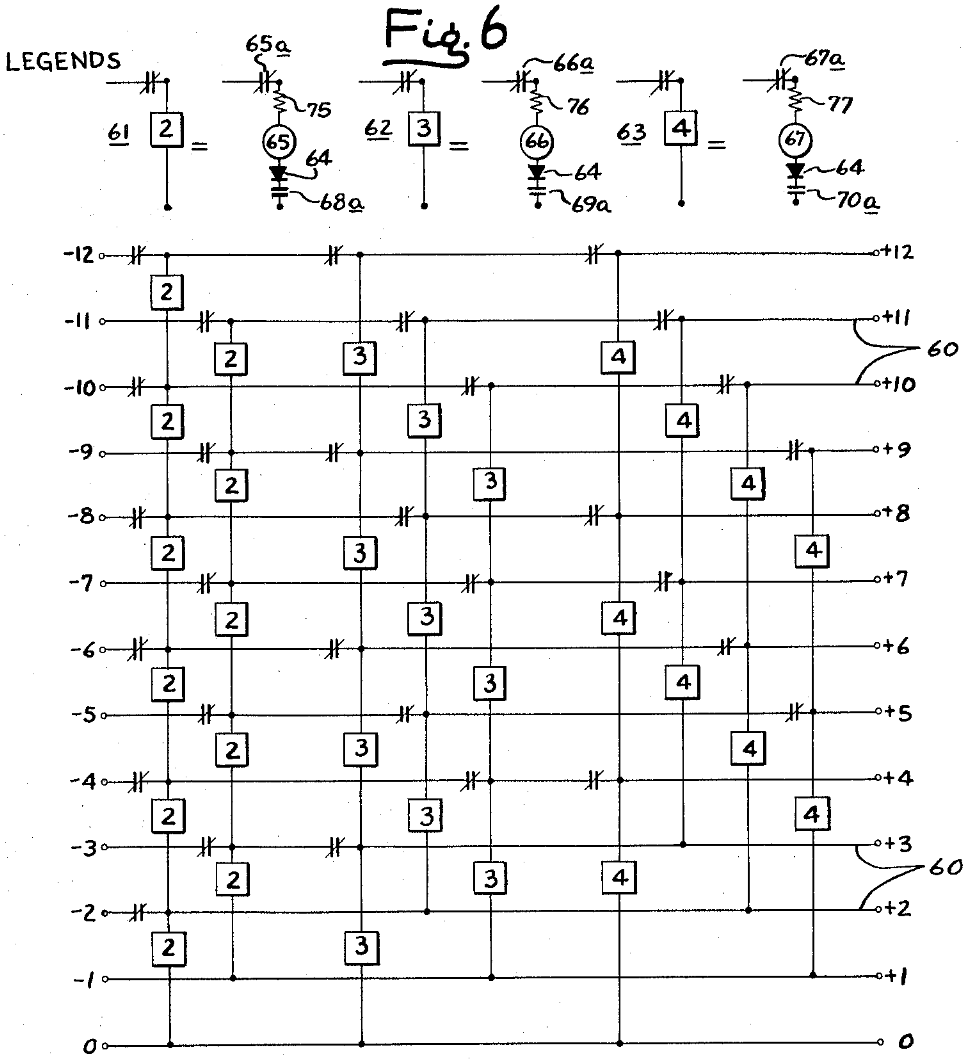

FIG. 6 illustrates an electrical command matrix analog of the selective partitioning definition example of FIG. 4.

Figure 7:
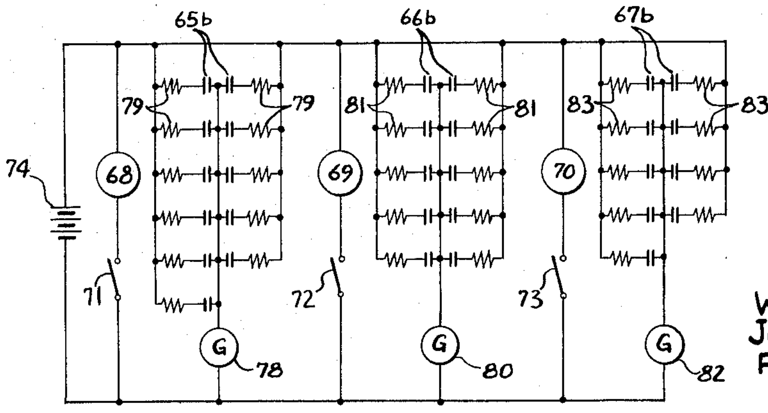

FIG. 7 is a circuit diagram of a size switch and read-out indicator circuit for the matrix of FIG. 6.

Figures 8A, 8B, 8C, 8D, 8E, 8F:
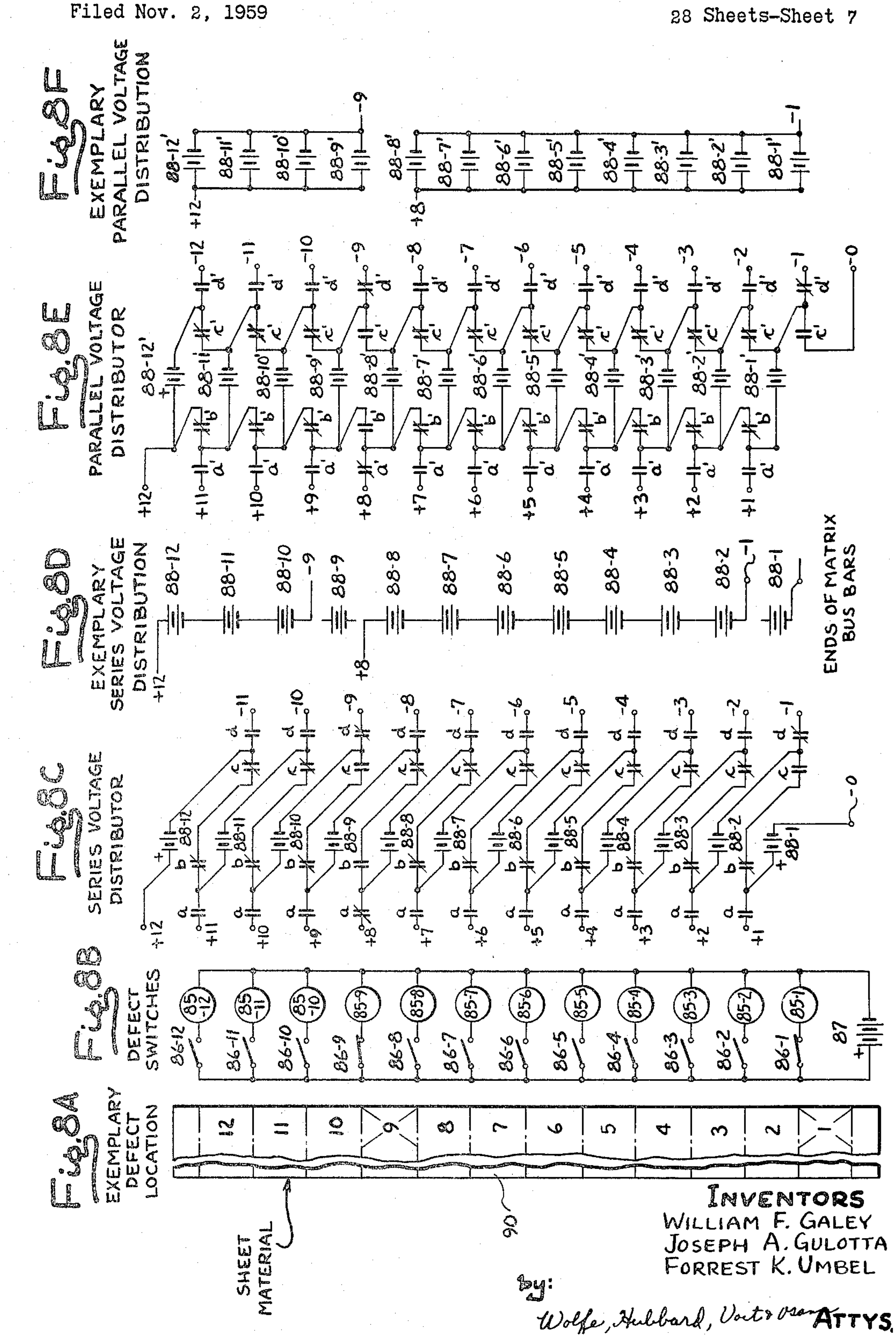

FIG. 8A represents a 12-unit length of a sheet bearing defects in the first and ninth units.

FIG. 8B is a diagram of a 12-unit defect relay circuit for reporting the defects of FIG. 8A.

FIG. 8C is a circuit diagram of a series-type voltage distributor operated by the defect relays of FIG. 8B for energizing the matrix of FIG. 6.

FIG. 8D represents the voltage connections to the matrix made by the series-type voltage distributor of FIG. 8C.

FIG. 8E is a circuit diagram of a parallel type voltage distributor operated by the defect relays of FIG. 8B for energizing the matrix of FIG. 6.

FIG. 8F represents the voltage connections to the matrix made by the voltage distributor of FIG. 8E.

Figures 9, 10, 11, 12:
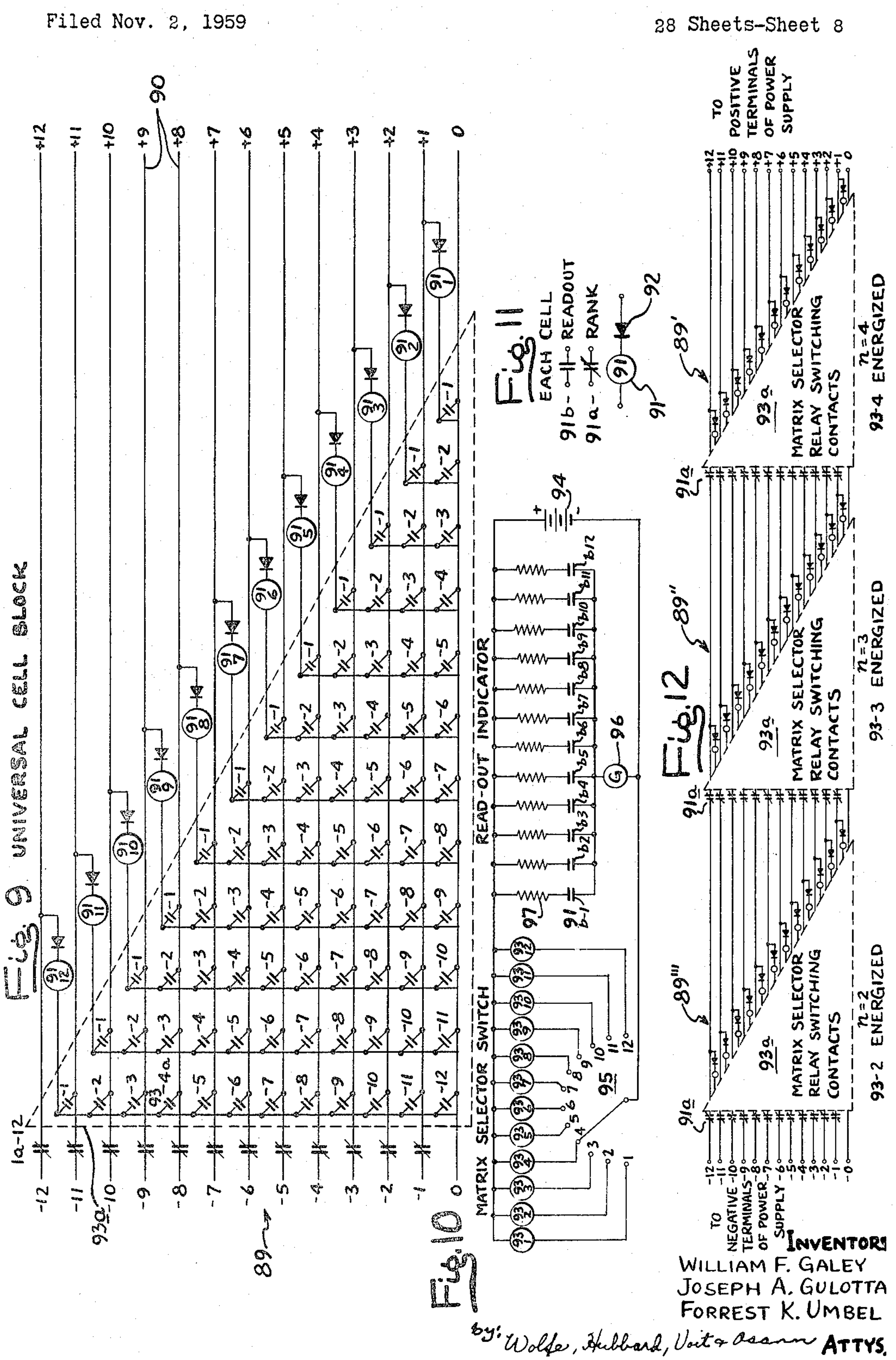

FIG. 9 is a diagram of a universal cell block in a 12-span matrix like that of FIG. 6.

FIG. 10 is a diagram of the cell size selector switch and the read-out indicator for the matrix cell block of FIG. 9.

FIG. 11 illustrates the cell relay connection of each cell in the block of FIG. 9.

FIG. 12 graphically indicates the connection of 3 universal cell blocks shown in FIG. 9 as a selective matrix for $a_1$ integers of 4, 3, and 2 in that rank.

Figure 13:
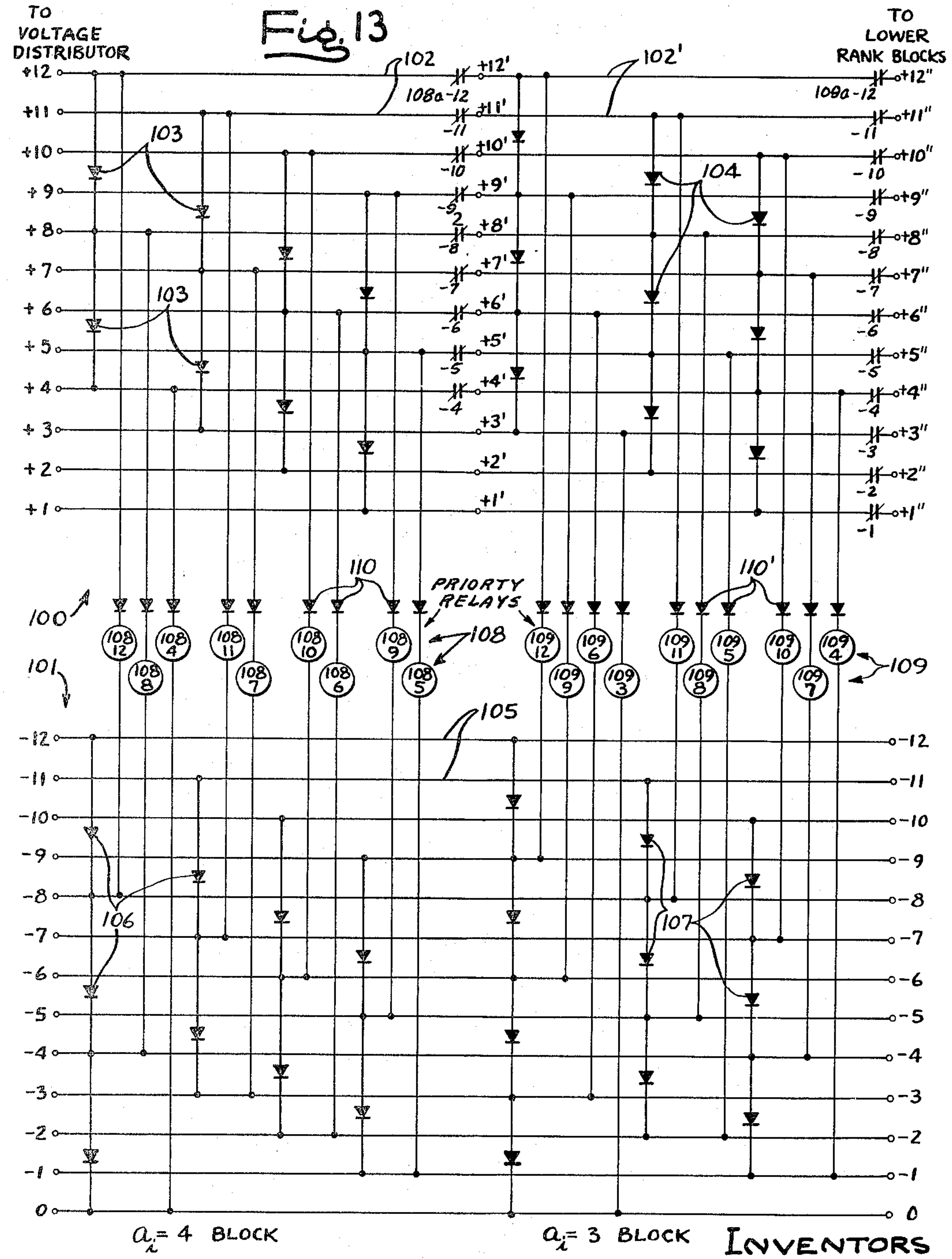

FIG. 13 illustrates the connection of two complementary cell blocks as a parallel return dual matrix for effectively applying rated coil voltage to all cell relays in partitioning current paths and with exemplary $a_1$ solutions of 4 and 3.

Figure 14:
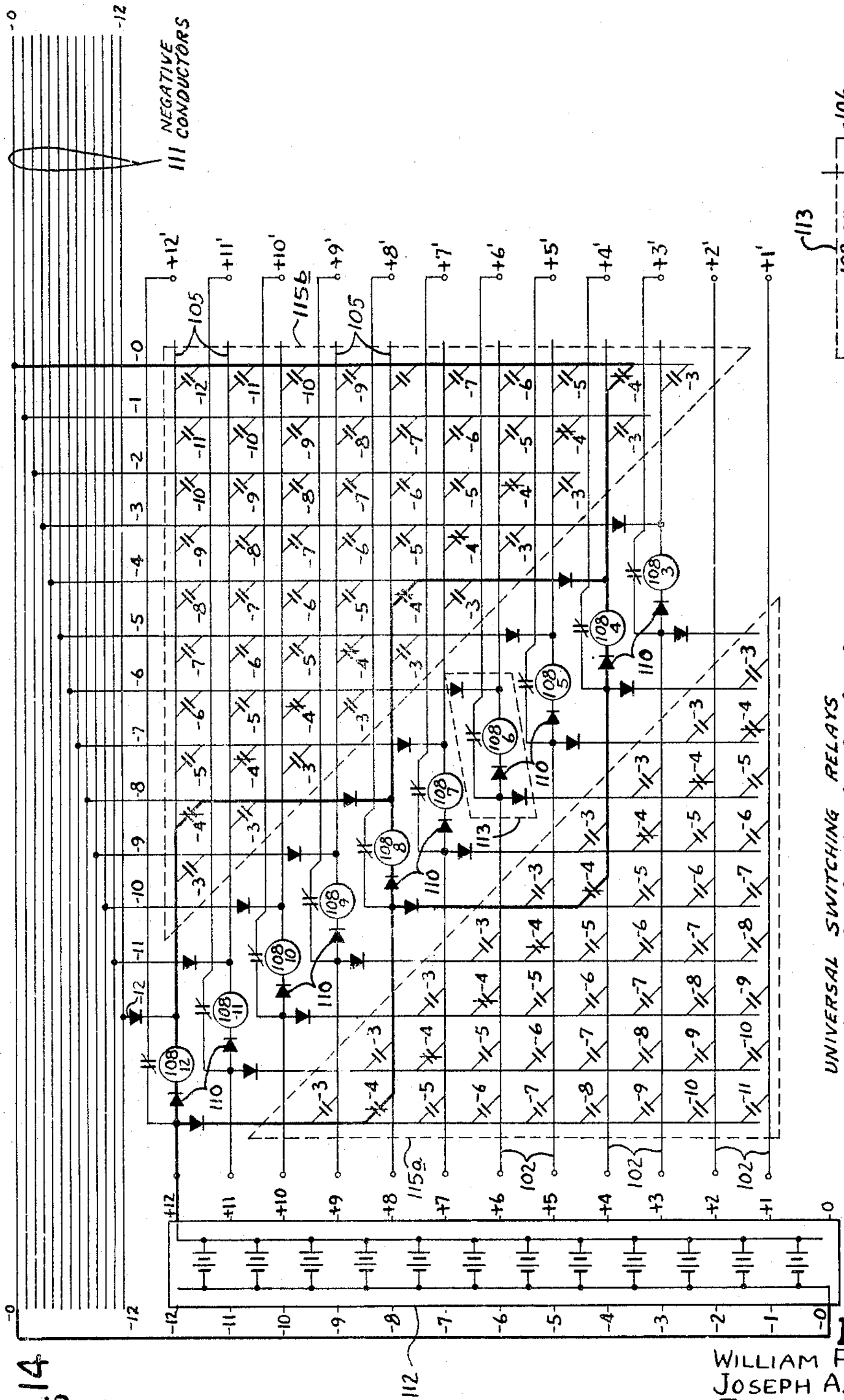

FIG. 14 illustrates a universal cell-block dual matrix as arranged for selection of integers of 3 through 12 and with an exemplary selection of $a_1=4$.

Figure 15:
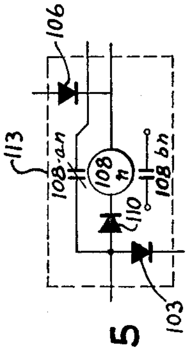

FIG. 15 illustrates one of the priority or read-out subassemblies of the FIG. 13 matrix.

Figure 16:
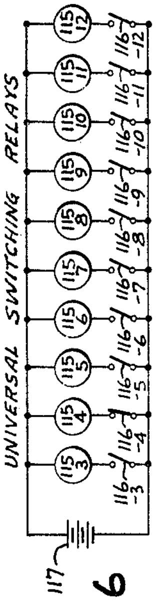

FIG. 16 illustrates a universal cell-block switch control circuit for the FIG. 14 matrix.

Figure 17:
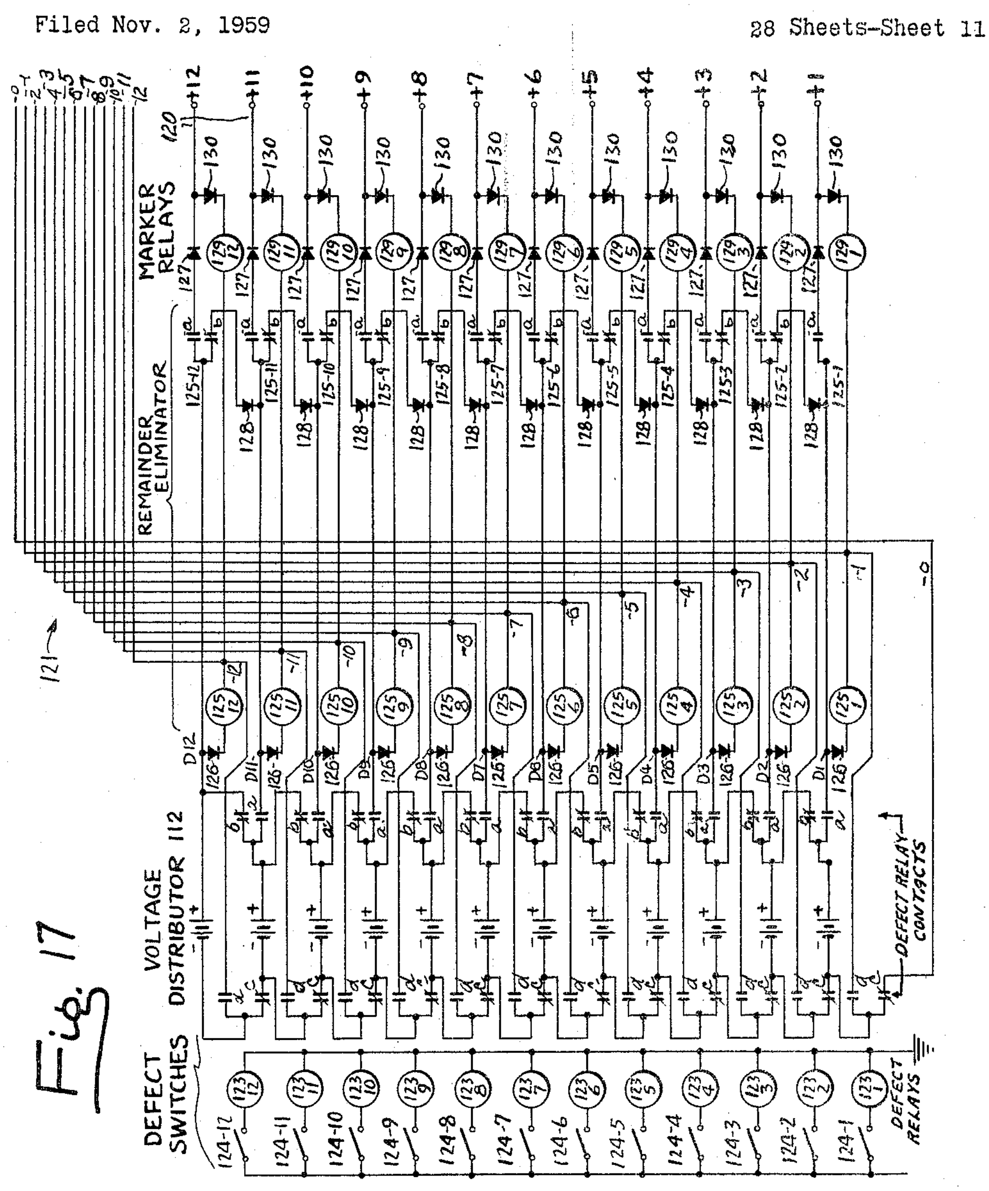

FIG. 17 represents the defect switches, voltage distributor, automatic programming, and marker circuits as incorporated in a system with the matrix of FIG. 14.

Figure 18:
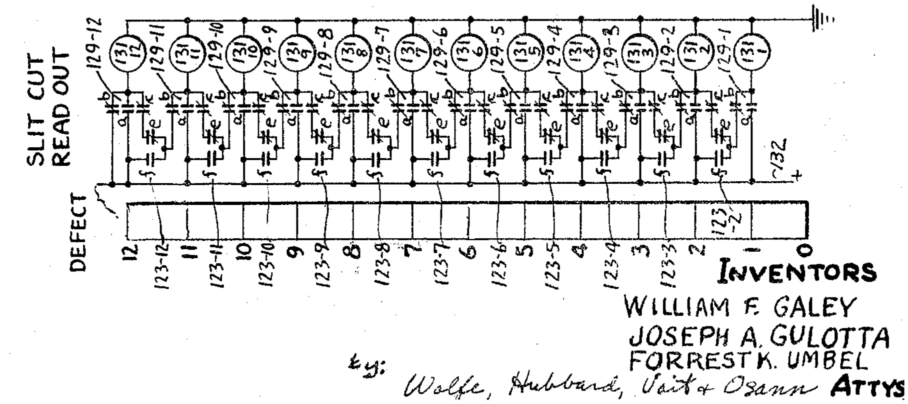

FIG. 18 illustrates automatic cutting read-out circuits operated from the defect and marker circuits of FIG. 17.

Figure 19:
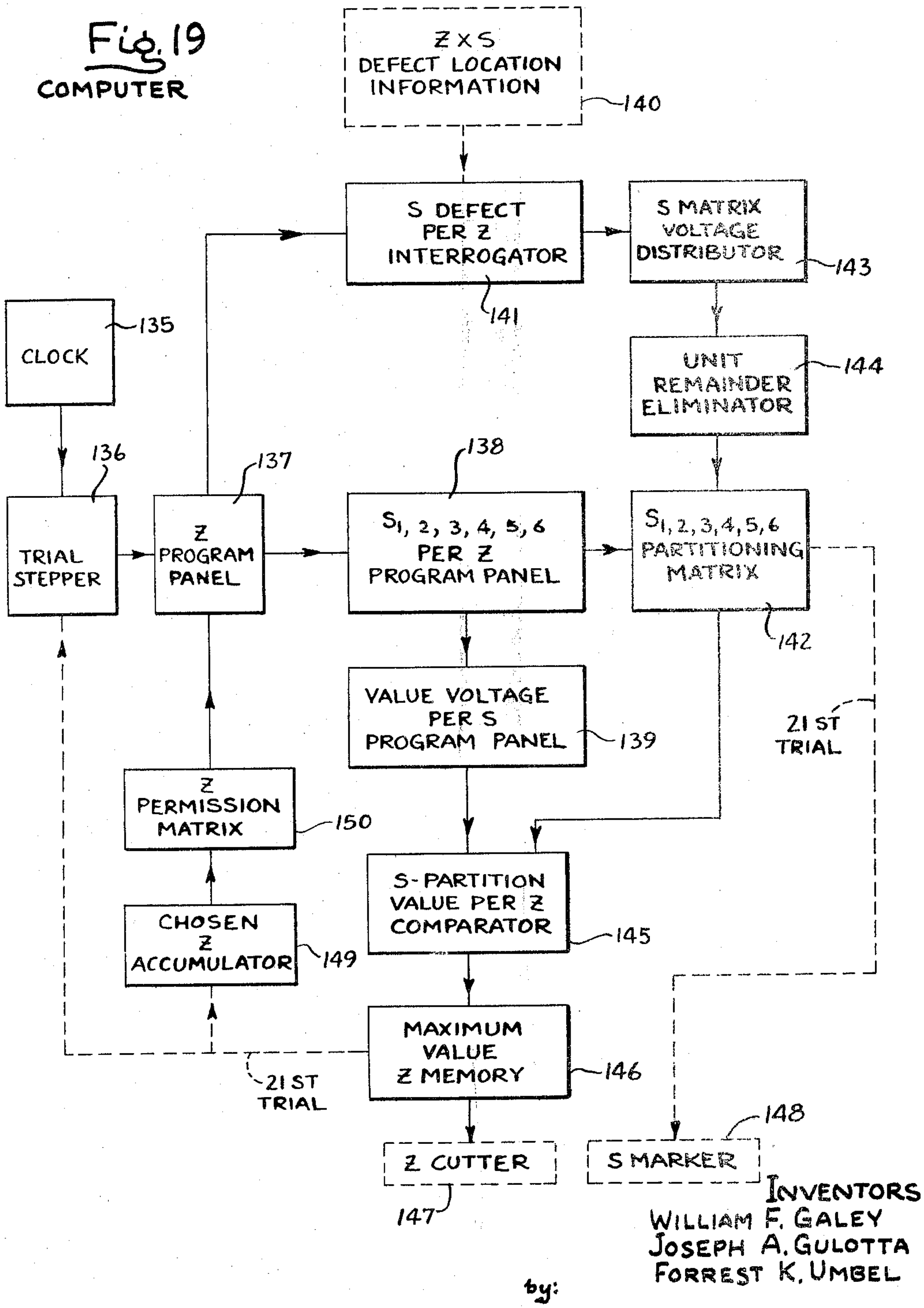

FIG. 19 is a block diagram of a glass factory area partitioning computer which is the subject of further FIGS. 20 to 40.

FIG. 20 is a block diagram of the computer timing clock.

FIG. 21 is a diagram illustrating the electronic tube circuits of the computer clock of FIG. 20.

FIG. 21A is a diagram of an auxiliary timing circuit.

FIG. 22 is a circuit diagram of the stepping system for the computer trial stepper.

FIG. 23 is a drawing of the stepped voltage and memory circuits operated by the stepper of FIG. 22.

FIG. 24 illustrates the patch panels of the computer Z x S size program.

Figure 25:
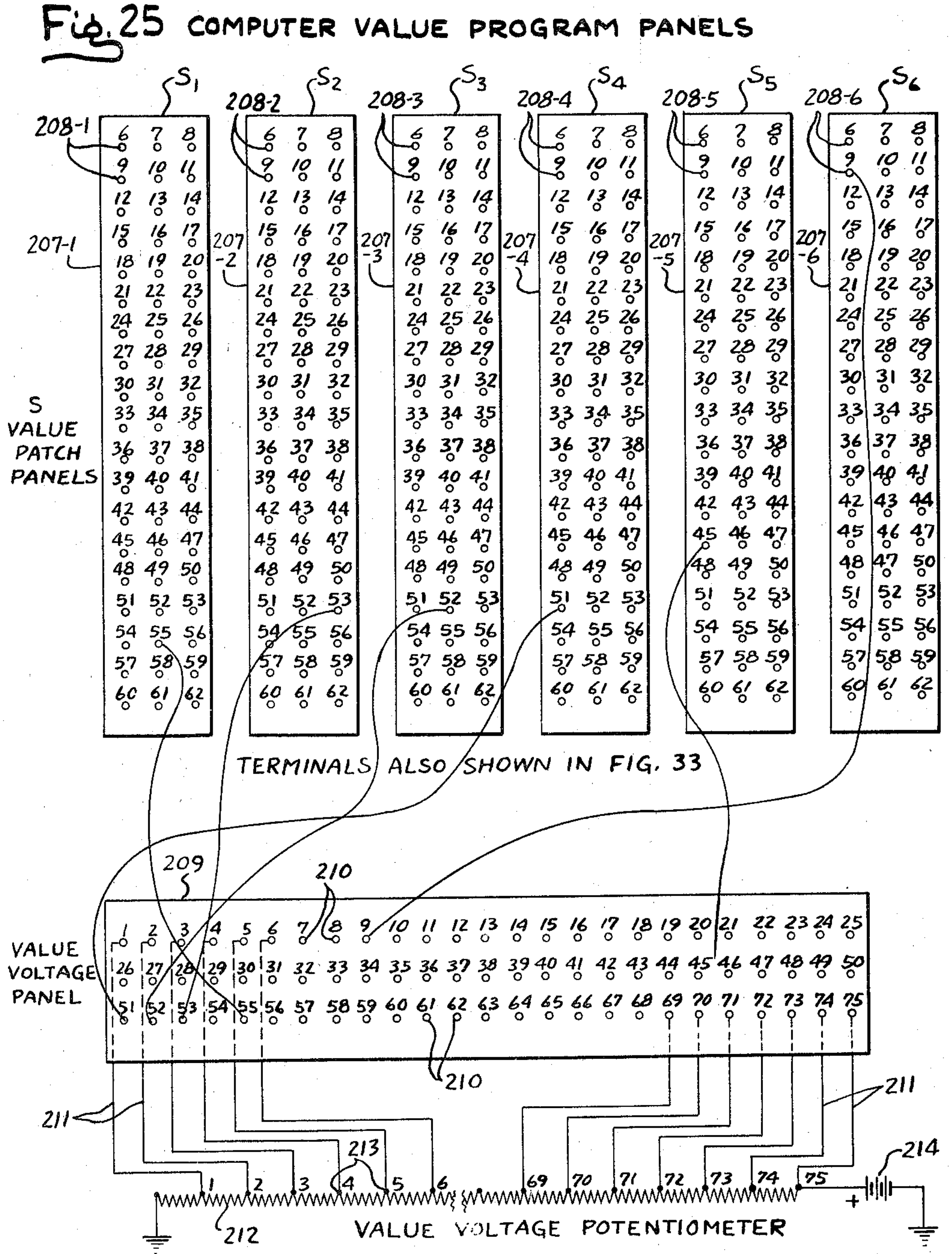

FIG. 25 illustrates the patch panels of the computer value program and associated value voltage source.

FIG. 26 is a diagram of the back-of-the-panel connections between the main Z patch panel and permitted Z patch panel of FIG. 24 showing several Z program circuits.

FIG. 27 is a schematic representation of a defect storage system and computer input synchronizing circuit suitably employed with the computer of FIG. 19.

FIG. 28 is a circuit diagram of a paper tape defect interrogation and read-out system for both mirror and glazing grades.

FIG. 29 is a fragmentary detail of FIG. 27 illustrating the mechanical arrangement of the read-out fingers with respect to the paper tape defect record.

Figures 30, 30A:
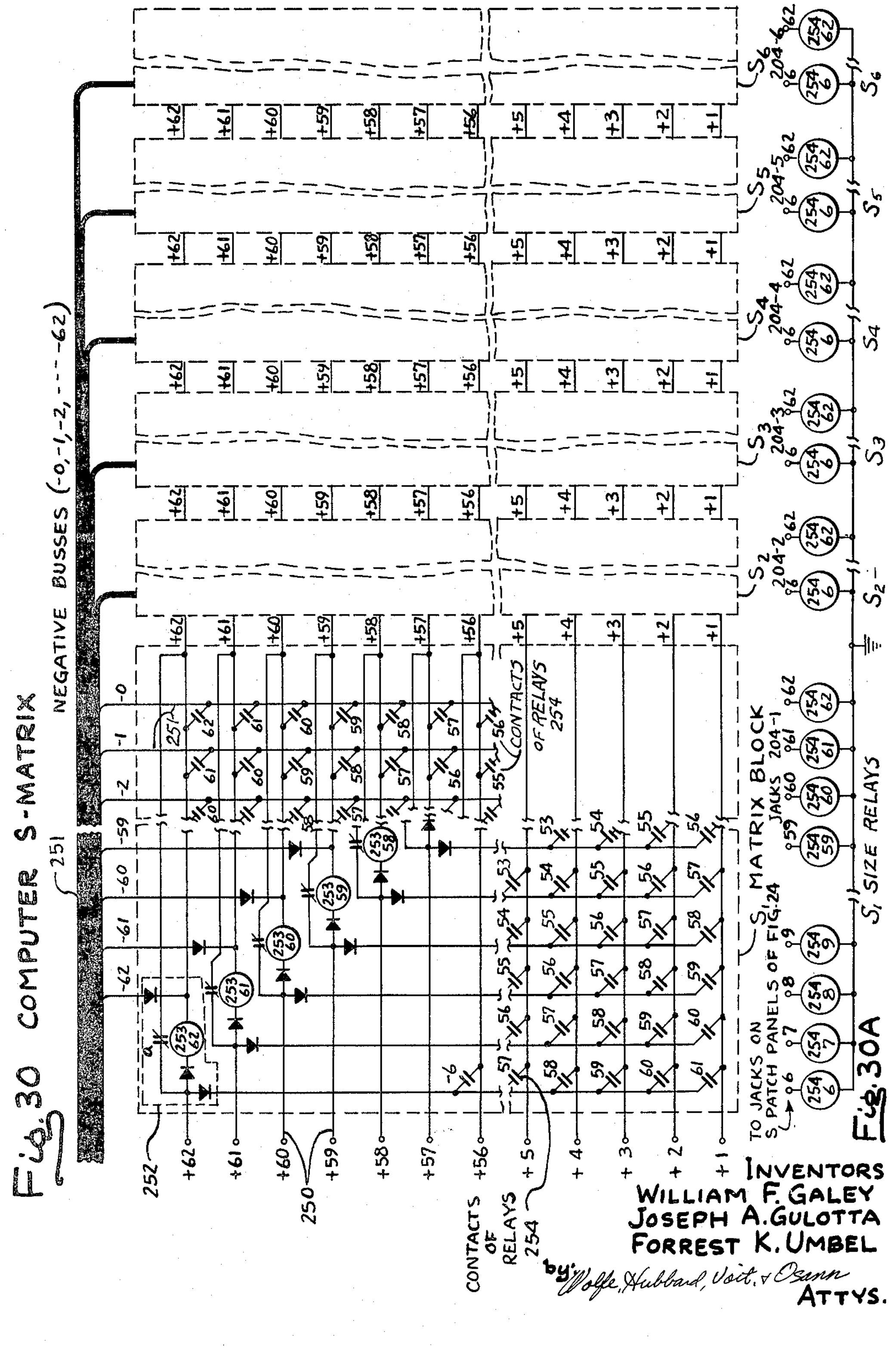

FIG. 30 illustrates an S partitioning matrix of the FIG. 19 computer with the highest rank S cell block partially detailed and the remaining five S cell blocks being represented in block diagram form.

Figures 31, 40:
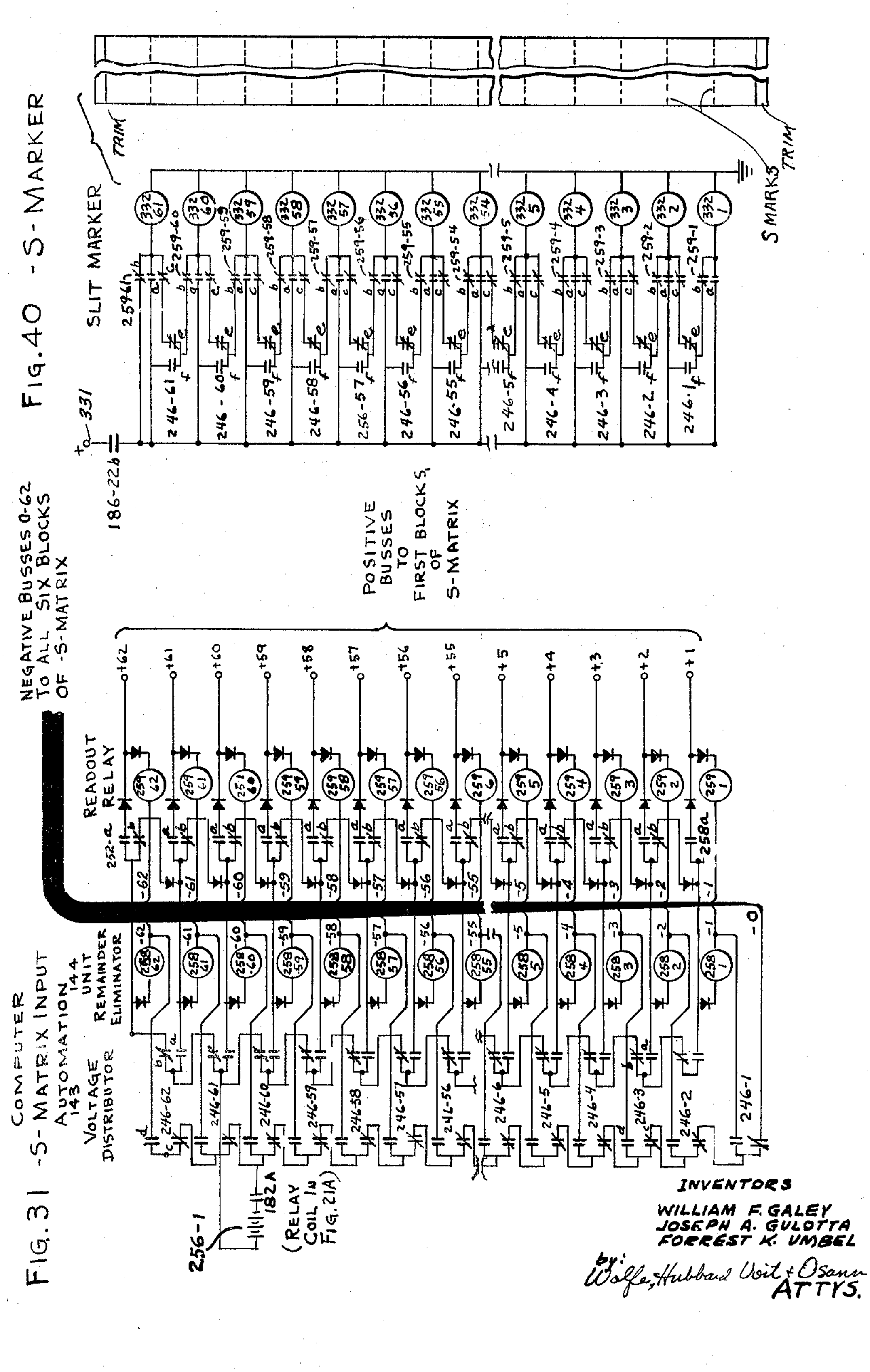

FIG. 30A illustrates the six banks of universal S cell switching relays having contact pairs in the FIG. 31 matrix.

FIG. 31 is a diagram of the input automation circuits for the S matrix of FIG. 30, including the voltage distributor circuits controlled by defect read-out data of the read-out system of FIG. 28, and further showing the unit remainder eliminator circuits.

Figure 32:
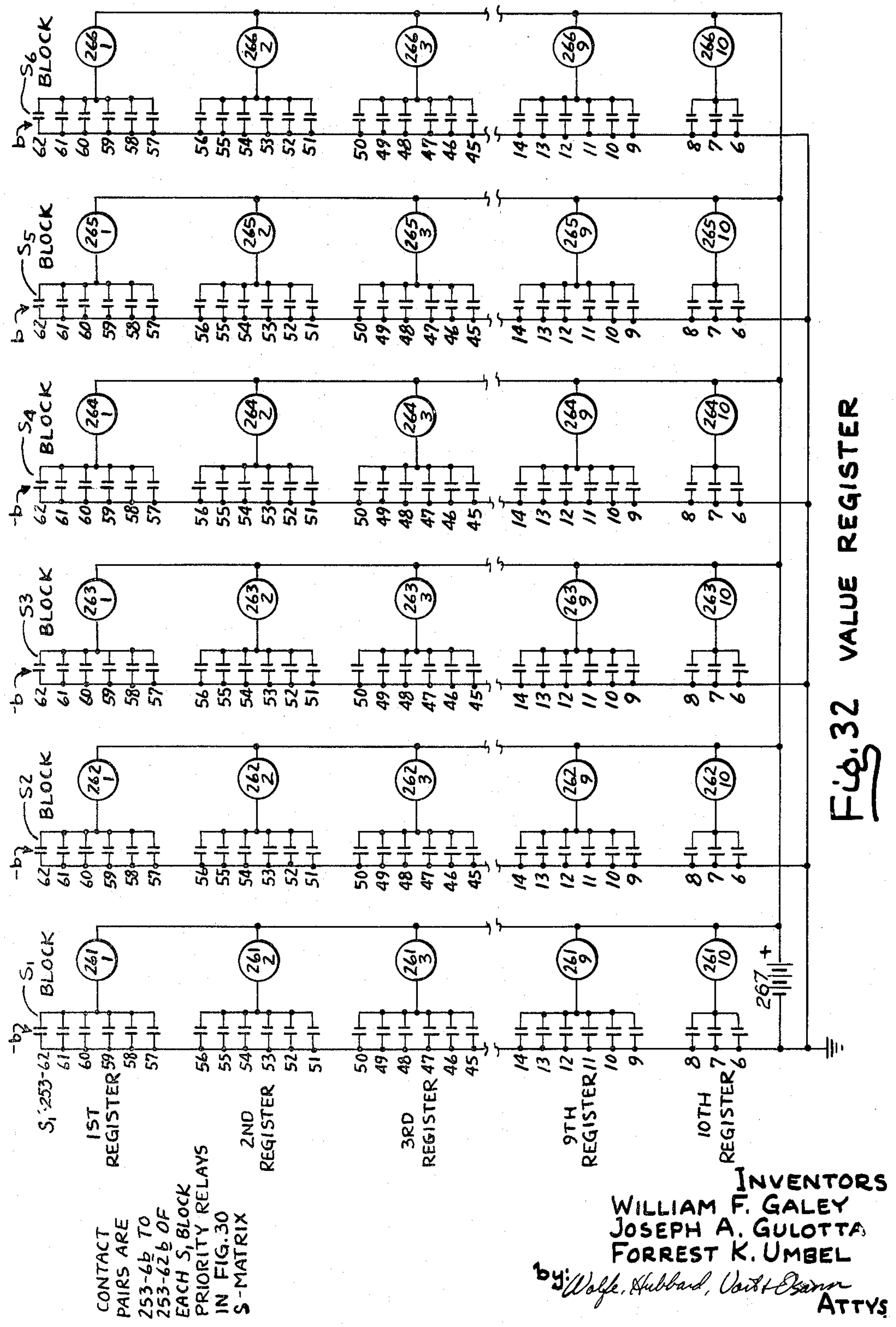

FIG. 32 is a diagram of the value register read-out relays of the S matrix of FIG. 31.

Figure 33:
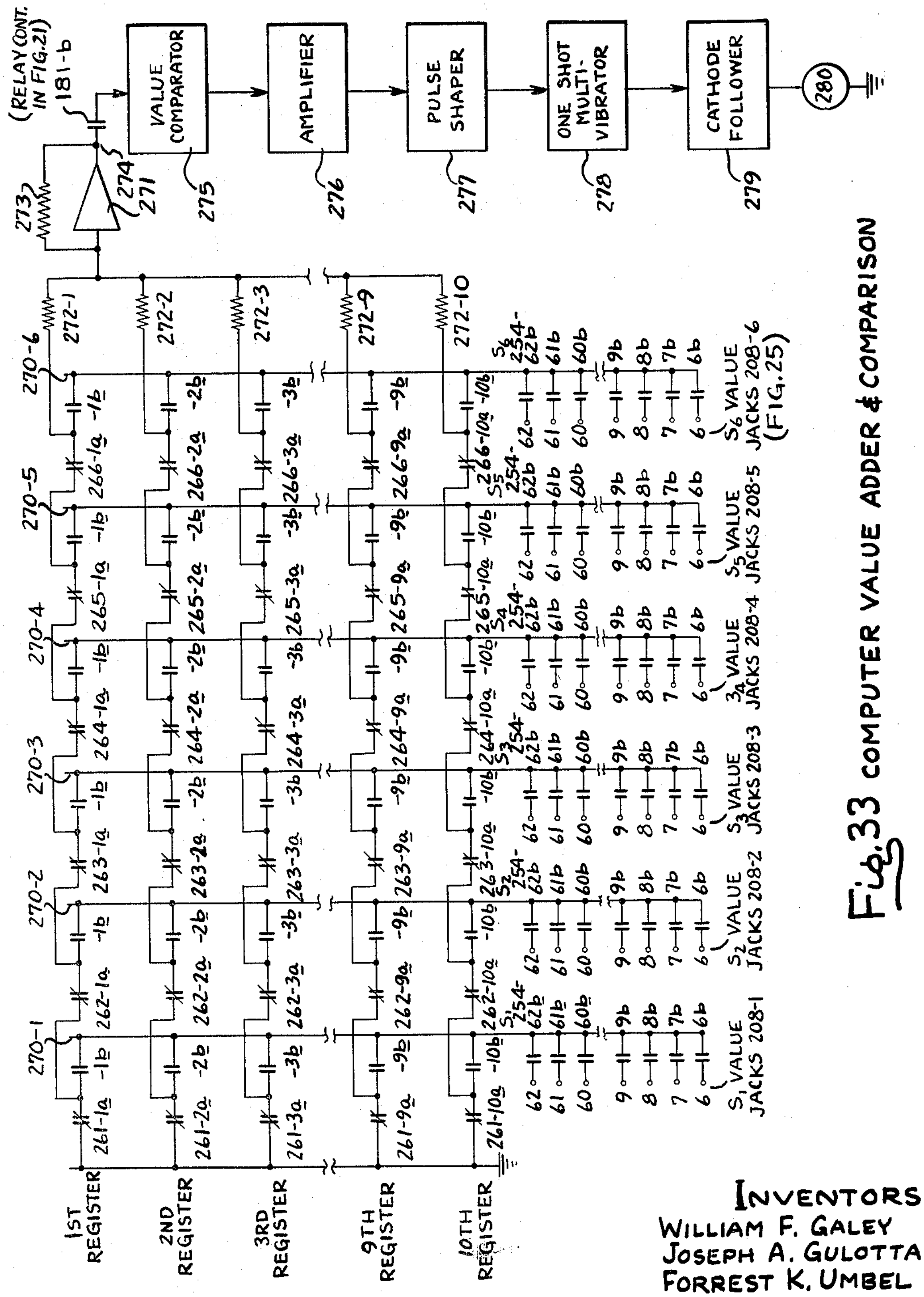

FIG. 33 is a diagram of an S value per Z step adding circuit with a block diagram of a value comparison circuit.

Figure 34:
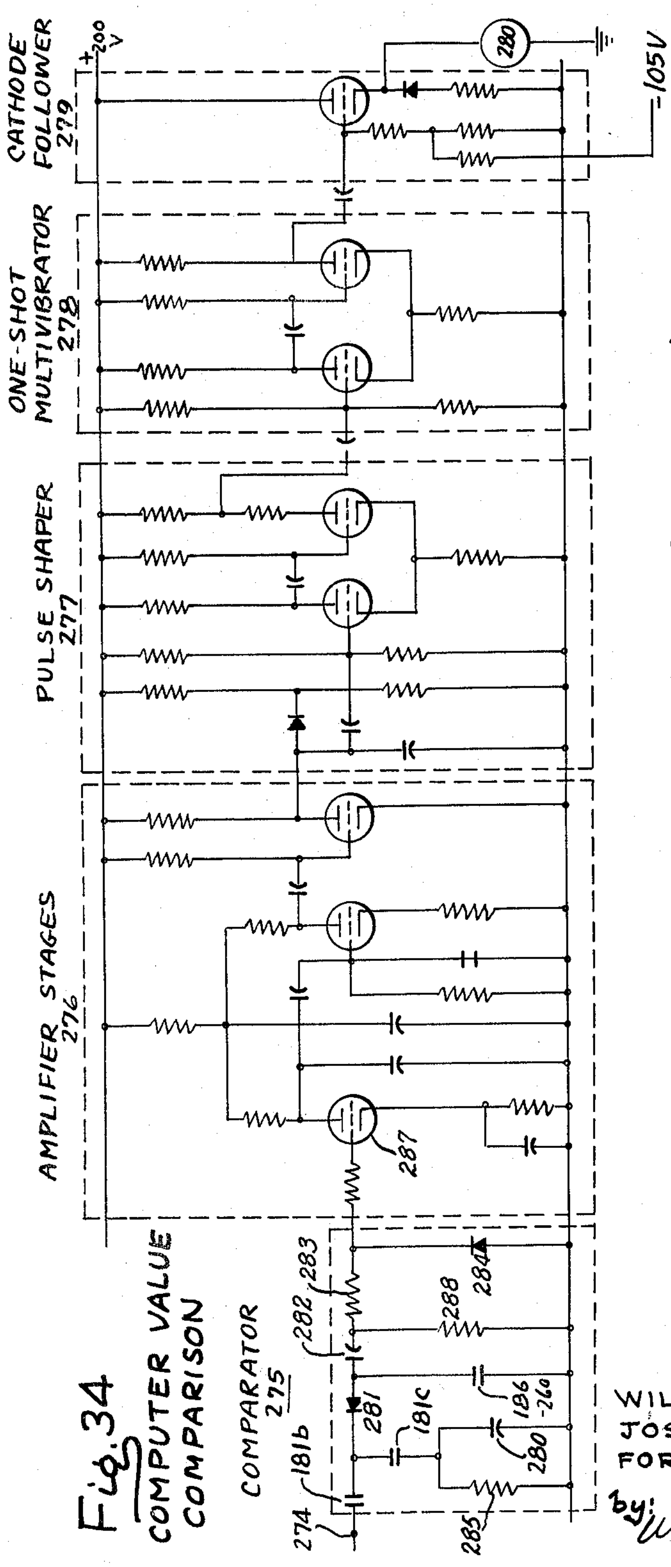

FIG. 34 is a diagram of the electronic tube circuits shown in block diagram in FIG. 33.

FIG. 35 is a block diagram of a Z accumulator operated from the decimal to binary converter of FIG. 26.

Figure 36:
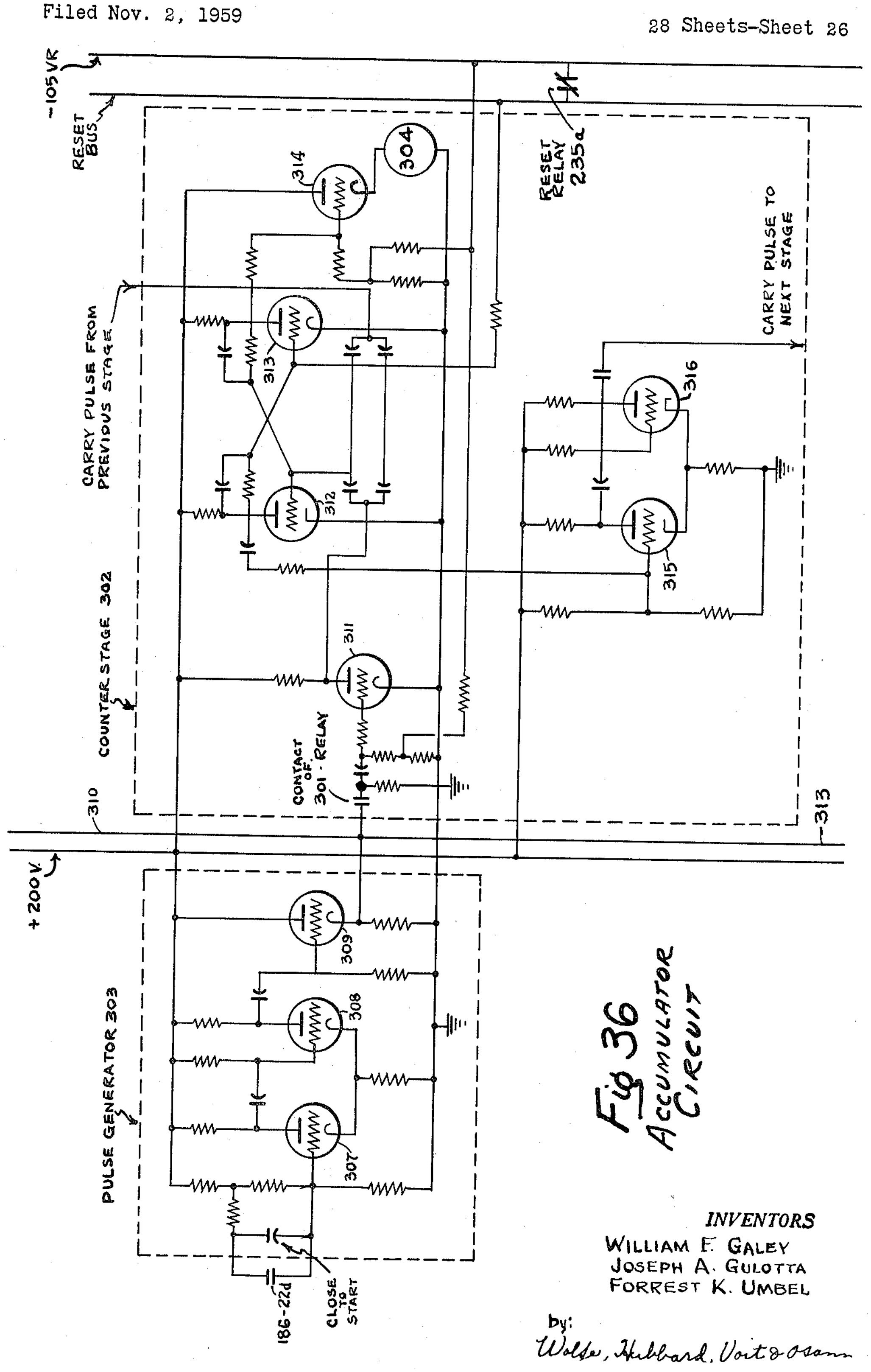

FIG. 36 is a circuit diagram of the electronic pulse generator and one of the counter stages of the accumulator of FIG. 35.

FIG. 37 is a binary to decimal converter for the accumulator of FIG. 35.

FIG. 38 is a circuit diagram of the paper tape brake and diode start circuit operated from the converter of FIG. 37.

Figure 39:
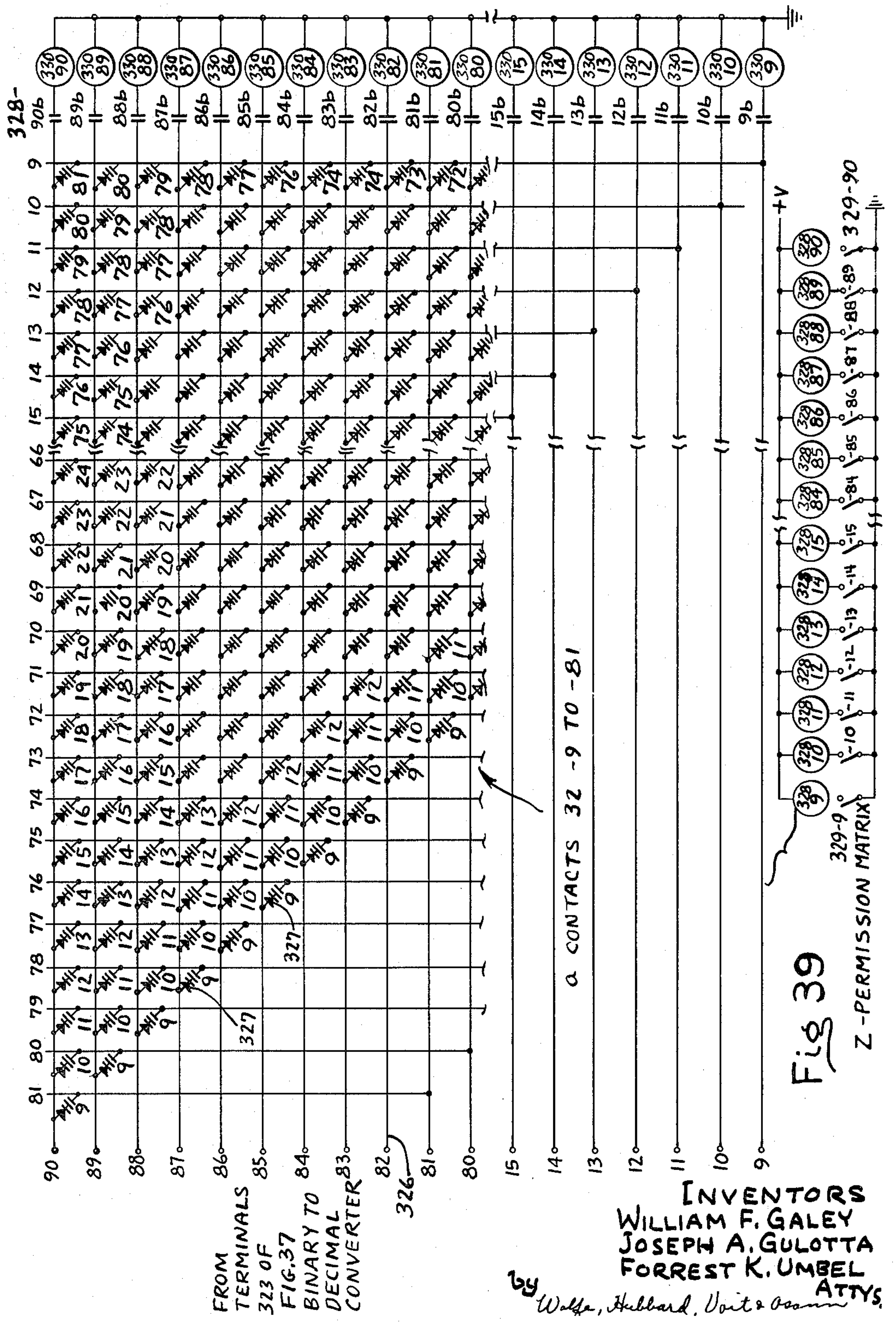

FIG. 39 is a Z permission matrix having its bus bars energized by the binary to decimal converter of FIG. 37.

FIG. 40 is an S-marker circuit operated during the chosen Z-computer trial.

Figure 41:
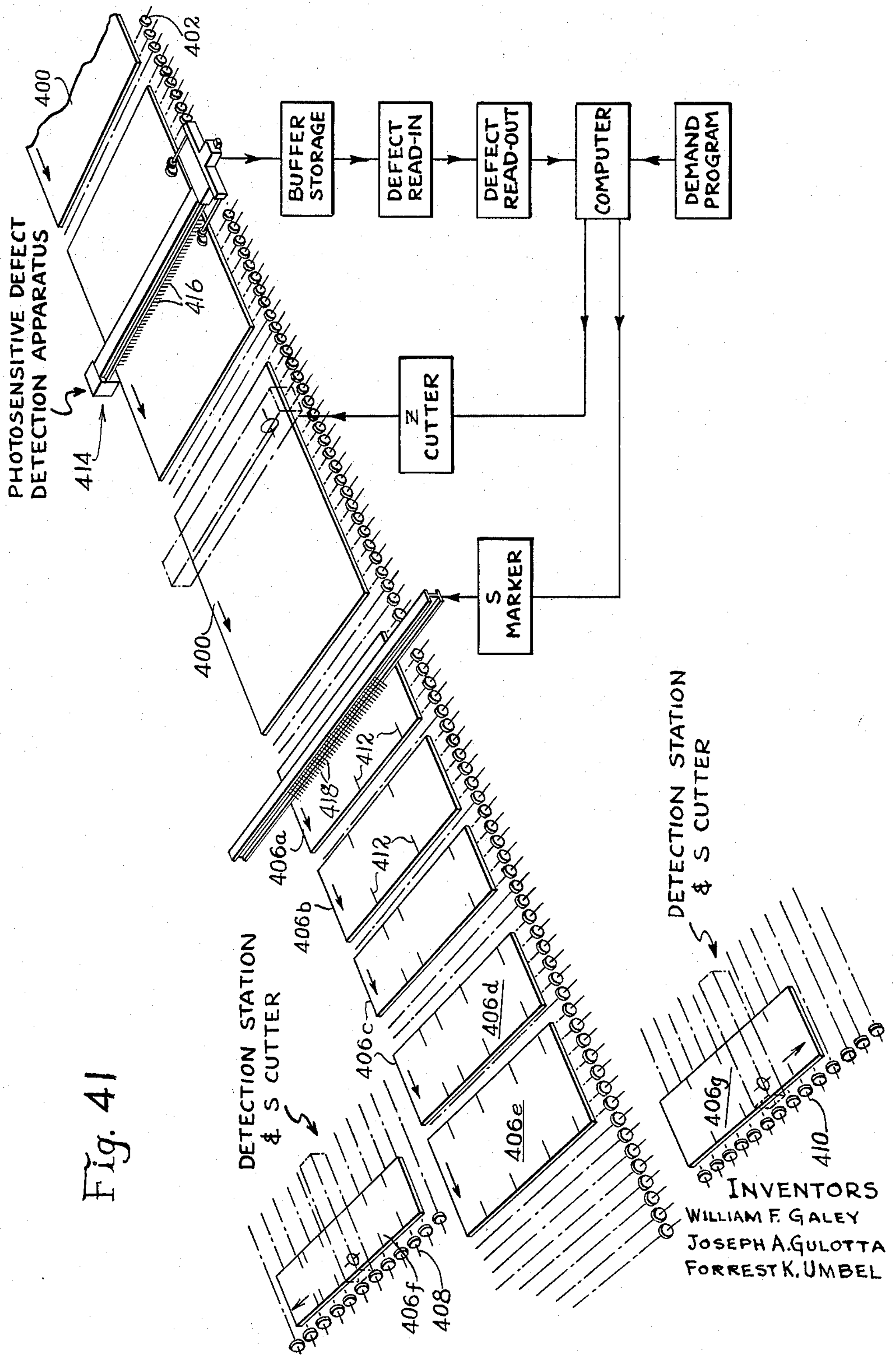

FIG. 41 is a semi-schematic view of a glass factory cutting system incorporating the computer of FIGS. 19–40.

Figure 42:
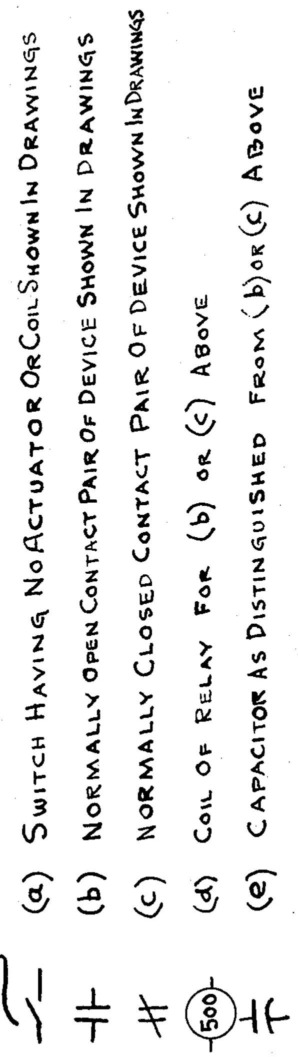

FIG. 42 is an electrical symbol legend.

Although certain particular embodiments of the invention have been shown and described here in some detail there is no intention to hereby limit the invention to the specific forms or details illustrated. On the contrary, the invention is to cover all alternatives, modifications, and equivalents falling within the spirit and scope of the invention as expressed in the appended claims, and the specification has been organized to guide the reader to that end as concisely and clearly as the complexities of some of the described industrial embodiments permit.

For an over-all view and introduction, Section I represents both the general method involved and definite analysis of partitioning as here employed. Section II introduces physical matrices as analogs of partitioning equations together with the construction and operation of several useful circuits for practicing the invention. Section III describes a preferred computer of a size and speed for converting input defect and program data into cutting decisions for the glass output of a plate glass factory. Section IV describes the automation and operation of such a computer in a production line.

The symbols of FIG. 42 deserves a prefatory comment. Because a computer system does not lend itself easily to circuit drawings on small sheet sizes, certain conventions have been followed throughout for the convenience of the reader. Thus switches for which no actuating solenoid or other operating means is to be found on the drawings are indicated as shown at *a*. Normally open and normally closed switches operated by a solenoid coil shown in the drawings are indicated as shown at *b* and *c*. Relay coils for actuating such switches are represented as circles around a reference numeral as at *d*. Capacitors are represented as at *e* to avoid possible confusion with switch symbols.

I.—PRACTICING THE METHOD OF THE INVENTION

(A) *Area partitioning*

Figure 1:
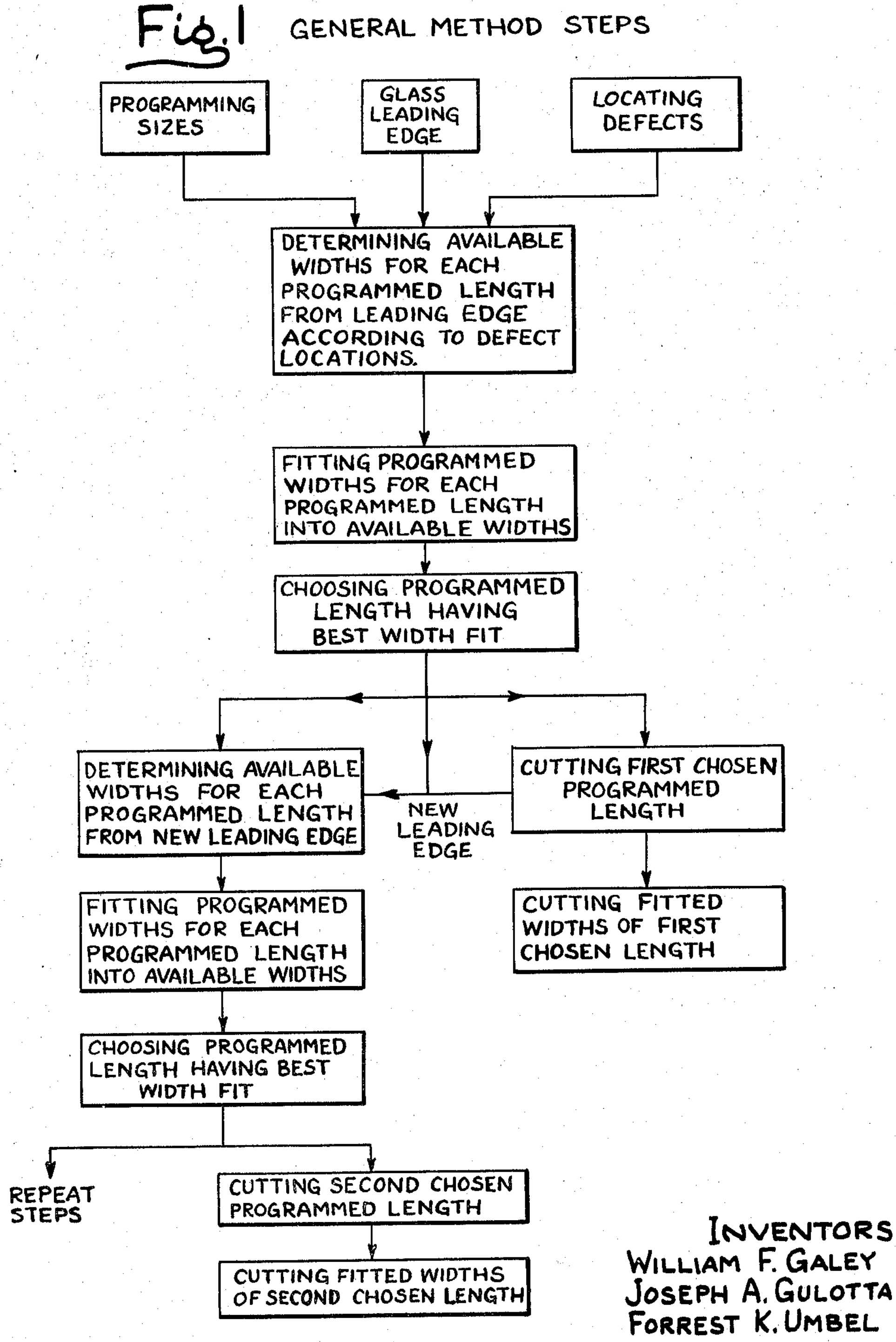

The over-all method of area partitioning of sheet material in accordance with the invention involves what may be termed a two-cut logic. For a generalized representation of the method in terms of the steps involved, the reader is referred to FIG. 1 which relates to plate glass as the sheet material out of which defect-free prescribed sizes are to be pieced.

Preliminarily, in cutting plate glass as a sheet material, it should be noted that three basic cutting requirements are respected.

First, the sheet or continuous ribbon is to be partitioned into rectangles of prescheduled or programmed dimensions, as distinguished from an operation in which the defective area is merely cut out of the sheet or in which the largest available defect-free piece of sheet material is always cut. The scheduled sizes are typically very much larger than the rectangular defect-bearing remainders which must be discarded.

Second, each cut must run completely across a dimension of the glass piece involved. This cutting requirement is inherent in the nature of glass since the cutting process is one in which the glass is scored and snapped. The same condition is significant for other sheet materials to the extent that the time and apparatus expense associated with cuts of partial lengths or cuts which turn corners are unduly high.

Third, the piecing or partitioning must be selective so that the scrap is of minimum area consistent with the choice of sizes into which the defect-free glass can be partitioned. Since defect severity affects grading, it should be noted that a glass area may be defect-free as to one grade, but not as to another.

The glass sheet, as described in connection with an industrial apparatus embodiment may, for example, be quarter-inch plate produced as a continuous ribbon over ten feet wide at a rate in the vicinity of two hundred lineal inches per minute. A transverse or cross cut across the glass ribbon width is the first cut of each operation, here called the Z-cut, and a set of second cuts, here called S-cuts, slit or slice the cut-off Z piece into smaller widths and eliminates the defects. This is the two-cut logic; the manner in which it is advantageously and uniquely applied follows.

Returning now to FIG. 1, the information required in piecing out the glass is the location of the leading edge of the glass, the locations of the defects, and the program of sizes to be cut.

For locating the defects, various means may be employed, suitably either visual or photo-electric inspection of the glass sheet of the over-all area to be considered before the first cut is made. This information can be considered as stored directly in or on the glass, but may be more readily recalled by addition of marks or markers. Preferably, however, the defect is secondarily stored, as on a tape or other record containing the dimensional location of each defect square with respect to the leading edge and the side edge.

The total demand program includes both the absolute sizes and the relative demand for them as reflected by assigned values per size. As to the sizes themselves, the lengths and widths of the various rectangles to be cut are arranged to group the respective width dimensions sharing a common length dimension. All of the length dimensions are thus grouped, each associated with one or more width dimensions. The relative demand for the different length by width sizes is preferably determined in a two-part analysis. First, a rank or order of priority is established for the respective width dimensions associated with each length dimension and second, a numerical value is established for each size so that values of groups of sizes can be accumulated and compared.

In accordance with the two-cut logic, the trials for the first cut correspond to the different programmed lengths as measured from the leading edge of the glass. Thus for each programmed length a trial length of the glass sheet is considered for which either all or parts of the total ribbon width are available for partitioning as defect-free spans, depending upon the number and locations of the defects affecting the grade being considered. Each defect is contained in a defect strip as long as the programmed length being considered.

Next the programmed widths for that particular programmed length are fitted into the available widths according to an assigned rank. The waste, which includes unfitted portions of the defect-free widths as well as the defect strips themselves, is minimized by choosing the number and variety of programmed widths that best partition the available defect-free widths. For each programmed length and corresponding widths thus tried, the values of the programmed sizes utilized are accumulated as the value associated with that trial length or cross cut.

The steps of fitting the programmed widths into available defect-free and subsequent value accumulations, is repeated for each programmed length before any cutting decision is made. In effect, a number of trial first cuts across the width of the glass are made and by this logical process the cut for which the best fit is provided, i.e., that for which the value of the fitted programmed sizes is highest, is chosen. After the chosen cut determination has been made, commands for cutting that programmed length and subsequently cutting the fitted widths of that programmed chosen length are issued. A large number of programmed lengths or trial cross cuts may thus be considered and whether the first chosen cut is the smallest or the largest or an intermediate one of the programmed lengths depends upon the particular defects and cutting program. It will be recognized, of course, that as larger dimensioned cross cuts (i.e., programmed lengths) are considered, larger numbers of defects are probable. The values of larger sizes, however, may counterbalance the larger absolute waste per cut to provide in the long run the most efficient or least wasteful operation consistent with meeting production requirements.

After the location of the new leading edge is thus systematically determined the steps are repeated. Thus each programmed length is again considered but with respect to the new leading edge. The defect locations with respect to the leading edge are changed, of course, and the available widths are re-determined. After again fitting the programmed widths into the available widths for each programmed length and accumulating the value of the sizes which would be cut, the second programmed length representing the best value is selected as the second cross cut in the repeated procedure. The widths for that second cut are cut or slitted and the fitting procedure is initiated again with respect to the newly created leading edge. The process continues a decision at a time for the length of the sheet material. If the over-all length dimension is very large, as when a continuous ribbon of sheet material is presented, the steps are continuously repeated.

Programming is usually established in terms of daily or weekly production, and a running count is desirably made of sizes cut but not ordinarily stocked in order that the program may be revised when the quantity requirements are met. The programming should, of course, be adjusted to take into account current economic factors and demands.

It may be pointed out that while the sequence is ordered, the actual time at which the cutting occurs may be deferred. Thus a sheet may be marked for the subsequent cutting of successive chosen lengths (with the accompanying fitted widths), each chosen length representing the leading edge for the next.

In some instances, the length of the sheet material may not be very long with respect to the various programmed lengths so that an appreciable remaining length might be wasted at the end of the sheet. A further step is then preferably added by which no programmed length is considered which, if chosen, would render the remaining length of sheet unpartitionable. In this form the two-cut logic requires a separate determination of length partitioning as permission to consider the first cut length.

The Z-at-a-time logic is also susceptible of extension as a basic step in a multiple Z-at-a-time system. A greater variety of choices under the same Z and S size and value program is obtained by selecting the highest value composite Z in a given length with respect to a leading edge. Each composite Z is a given number of programmed Z's in a particular order with respect to the leading edge, and its value is subject to variation by the order in which its component Z sizes are arranged. This calls for separately evaluating the different permutations of the component Z lengths for a given composite Z. The information storage requirements are very high in such a system where substantial numbers of Z by S sizes are considered, and the preferred apparatus systems specifically described herein operate on the basic Z-at-a-time logic.

(B) *Specific example of glass area partitioning*

Figures 2, 2A, 2B:
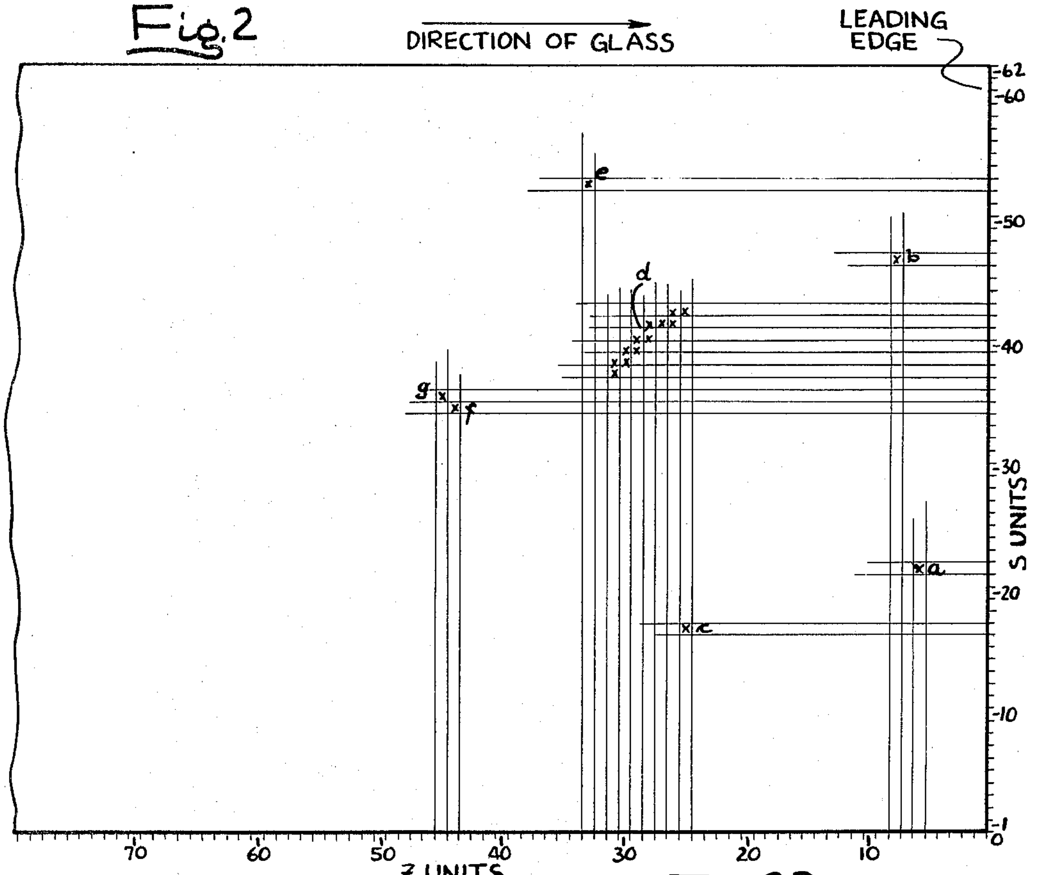
FIG. 2 is an example of a leading portion of a glass sheet with particular defect pattern located thereon.
FIG. 2A is a table of the defect pattern example locating the defective unit squares of FIG. 2.
FIG. 2B is a table of exemplary programmed sizes with rank and value to be cut from the glass sheet of FIG. 2.

An example of a defect-spotted glass ribbon is shown in FIG. 2. For the purpose of usefully relating the defect locations to given desired defect-free sizes, a basic dimensional unit is established for which all of the length and width requirements are integral multiples. With a ribbon 124 inches wide as in FIG. 2, a unit of 2 inches has been chosen, giving the glass an effective width dimension of 62 units (S dimension). Of course, if the programmed sizes for cutting were required to vary by as little as 1 inch intervals, the unit size would be selected as 1 inch. However, the unit square remains much smaller than the programmed sizes as a first step in reducing the amount of defect-free glass which must be discarded with the actual defect areas.

Considering the sheet as a mosaic or matrix of 2-inch squares, the defects are located by the Z and S coordinates for the unit square in which they lie. The glass is measured in units back from the leading edge along the length or Z-dimension, and the width or S dimensions are measured from one of the side edges. As illustrated, the coordinates apply to the squares themselves. Their boundaries are thereby indicated. By considering the beginning boundary edge of the first Z or S strip as zero, the number of the squares is the further Z or S boundary or limit line. Thus a square Z6, S22 is bounded by Z unit dimension lines 5 and 6 and by S unit dimension lines 21 and 22.

Looking again to FIG. 2, a number of defects spotted on the glass are located by Z and S coordinates in the table of FIG. 2A. The defect areas are intended to be random since in actual production their number and location cannot be predicted. The defects may be microscopic in size, occupying much less than a unit square, or they may cut across several of the mosaic units, such as the illustrated scratch defect *d*, but in any event, each defect is considered as occupying one square. Likewise since each square must be examined, either in whole or in part according to the nature of the defects involved to determine its defect classification, the minimum unit dimension may be effected by the limitations of the defect detecting means. While bulb edges at the sides of the ribbon are, in effect, continuous lengthwise defects, such predictable defects are simply eliminated by trimming. Accordingly, the locating edges herein referred to are reference axes or lines existing as physical edges after any predetermined trimming or squaring cuts are made, whether or not such cuts are deferred until such time as defect measurements or the size cuts are made.

The table of FIG. 2B illustrates a simplified program of sizes to be cut in which eight sizes are listed which may be reduced to three different length or Z-dimensions each having a group of two or three width of S-dimensions, associated with them. Thus for any given Z-cut along the length of the glass sheet there may be a choice of S-cuts. In the table of FIG. 2B, the larger of each S in a family of S-dimensions for a particular Z ranks over each smaller S. Furthermore, each Z x S size is assigned a value which, in this particular case, corresponds to its S dimension of that size. This means, for the example indicated, that different areas having the same S dimension are of equal value, but this is not necessarily anomalous as will be seen.

With this information supplied as to the sizes desired and the defect distribution, the usable areas are pieced out by the two-cut logic (as shown in the table of FIG. 2C). Accordingly each of the Z dimensions (35, 20 and 9) is made the basis of a trial or tentative first cut as measured from the leading edge of the glass. Then as measured from the reference side edge of the glass, each defect is marked off as a strip one unit wide leaving particular available defect-free widths.

In fitting the S dimensions into an available width, the minimum waste partition is resolved by employing the highest ranked S's wherever a choice occurs. If there is no exact partition, the available width is decreased by one, and the fit again tried. This process is repeated until a perfect partition is gained or the defect-free width is exhausted. FIGS. 2D, 2E, and 2F graphically portray the S-fits for the three Z trials tabulated in FIG. 2C. The cross-hatched area represents the defect strip; the single-hatch areas represent the glass discarded as cullet with the defect strip if the Z cut is elected, due to the impossibility of making an initial fit. Sufficiently large waste pieces may be saved, if desired, piecing out special or unprogrammed sizes.

By totalling the assigned values of the utilized sizes for each trial Z, the Z choice is dictated by the highest accumulation. In this case the Z of 20 is chosen since the value is 58—only two unit defect strips plus two additional unit strips of unfittable waste glass are involved.

In the event of a tie in summed values, the tie is systematically broken by initially electing to pick the first (or the last) of tying values encountered and choosing the order of the Z trials accordingly. For this example, while no tie was present, the Z trials were made in order of decreasing Z length and had a tie of largest value occurred it would have been broken in favor of the first totaled value, i.e., the largest Z.

With the choices of rank in making S fits, of value in choosing a Z after trial fitting, and of order of Z trials for breaking ties, practically any programming demand can be anticipated without requiring human judgement after the program has been set up. It will be appreciated, with the example illustrated, a minimum area waste per Z unit length logic is dictated by making value proportional to S. If value were proportional to Z x S in dimensional units, then the Z of 35 would be chosen in this example, despite the larger amount of waste. If in the S fitting the rank is not in the order of the S dimension, ties of partitioning in the S dimension are broken in favor of the smaller S's and they would, of course, be cut. In the long run (i.e., a day's, a week's, a year's production), the waste is by definition minimal since the programmed sizes have been cut in the programmed order to meet the demand thus analyzed.

In the case where the ribbon is cut into discrete sheets before inspection, as, for example, 180-inch (or 90-unit) sheets, left-over lengths are preferably avoided. This is done by always choosing a Z which is part of an exact fit of the various Z dimensions in the total length. If the highest value Z is not available, the next highest is chosen, and so on. In this instance, any of 9, 20, or 35 may be chosen as the first cut without defeating the lengthwise fit. Choice of a Z of 20 in the first cut leaves 70 units, into which two Z lengths of 35 may fit. However, a Z of 20 (or 9) would be eliminated from consideration for the second cut.

Usually, by filling in the program with a large number of Z's, a greater number of lengthwise choices remain open. The number of trial Z's which are subject to the S trial partitions and valuation are, of course increased, but the burden of added decisions is lightened by their still systematic resolution. If the choice is likely to be limited by reason of a few or only large Z numbers programmed, a small remainder in the total length may be tolerated. A preferred method is to try alternatively partitions of the total length number as decreased, by one, two, and three, for example. A fit in any case calls for only a small waste.

(C) *Basic partitioning definitions*

At the heart of two-dimensional or area partitioning is a basic method of one-dimensional or length partitioning. Such partitioning may be generally expressed in terms of sets of integers whose sum is exactly equal to a given integer. Partitioning a large sum into selected smaller integers, like factoring a large number into prime factors, is often easier to do than to explain. As in factoring for primes, precalculated tables may be referred to for convenience, and the results are valid whether determined by explicitly expressed logical steps or by trial and error arithmetic techniques. Since a definition of partitioning, as distinguished from factoring, does not appear to be well established, the following expression is offered as definitive at least for the purposes of the specification and claims:

$$A=n_1a_1+n_2a_2+n_3a_3+ \ldots +n_na_n$$

In this expression A is the integer partitioned (i.e., a composite) and $a_i$ may generally refer to the integers of a set $a_1$, $a_2$, $a_3$ etc. which fit into A without remainder. The number of each such integer $a_i$ involved in a partition is $n_1$, $n_2$, $n_3$, etc., or $n_i$. The value of $n_i$ may be zero in the event that its associated $a_i$ is not present in the partition. The use of the cardinal subscripts $1_1$, $2_2$, $3_3$, need not imply any sequential or quantitative order, nor is any numerical identity to be assumed between the $n_i$ and $a_i$ to which the same substript number is applied.

The sole partition is obvious if the only $a_i$ is the integer 1. It is equally obvious if the only $a_i$ has a value equal to A. There would be no practical problem, and no need to even term the process "partitioning" were only these trivial partitions involved. But this is not the general case.

Significantly, in view of the discovered utility of the partitioning concept as defined, two types of solutions are of particular interest. One may be termed the general solution in which all of the possible partitions of A by the $a_i$ integers are recognized and utilized. The other may be termed the selective solution in which conditions for uniqueness of solution are imposed by assigning rank or order of priority to the different given $a_i$ integers.

General partitioning is utilized in the Z partitioning method previously discussed. Whether or not a given $a_i$ is present (i.e., is its $n_i$ other than zero?) in any of the possible partitions of A, is the information required. Information as to the number of such partitions in which that $a_i$ is present or the number of times ($n_i$) the $a_i$ is present in any one partition may not be necessary. Such a determination is not useful if the $a_i$ set includes the integer one, and higher $a_i$ integers are necessarily implied. Reference is made to FIG. 3 which shows graphically the possible fits of any or all of the $a_i$ integers 3, 5, 8, and 12, into an A integer of 20. The A is shown by an ordered array of evenly spaced parallel horizontal lines 0, 1, 2, 3 . . . 20 (only the line segments adjacent the numbers are shown; their extensions are unscribed for clarity of the drawing figure). The partitions are represented by vertical chains of links having respective length spacing lines differing in number by 3, 5, 8 or 12 as indicated. Thus, for an A of 20, referring to FIG. 3, links of 3, 5, 8, and 12 in various chains each shown as terminating on line 20, thus indicating that for an A of 20 any one of these $a_i$ integers may be present in a partition. The choice of any of 3, 5, 8 or 12 as the first Z cut from a Z length of 20 is thus acceptable.

FIG. 3 is further arranged to show the availability of the various $a_i$ integers for each of all the possible succeeding choices. Thus, if an $a_i$ of 3 is the first choice, the A becomes 17, and it will be observed that all of the $a_i$ integers still remain available as a second choice since links of 3, 5, 8 and 12 depend from line 17. If the second chosen $a_i$ is 12, a link for which extends from line 17 to line 5, then for the third choice only an $a_i$ of 5 is available since only a link of 5 depends from line 5. The complete partition is thus 3, 12, 5, and the other possible partitions may be as readily traced from the table. This representation includes permutations of the sets of $a_i$ integers and coefficients $n_i$ constituting one partition (such as 3–12–5, 3–5–12, 5–3–12, 5–12–3, 12–3–5 and 12–5–3).

It should be noted that FIG. 3 does not illustrate all partitions for the A integers less than 20, but only those reached by subtracting one or more of the $a_i$ integers. Thus no links terminate at line 16, despite the fact that it is evenly partitioned by two 8's since 16 is not a subpartition of 20.

While the general solution illustrated by FIG. 3 indicates the acceptability or future freedom of choice with respect to any selected $a_i$, it includes the multiple choices which would make indefinite the S partitioning previously described. An assignment of rank in which, for example, a larger number always precedes, the partitions having lesser numbers of the highest $a_i$ integers are eliminated. Considering the ranking $a_i$ as that $a_i$ link which is connected at its upper end to line 20 of the parallel array in FIG. 3, the highest $a_i$ of any of those available in a general partitioning of 20 is chosen. This, of course, is 12, leaving a next A of 8 for which the general partitions are 8; 5–3; or 3–5. Under the rules, 8 outranks the others, thus automatcally reaching a solution for $n_1(a_1)$, which is one, and for $n_2(a_2)$ which is one 8.

FIGURE 4 further illustrates selective partitioning for all A integers up to and including 12, for $a_i$ integers of 4, 3, and 2 in that rank. The constants of the partitioning equation are changed here, both to indicate the generality of the approach to a solution and provide a sufficiently simple example for which a mechanical analog can be clearly and concisely illustrated in the succeeding section. In this example it may be noted that each A is partitionable, and that there can be no ties or indecisive choice. For other examples no partition may be available, and the chosen solution is that for the next highest partitionable A. Procedurally, the A is decreased by one until a fit is found for which no remainder exists. The same result may be obtained in this particular example by setting an $a_i$ equal to 1; as a method, however, setting an $a_i$ equal to one disguises the fact that such $a_i$ may not itself be a useful or desired part of a partition. Thus where the other $a_i$ values are high, a partitioning solution may provide a large number ($n_i$) of ones.

Since the general solution embraces the unique solution, it will be recognized that the unique or selective solution also indicates the presence of the $a_i$ integers, although in one, rather than all of the possible partitions.

II.—PARTITIONING MATRICES AND ASSOCIATED CIRCUITS (A) *A simple matrix for general partitioning solutions*

A simplified electrical matrix for determining which ones of given numbers may be combined to equal a total number is illustrated in FIG. 5. It is a structural analog of the exemplary general solution of the partitioning equation illustrated in FIG. 3 and further provides partitions not only of an A of 20 but for any lesser integers selected as A. Such a matrix provides an instantaneous computation of the partitioning equation for which it is designed without resort to a storage or memory system. As a permission matrix, for example, it can determined which of several considered Z cuts from a given sheet length leave a remainder which is partitionable by the Z program.

Turning now to FIG. 5, an array of horizontal bus bars or conductors 40, numbered 0, 1, 2, 3 . . . 20, represents in this instance a sequence of 20 consecutive integers. The zero bus bar, for example may represent one edge of a rectangular piece of sheet material and the successive integers represent distances along the length of the sheet as measured from that edge. The set of bus bars is termed a matrix, by reason of the chains of cells or links which connect different pairs of respective bus bars. These cells 41, 42, 43, 44 correspond in this example respectively to the $a_i$ integers 3, 5, 8, and 12, each spanning a different set of bus bars spaced in number by the $a_i$ integer associated with the cell.

When a voltage which is positive with respect to the zero bus bar is applied to one of the other bars current flows downwardly through all unbroken chains of cells between the terminal bars. To prevent upward current flow, each cell contains a unidirectionally conducting or rectifying device, suitably a silicon diode 45. The diodes are poled to have a negligible voltage drop in the easy flow direction from an upper bus to a lower one. (The contact pairs shown in each cell are later described and are closed for operation of the matrix.) It will be appreciated that the numbering of the bus bars has a structural and operational significance in view of the diode interconnections, even though the order of diode connections from left to right is a matter of choice.

Significantly, each $a_i$ bus bar span is connected by a cell of the corresponding span. The geometry selected for illustrating the circuit of FIG. 5 ties the like-span cells in chains and groups the chains in blocks to emphasize the completed interconnection. Thus the 3-span block for $a_i=3$ has three vertical chains of cells, the first starting at bus 20, the second at bus 19, and the third at bus 18. In the 12-span block the chains are limited to single cells 44 since consecutive spans would exceed the number of bus bars. All of the partitions of 20 by the set 3, 5, 8, 12 in FIG. 3 are confirmed by the presence of the corresponding $a_i$ cells of the matrix in a unidirectional current path from bus 20 to bus 0. The current path pattern of FIG. 5 is simpler than the chart of FIG. 3 in one respect because the same cell may combine current paths for several partitions. For example, a 12-span cell from bus bar 20 to bus bar 8 places a voltage on bus bar 8 for which several paths exist to the 0 bar. The FIG. 5 paths are more complex in another respect—they include permutations, and are not restricted to combinations. Thus from bus bar 8 to 0 there is one 5, 3 path through first a cell 42 and then a cell 41 and also a 3, 5 path through first a cell 41 and then a cell 42. And, of course, the FIG. 5 matrix goes beyond the diagram of FIG. 3 in that all the possible links are provided for electrical partitioning of integers less than 20.

If current flows through any of the links, the integer equal to its bus bar span is present in a partition of the total integer equal to the total energized span. Since for a permission matrix it is unnecessary to know the specific partitions, the required information is simply provided by a means responsive to current flow through only one terminal cell of each block. As shown in FIG. 5 the cell of each block which has its lower end connected to the 0 bus bar contains a read-out relay coil. As indicated, the relay coils (each shown here and in following drawings as a circle-bearing a reference numeral) for the respective blocks of 3, 5, 8 and 12 are 46, 47, 48 and 49. Other types of indicators may be employed but the relay coils have the advantage of readily providing a number of switching contacts for whatever indicating or control functions may be desired. No diode 45 is needed in the last cell containing the readout relay since no reverse paths are possible by reason of the end-of-matrix connection. All of the cells thus remain unidirectional links.

As a matter of convenience for solving partitioning equations, the respective blocks may be switched in or out of the matrix depending upon which integers are required in the set. Referring for example to the block of 3-span cells 41, a matrix size relay 50 is provided having a plurality of normally open contact pairs. This includes 17 contact pairs **50*a*, one in each diode cell plus another pair 50*b* in the read-out cell. The relay coil 50 is suitably energized by connection through a selector switch 51 to a suitable control voltage source indicated as a battery 52. With the switch 51 closed, the relay 50 is energized and all of the 3-span cells 41 are connected into the matrix. Programming of the integer 3 may be indicated as by a lamp L50 connected across the voltage source by another pair of normally opened contacts 50*c*** of the matrix size relay.

Presence of a partition involving the integer 3 is indicated suitably by a second indicator lamp L46 connected across the control voltage source through a normally open contact pair **46*a* of the read-out relay 46**. Other control or indicating arrangements may, of course, be served by the read-out relay actuations.

Similar elements are suitably employed for the other $a_i$ blocks of 5, 8, and 12, namely, respective matrix size relays 53, 54 and 55, respective size switches 56, 57, and 58, respective size indicator lamps L53, L54, L55, and respective read-out indicator lamps L47, L48, and L49. More blocks representing other integers may likewise be switched in or out of the matrix for whatever set of integers is to be tested. Switches 51, 56, 57 and 58 are closed, of course, in the partitioning operations described.

To select the A integer to be partitioned, a positive voltage with respect to the zero bus bar is applied to the selected one of the bus bars 40. As shown, this is suitably provided as a rotary selector switch 59 having its rotor wiping the numbered bus bars and connected to the zero bus bar through the voltage source 52. With the switch connected to bus bar 20, for example, all of the programmed integers 3, 5, 8, and 12 are variously involved in some of the possible partitions of 20, and hence the read-out relay of each block will be energized. Any one of the integers is permitted—i.e., its subtraction from 20 leaves a remainder which is partitionable. If, for example, a permitted cut of 12 units from a sheet 20 units long is chosen, the remainder of 8 is still partitionable by combinations involving 8, 5 and 3. This is readily determined by adjusting the selector switch 59 to the number 8 bus bar and noting that lamps L46, L47, and L48 are turned on.

Not all the A's are partitionable by this integer program. For example, with the voltage connected to bus bars 7 or 4, no current path is available through any combination 3, 5, 8, and 12. And, of course, an A less than 3 is not partitionable because 3 is the smallest programmed integer. Connections of cells to all of the bus bar spans is shown, however, both as a matter of pattern consistency in illustrating the matrix and to forestall incomplete partitioning in the event other $a_i$ integers are added or substituted by switching in other blocks of cells.

If the matrix is designed to partition only a single integer some cells may be eliminated. For an A of 20, for example, and the $a_i$ program illustrated, there would also be no necessity for cells connected in FIG. 5 to bus bars 19, 18, 16, 13, 7, 4, 2, or 1. These are particular rather than general cases, however, and reference to all spans as being interconnected is not intended to require connection of the unusable spans occurring because of boundary conditions or limited examples.

So long as the matrix need not identify the combinations involved in partitioning or specifiy the number of times a particular integer is employed in the matrix current paths, the detection or read-out of current through either terminal cell of each block of cells is sufficient. This follows from the fact that all permutations find current paths between the terminal busses. As a result a different one of the permutations of each combination will have part of its current path through each terminal relay of each integer block anywhere involved in a current path. Read-out relays may, if desired, be provided in additional cells for securing additional information. Such modifications are illustrated more significantly in the following subsection in connection with the description of a selective partitioning matrix.

(B) *A simple selective partitioning matrix*

A matrix for selective partitioning whereby a unique solution is delivered is illustrated in FIG. 6. It is a structural analog of the solution of partitioning equation illustrated by FIG. 4. As compared with a permission matrix of the FIG. 5 type, the indicated read-out integers are narrowed to only those in the highest-rank partitioning combination. Such a matrix, which also indicates the number of times each indicated integer is present may be termed a command matrix since it furnishes a particular or unique set of instructions best fitting the input conditions according to its built-in logic or decision-making instructions.

The utility of the command matrix for S partitioning may be readily realized. In addition, the FIG. 6 matrix also illustrates other useful features of partitioning matrix design for broadening its scope and versatility. Thus, since S partitioning must accommodate defects wherever they might occur, the matrix illustrated has its A spans bounded by the defects without referring the A span to the zero bus bar. Additionally, while the number of bus bars in the illustrated example is small, the number can be very large and several A's (i.e., integers to be partitioned) may be partitioned simultaneously.

Referring to the matrix of FIG. 6, a horizontal array of bus bars 60 and numbered 0, 1, 2, 3 . . . 12 represents a maximum A span of 12 as an analog of the selective partition example of FIG. 4.

The vertical directional characteristic of the matrix is provided as before by unidirectionally conducting cells or links 61, 62 and 63, connected respectively across bus bar spans of 2, 3, and 4. Each such cell or link contains a diode 64 poled for current flow from a higher numbered or more positive bus bar to a lower numbered bus bar. All of the available spans of 2, 3 and 4 are connected by the links which again are grouped in blocks corresponding to the $a_1$ integers of 2, 3 and 4 in the particular partitioning set here represented.

Horizontal directional characteristics establishing a declining rank from right to left are introduced by normally closed switches in the bus bars (except the zero bus bar) to the left of each block of cells. With the integers ranked 4, 3, 2, and 3-span block is to the left of the 4-span block and the 2-span block is to the left of the 3-span block. Opening a bus bar switch cuts off the positive voltage supply to all cells having their upper terminals connected to the portion of the bus bar to the left of the switch.

The over-all composite direction of rank or priority is thus from an upper right-hand positive bus bar terminal to a lower left-hand negative bus bar terminal.

Automatic operation of the bus bar switches is combined with the read-out function by providing a cell relay coil in each link. As shown the relay coils for links 61, 62 and 63 are respectively 65, 66 and 67, the coils being in series with each cell diode 64. A first normally closed contact pair 65*a*, 66*a* or 67*a*, associated with its respective relay coil, interrupts the bus bar to the left of the upper connection of the cell to the bus bar. A second normally open contact pair 65*b*, 66*b*, or 67*b* of each relay serves a suitable read-out circuit.

In operation, a positive voltage with respect to the zero bus bar applied to the positive terminal of bus bar 12 causes current flow through a path corresponding to the sole partition indicated for such a value of A by FIG. 4—namely, a chain of three 4-span cells 63 (from bus bars 12 to 8, 8 to 4 and 4 to 0) provides the sole current path. None of the other bus bars are energized, of course, and the portions of bus bars 12, 8 and 4 to the left of the 4-span block of cells 63 are disconnected by the opening of the contact pairs 67*a* associated with the energized relays of the current connecting cells.

If a voltage is applied between the positive terminal of bus bar 11 and the negative terminal of bus bar 2 for example, the current seeks a path across a span of 9 bus bars. With the integer program and rank here given, it will be appreciated that the correct decision must be, in order, 4, 3, 2. The sole current path is traced from bus bar 11 through a 4-span cell 63 to bus bar 7, from bus bar 7 through a 3-span cell 62 to bus bar 4, and from bus bar 4 through a two-span cell 61 to bus bar 2. Each of the bus bars 11, 7 and 4 is interrupted by the opening of the cell relay contact pair to the left of the upper connection of each energized cell. All other current paths are thus precluded.

Matrix size relays may be desirably employed for switching different blocks of cells in and out of the matrix to program different partitioning problems. As shown in FIG. 7 matrix size relays 68, 69 and 70 are each provided with a plurality of contacts 68*a*, 69*a* and 70*a* which are located in the respective 2-span, 3-span and 4-span cells 61, 62 and 63 shown in FIG. 6. The relays are energized through respective size switches 71, 72 and 73, each switch and relay being connected across a suitable voltage source 74. All of the contact pairs are to be considered as closed, of course, in analyzing the matrix performance for the $a_1$ program of 4, 3, 2. It will be appreciated that bus bar contact pairs 65*a* are of significance if other blocks of cells are or may be switched into the matrix to the left of the 2-span cells 61.

Also shown in each cell or link of FIG. 6 along with the diode, the cell relay, and the matrix size contact pair is a resistor optionally added to help keep the relay current within convenient operating limits. The resistors in each cell of a given span are of equal resistance. As shown resistors 75, 76 and 77 are provided for the cells 61, 62 and 63 respectively. The utility of the resistors and the selection of their value depends upon the voltage supply employed and is discussed in a further paragraph.

A simple read-out circuit is suitably provided by counting the number of energized cells in each block, suitably by means of normally open contact pairs from each cell relay in an indicator or control network as shown in FIG. 7. For detecting current flow through any of the 2-span cells 61, a galvanometer type indicator device 78 is connected across the voltage supply 74 through parallel circuits consisting of each cell relay normally open contact pair 65*b* in series with a read-out or value resistor 79. With such an indicating circuit across the voltage source 74 or other stabilized supply, the current flow through the galvanometer is zero if no 2-span cells are energized and increases with the number of contact pairs 65*b* which are closed.

Corresponding read-out circuits are provided for the 3-span and 4-span blocks, respectively employing galvanometers 80 and 82, read-out contact pairs 66*b* and 67*b*, and read-out resistors 81 and 83. By either adjusting the respective ratios of resistors 79, 81 and 83, or by providing respective galvanometer scale multiplication factors, indicated values proportional to desired multiples of the respective $a_1$ integers times the number of such integers involved in a partition are obtained. Totalling the galvanometer readings thus provides a total value for the partition.

It is obvious that, without departing from the spirit of the invention, various voltage or current responsive devices, whether employed as indicators or control devices, may be substituted for the galvanometers.

Likewise, it will be appreciated that features of the matrix of FIG. 6 can be employed in a permission-type matrix. For example the normally closed contact pairs 65*a*, 66*a* and 67*a* in the bus bars and associated with the individual cell relays may be eliminated so that the partitioning is not selective. The galvanometer readings for the respective blocks then indicates the number of cells of each span which are energized. Embraced within this information, of course, is the indication as to whether any cells rather than no cells are involved in a partition. If only the more general information is desired, the read-out network resistors 79, 81 and 83 can also be omitted. Such a modification, requiring use of cell relays in each cell, is of advantage where the spans to be partitioned are not advantageously referred to the same or permanent terminal (zero) bus bar.

Whether or not it is simplified to serve as a permission matrix rather than a command matrix, the apparatus of FIG. 6, like the apparatus of FIG. 5, assures a terminal connection of at least one cell in each block. In addition it may be seen that the FIG. 6 matrix, by opening the bus bar switches, selectively excludes all but one terminal cell at each energized bus bar.

Briefly, immediately after the application of the bus bar voltage, multiple current paths are established through the matrix of FIG. 6 corresponding to all the partitioning permutations as in a permission matrix of the type shown in FIG. 5. In that sense also one cell of each block, connected either to the upper or lower bus bar of the energized span, carries current if integers of that cell span are involved in a general partitioning solution. After the energized relays open their normally closed contacts, the redundant paths are eliminated, ultimately in favor of the unique selective partitioning solution. It is an advantage of the circuit structure that relay pickup or actuation times are not critical, and the correct solution is attained even if the cell relays in the lower ranked cell spans should happen to have quicker pickup times than relays in the higher ranked spans.

(C) *Matrix voltage distributors*

While voltages may be applied by manually controlled switches across the selected bus bar span of a matrix, such as that illustrated in FIG. 6, the automatic correlation of applied matrix voltages with the location of defect-free spans of a sheet material being partitioned offers advantages for high-speed operation.

For economically meeting the requirements of a given installation, it is to some extent a matter of designer's choice to either increase the number of matrix bus bars to accommodate simultaneous partitioning of several spans or apply voltage at time-spaced intervals across appropriate spans of a smaller matrix. But whether the user chooses to employ part or all of the various novel circuit structures in practicing the invention, it is not the least advantage thereof that such choices are here made available.

The voltage distributors of FIGS. 8C and 8E are such novel structures. Each uses double-throw, double-pole switches to apply the required voltage between related bus bars.

As a simple example FIG. 8A represents a strip of sheet material 12 units long and having defects in the first and ninth units. Lengths of seven and three units, respectively, are available for partitioning. In the defect switching system shown in FIG. 8B, twelve defect relays 85–1 through 85–12 correspond, respectively, to the units 1 through 12 of the sheet of FIG. 8A. Relay actuators 86–1 through 86–12, shown as simple switches, energize their respective relays when closed by connecting the relay coils across a voltage supply 87. The relay contact pairs may be arranged in either a series or parallel voltage distributing system for energizing the matrix of FIG. 6 in accordance with the reported defect locations.

For the defect pattern of FIG. 8A, switches 86–1 and 86–9 are shown closed in FIG. 8B to energize defect relays 85–1 and 85–9. Switches 86–1 and 86–9 may be, for example, automatically operated by photoelectric cells in a defect scanning circuit or manually operated in response to observation of a defect. In either event the actuated defect relay contact pairs reflect the defect-free spans between them as well as the location of defects on the sheet. While the example is purposely simple to better illustrate complete connections to the small 12-span matrix of FIG. 6, it will be appreciated that voltage switching for much larger matrices subject to more complex defect patterns is advantageously available.

(1) *A series-type voltage distributor.*—The series voltage distributor of FIG. 8C applies a voltage to each clear or defect-free span which is proportional to the length of the span. Twelve defect current voltage sources 88–1 through 88–12 are the unit power supplies for the respective bus bar spans corresponding to unit lengths one through twelve of the sheet of FIG. 8A. Contact pairs *a, b, c, d* of the double-pole, double-throw defect relays 85–1 through 85–12 connect the voltage supplies to each other and to the terminals of the FIG. 6 matrix as dictated by the defect locations. The terminals +1 through +12 and −1 through −11 in FIG. 8C, along with the zero terminal, are the ends of the bus bars of corresponding number in the FIG. 6 matrix. The switching system connects the unit power supplies in series for each defect-free span and through normally closed contact pairs *b, c*. It also connects the positive and negative terminals of the series supply to the respective positive and negative bus bar terminals of the corresponding matrix bus bar span through normally open contact pairs *a, d*. The voltage supplies 88–1 and 88–9 for defect units one and nine are left unconnected.

Looking to the details of the FIG. 8C connection, the defect relay contact pairs in FIG. 8C are horizontally alined with the representation of the corresponding defect relay coil in FIG. 8B for clarity in following the switching operations. Contact pairs *a, b* of each relay are a first single-pole, double-throw switch since they have a common pole or center terminal, and contact pairs *c, d* of each relay are a second single-pole, double-throw switch. Referring to any unit or corresponding switch or voltage supply in terms of the number of units from the bottom of FIGS. 8A, 8B, or 8C as *m*, each *m*th voltage supply in FIG. 8C has its negative terminal connected to the common pole of contact pairs *c, d* of the $m-1$ defect relay and its positive terminal connected to the common pole of contact pairs *a, b* of the $m+1$ defect relay. The end terminals of contact pair *c* of relay *m* and contact pair *b* of relay $m+1$ are connected for series connection of the voltage supplies. The matrix *m*th bus bar connections are from the negative bus end to the end terminal of contact pair *d* of relay *m* and from the positive end to the end terminal of contact pair *a* of relay $m+1$.

End connections at the extremities of the twelve-supply series are simple. Series voltage connections are omitted, so that contact pairs *a* and *b* of defect relay 85–1 and contact pairs *c* and *d* of unit defect relay 85–12 are not used (and hence not shown in FIG. 8C). The positive terminal of the twelfth unit voltage supply is suitably permanently connected to the positive terminal of bus bar 12 and the negative terminal of the first unit voltage supply 88–1 is similarly connected to the zero bus bar without interfering with the selective switching function.

The operation of the voltage distributor in the absence of any defects which result in energizing the defect relays is simple. The twelve voltage sources are simply connected in series between the positive terminal of the twelfth bus bar and the zero bus bar as would be desired, of course, in the absence of span-restricting defects. This may be readily appreciated by the fact that all of the *a* and *d* matrix contact pairs remain open and all of the *b* and *c* series contact pairs closed, leaving the direct connections from the positive terminal of the twelfth voltage supply to the positive terminal of bus bar twelve and from the negative terminal of the first voltage supply to the zero bus bar.

Operation under defect conditions may be appreciated by following the example of FIG. 8A in which the first and ninth units of the sheet material are defective. The circuits of FIGS. 8B and 8C accordingly show defect switches 86–1 and 86–9 closed with the contact pairs of relays 85–1 and 85–9 changed from their normal state. As a result, and as further illustrated by the simplified circuit representation of FIG. 8D, voltages are applied or distributed between two different spans of the matrix. Thus, seven voltage supplies 88–2 through 88–8 are connected in series between the positive terminal of bus bar 8 and the negative terminal bus bar 1. Three voltage supplies 88–10, 88–11, and 88–12 are connected in series between the positive terminal of bus bar twelve and the negative terminal of bus bar nine. The first and ninth voltage supplies are left unconnected.

The flexibility of the voltage distributor in providing direct correspondence between the defect-free spans of the sheet material and the corresponding matrix bus bar for any possible defect pattern will be appreciated. Consecutive operation for the different spans is not required and partitions are simultaneously made in the FIG. 6 matrix. While the read-out from each of the cells of the FIG. 6 matrix may be separately recorded, the resulting read-out arrangement in the circuit of FIG. 7 remains of particular utility in providing a cumulative read-out for all of the simultaneously derived partitions as a total for comparison with that for partition of a different section of sheet material having another defect pattern.

It will be appreciated that large bus bar spans will involve larger voltages, and all the resistors 75, 76 and 77 previously indicated as optionally included in the matrix of FIG. 6 play a helpful role. Thus, if the relays all have a common rating, the resistance of each cell is desirably proportional to the cell span to maintain equal voltages and equal currents in all of the cells in a given current path. With, for example, ten volt sources and relays having 1,000-ohm coils with a rated 10 milliamperes operating current, the resistor 75 of each two-span cell 61 is of the order of 1,000 ohms to limit the current to the rated value at 20 volts. Correspondingly, to maintain the rated conditions for the 3-span and 4-span cells 62 and 63, the respective resistors 76 and 77 are 2,000 and 3,000 ohms.

(2) *A parallel-type voltage distributor.*—Problems associated with the switching of high voltages are eliminated by use of a parallel type of power supply in which the same given voltage is applied to each defect-free span of the matrix. Such a circuit is illustrated in FIG. 8E in which defect relay contacts *a'*, *b'*, *c'* and *d'* are again horizontally alined with their respective defect relays 85–1 through 85–12 of FIG. 8B to clearly indicate the rearrangement of the same switching contacts for parallel operation. Voltage supplies 88–1' to 88–12' represent the twelve supplies for the respective twelve units of the sheet material of FIG. 8A and the bus bar spans of the FIG. 6 matrix. As in FIG. 8C the positive and negative bus bar terminals are also shown.

The contact pairs *a'*, *b'*, *c'*, and *d'* of relays 88–1' through 88–12' are connected differently in the parallel circuit of FIG. 8E than the series circuit of FIG. 8C in order to remove the common potential between bus bars effectively bounding the sides of a defect unit or strip of of voltage supplies *n* and *n*—1 and its normally closed contact pair *b'* connected between the positive terminals of voltage supplies *n* and *n*—1 and its normally closed contact pair *c'* connected between the negative terminals of the same supplies. The connection from the positive terminal of the *n*—1 supply is made to the common pole of the contact pairs *a'* and *b'* of the *n*th relay. The end terminal of normally open contact pair *a'* is connected to the positive terminal of matrix bus bar *n*—1. The negative terminal of supply *n* is connected to the common pole of normally closed contact pairs *c'* and *d'*. The end terminal of normally open contact pair *d'* is connected to the negative terminal of matrix bus bar *n*. End connections for the first and last units are simple. Contact pairs *a'* and *b'* of the first defect relay 88–1' are merely left unconnected, and the end contact of normally closed pair *c'* becomes the minus zero bus bar terminal and no zero power supply is needed. The positive terminal of the twelfth voltage supply is the positive terminal of the twelfth bus bar.

In operation, in the absence of defects, the defect relay contact pairs *a'*, *b'*, *c'*, *d'* in their normal or unenergized condition connect all of the voltage sources in parallel. The source voltage is applied across the matrix from the positive terminal of bus bar 12 to the zero bus bar. Under the defect conditions of FIG. 8A, and with the defect switches and defect relays of FIG. 8B correspondingly actuated, the voltage distribution effected in the FIG. 8E circuit is shown by FIG. 8F. As in the previous case, the control voltage is applied, in correct polarity, between bus bars 8 and 1 and bus bars 12 and 9. The two distributed voltages are the same due to the parallel connection, and no voltage connections are made to the bus bars between which lie defect units one and eight.

With the parallel-connected voltage distributor, the cell relays of the matrix are chosen with wide-range operating characteristics based on a maximum coil current occuring upon application of the matrix voltage across one cell. The same source voltage may be applied to one relay or (in the example delineated by the FIG. 6 matrix) to as many as three relays in series. For larger matrices, the pickup range would be higher, calling for high relay sensitivity or operating current range. For such operation the cell resistors 75, 76 and 77 of FIG. 6 may be made equal to each other or omitted.

For either type of voltage distribution, it may be seen that voltages are applied through a switching system lending itself to automatic application to different spans of the same matrix. Reference to a constant or fixed bus bar becomes unnecessary and, in effect, voltage terminal bus bars are chosen afresh for each partitioning operation.

(D) *Matrix universal cell blocks*

In what is here termed a universal cell block, a relatively simple matrix size switching circuit and small number of diodes can be switched to correctly interconnect the diodes across all the bus bar spans of a partitioning matrix for any selected size span corresponding to a selected one of a set of $a_i$ integers. Such an arrangement offers maximum flexibility and versatility of the matrix for a given number of switches and diodes in terms of matrix rearrangement for different groups of $a_i$ blocks and reassignment of $a_i$ rank.

Looking now to FIG. 9, a universal cell block 89 incorporating a switching arrangement for a matrix having a maximum span of twelve is illustrated. Any $a_i$ span from one to twelve is accommodated with no more than twelve cell or read-out relays and twelve diodes in the block. Larger span matrices are effectively utilized for fully realizing the advantages of the universal cell as well as solving more difficult partitioning problems, the bus bars 90 comprising plus bus bars numbered 0, 1, 2, 3 . . . 12 providing a maximum matrix span equal to that of FIG. 6 and operable by the voltage distributors already shown in connection with FIGS. 8A to 8F.

Each cell of the FIG. 9 matrix (separately shown in FIG. 11), has a series-connected relay 91 and a diode 92. Each cell series combination has its upper terminal connected directly or permanently to one of the bus bars 1 to 12, and for aid in identification the relay coils in FIG. 9 also bear the number of the bus bar which carries them. The lower end of each cell is connected through a multiposition switching arrangement to any one of the lower numbered bus bars.

Twelve universal switching relays 93 are employed. As shown in FIG. 10 the relay coils are connected across a control voltage source 94 through a 12-position selector switch 95. The selector switch positions and the universal switching relay coils 93 connected to the respective switch positions are further numbered 1 through 12. The number of the selector switch position and the universal switching relay coil actuated thereby corresponds to the selected $a_i$ integer or bus bar span rather than to the number of a cell or matrix bus bar. In the example shown, with the selector switch 95 set at its fourth position, the actuation of universal relay 93–4 interconnects each available span of four bus bars in the matrix with the appropriate ones of the 12 cell relays 91 required for the complete connection.

The relatively small total of switching contact pairs 93–*a* of the universal switching relays 93–1 through 93–12 are enclosed within the broken line triangle in FIG. 9 bearing the reference number 93*a*. Each contact pair 93*a* within the triangular configuration bears a further number 1 through 12 corresponding to the identification of the universal relay coil in FIG. 10. The number of switching contact pairs of each universal relay 93 is equal to the number of spans of that size, which is to say it is also equal to the number of cells which must be connected in that block. Universal relay 93–1 accordingly has 12 contact pairs 93*a*–1 respectively connected between the lower terminal of each cell and the bus bar immediately (span difference of one) below it. At the other extreme, since the number of universal cell contact pairs or switches required for a given span varies inversely with the size of the span, only one contact pair 91–*a*–12 is required for a span of 12. There is, of course, only one cell, namely 91–12 which can possibly be connected across the 12-span matrix.

In operation, for any selected span or size, all useful spans of that number within the matrix are interconnected. With the exemplary span of four, the upper nine of the twelve cells are connected, and the cells 91–1, –2 and –3 are left open as desired. The arrangement also lends itself to economical expansion of the total matrix size, particularly for the more difficult problems (i.e., difficult by conventional partitioning calculations) in which larger integers make up the integer set and in which priority or rank is likely to be assigned to the higher integers of a set. Thus, since the integer 1 in a partitioning set would be useful in practical problem solving only where partitions could not be obtained with numbers other than 1, the facilities to accommodate the integer 1 and successively higher integers may be omitted in many cases, thus saving per progressive omission both one cell plus the switch set having the greatest required number of contacts. On the other hand, addition of a higher integer choice requires a relatively small number of switching contact pairs for the added cell involved.

Turning now to the rank and read-out means of the universal cell block of FIG. 9 for whatever $a_i$ integer has been selected, each cell relay 91 has a normally closed contact pair 91*a* and a normally open contact pair 91*b* (also indicated in FIG. 11). The rank or priority switching contacts 91*a* are connected in the bus bar carrying that cell relay.

As shown in FIG. 9 each such normally closed contact pair 91*a*–1 to 91*a*–12 is connected to interrupt bus bar 1 to 12 respectively to the left of the connection of the cell to the bus bar. Current flow through any of the cell relays thus results in interrupting the voltage supply connections of the same-numbered bus bar to the next $a_i$ block. While in FIG. 9 the left hand ends of a bus bar 90 are indicated with negative plurality as for return to the negative side of the voltage supply, it will be appreciated the next ranking $a_i$ block may be inserted there instead.

A simple circuit for indicating the number of relays actuated in any selector switch position (which is the occurrence of the selected $a_i$ integer involved in a given partition) is shown in FIG. 10 in which a galvanometer 96 or other indicating or control instrument is connected across the control voltage source 94 through multiple possible paths. Each such path may suitably consist of a read-out resistor 97 and one of the normally open contact pairs 91*b*–1 through 91*b*–12 of the 12 bus bar cell relays. The current flow may thus be made to vary with the number of contacts 91*b* which are closed, indicating both the presence of the selected $a_i$ block integer in a partition and also the times that integer is present. With $a_i$ set at four and a voltage applied between the positive terminal of the twelfth bus bar and the zero bus bar, cell relays 91–12, 91–8, and 91–4 would complete the circuit. Accordingly, since the relays are current responsive, the rank contact pairs 91*a*–12, –8, and –4 would be open to remove potential from bus bars 12, 8 and 4 to the left of the cells, and contact pairs 91*b*–4, –8 and –12 would connect the galvanometer across the voltage supply 94 through three read-out resistors 97 connected in parallel.

Several such universal cell blocks are readily connected in one matrix as illustrated by FIG. 12 where three such universal cell blocks 89′, 89″, and 89‴ are employed. With their respective selector switches set for integers 4, 3 and 2, reading from right to left, the matrix connections of the FIG. 6 circuit are duplicated.

The fact that as many universal cell blocks as there are $a_i$ integers in the partioning set can be accommodated in a matrix without rendering more complicated either the cell blocks or their interconnection has real and significant advantages. Economy and simplicity of circuit structure, as well as compactness and convenience, are provided where a single installation must be programmed for various problems. Even if the priority switches were not required, or (more likely) if the rank were always from the highest number to the lowest, twelve fixed span blocks of cells with their block disconnecting switches would be required for a three-integer set of the range of choice provided by the three universal cell blocks in the FIG. 12 matrix. Further, where rank must remain variable, the number of fixed-span blocks would be approximately multiplied by 12. In the FIG. 12 matrix, however, if the order of priority were to be 3, 4, 2 (or any sequence out of downward numerical order such as 10, 11, 12) it is not required to reconnect the different universal cell blocks in a different sequence, and the same three universal blocks suffice.

(E) *The parallel-return dual matrix*

The same selective partitioning operation previously described may also be provided by what is termed a parallel-return matrix. Such a matrix is designed to operate each read-out relay coil involved in any partition with the same relay voltage. Unlike the permissive matrix illustrated in FIG. 5, the read-out relays need not be connected to the same zero or reference bus bar in order that all of the relays involved operate in parallel with respect to a voltage source. And unlike the matrix of FIG. 6, the read-out relays are not placed in various series-parallel combinations for different partitioning solutions, even though all of the functions of the selective matrix remain available.

(1) *Dual matrix with pre-selected $a_i$ blocks.*—For an understanding of the operation of the parallel-return matrix and the modifications of its structure for various types of installations, reference is made to the selective or command decision partioning matrix illustrated in FIG. 13. This matrix shown has a span of twelve with two cell blocks shown connected for $a_i$ values of 4 and 3 respectively and in that order or priority in rank. A matrix of such dimensions is directly comparable with that of FIG. 6. The matrix operates as if each of the read-out relays had one terminal connected to a common or ground return without interconnecting the matrix bus bars except through the desired partitioning paths.

This parallel operation of the read-out relays may be easily perceived by portrayal of the circuit as a dual matrix, having, as shown in FIG. 13, an upper matrix 100 (which may be called the positive matrix), and a lower matrix 101 (called the negative matrix). Referring first to the upper matrix, a set of numbered bus bars 102 numbered 1 to 12 are provided. With rank in this case reading from left to right, a positive voltage supply connection is made to the left-hand end of one of the bus bars. The cells 103 interconnecting conductors or bus bars 102 differing in number by four represent a cell block for $a_1=4$. To the right of this cell block and beyond the priority disconnect switches 108$a$–4 to 108$a$–12 are lower priority conductor extensions 102'. Cells 104 interconnect each pair of bus bars 102' separated in number by three, representing a cell block for $a_1=3$. Successively lower rank blocks may extend as required to the right, starting with bus bar +1'' to +12''. If, for example, a voltage were applied between bus bar terminals +12 and +1 (representing an A-span of 11), low impedence (essentially short-circuit) current paths would be traced by the three permutations of the single partition available (namely, 4–4–3, 4–3–4, or 3–4–4).

As further shown in FIG. 13, the lower or negative matrix 101 has a set of conductors or bus bars 105 numbered 1 through 12 plus a zero bus bar. To one of these is connected the negative terminal of a voltage source. The cell connections duplicate those of the upper or positive matrix. Sets of diodes 106 and 107 span negative bus bars spaced four and three in number respectively. The negative bus bars are continuous and need not be interrupted by priority or rank disconnecting switches. A voltage applied between a given pair of negative bus bars would generate the same combination of essentially short-circuit current paths through the respective cells 106 and 107 as would occur through corresponding cells 103 and 104 if the voltage were applied between similarly numbered conductors in the upper matrix.

Means responsive to current flow through each link or cell involved in a partioning circuit such as the coils of relays 108 and 109 cross link the upper and lower matrices. Each useful $a_1$ span between a given numbered cross bar in the upper matrix and a bus bar of lower number in the lower matrix is linked by such a priority or read-out relay. Thus for the left hand cell block ($a_1=4$) in FIG. 13, each pair of positive and negative bus bars having a difference in number equal to 4 are linked by a priority or read-out relay 108. The same circuit connection may be expressed by stating that the upper terminal of each read-out span or link is connected to an upper terminal of each matrix cell or diode in the positive matrix while the lower terminal of each read-out span is connected to a lower terminal of the corresponding cell in the negative matrix. For the right hand block, the read-out relays 109 likewise span positive bus bars 102' and negative bus bars 104 differing in number by three. In each case, for convenience of identification, the relay link is identified by the number of the positive bus bar to which it is connected, i.e., 108–4, 109–12.

Since the composite matrix thus illustrated is of a selective or command decision type, a pair of normally closed contacts of each such read-out relay is inserted in the positive bus bar to the right of the read-out span connection to that bus bar. Contact pairs 108$a$–4 through 108$a$–12 are accordingly shown at the right hand end of bus bars 102; contacts pair 109$a$–3 to 109$a$–12 are shown at the right hand ends of bus bars 102'. For serving further indication or control functions, each relay may be provided with another pair or other pairs of contacts (not shown).

With the circuit configuration shown, and despite the absence of any substantial voltage drop across the diodes in the forward polarity, full voltage is applied across only the read-out relays properly representative of elements present in a partition. As a precaution to prevent return paths which would place relay coils in series with each other, a diode 110 is inserted in series with each read-out relay and is poled for positive current flow from the upper matrix to the lower one.

In operation, with one of the upper matrix bus bars at a positive potential with respect to one of the lower matrix bus bars, the total number to be partitioned is established by the difference in the numbers of the two connected bars. For example, with the voltage distributor of FIGS. 8C and 8E or other voltage source connected between the +12 and −1 terminals, the problem programmed is partitioning of 11 by partitioning elements 4, 3 and in that rank. The solution is 4–4–3, as indicated by current through relays 108–12, 108–8, and 109–4. Before any of the normally closed priority or rank disconnecting contact pairs of these relays are opened, current also flows through the relays involved in lower priority solutions. In this case, only one partitioning solution is possible, but redundant paths involved in permutations 4–3–4 and 3–4–4 are eliminated when the priority switches open.

The reasons for the particular circuit connections, as well as the operation itself, can be more readily visualized by tracing out the current paths involved in the ranking 4–4–3 solution to the problem. These current paths from bus bar +12 to bus bar −1 are:

(1) From bus bar +12 through relay 108–12 to bus bar −8; thence either (a) through a diode 106 to bus bar −4 and through a diode 107 to bus bar −1, or (b) through a diode 107 to bus bar −5 and through a diode 106 to bus bar −1;

(2) From bus bar +12 through a diode 103 to bus bar +8, through relay 108–8 to bus bar −4, and through a diode 106 to bus bar −1; and (3) From bus bar +12 through a diode 103 to bus bar +8 through a diode 103 to bus bar +4, and through relay 109–4 to bus bar −1.

The other initially existing paths are opened by the opening of read-out relay contact pairs 108$a$–12, 108$a$–8, and (for any lower rank cells to the right of bars 102') 109$a$–4. Analyzing the operation, the various paths through two 4-span and one 3-span diode cells which would be defined between a span of 11 in a single matrix are divided between the two matrices with a read-out cross-link between them automatically substituted for one of the diodes in each path.

Any available partitioning of any other number within the matrix span is similarly provided. Obviously, since the diodes themselves offer very little resistance, the number of bus bars in each component matrix can be very greatly increased. Thus even if there are ten partitioning element numbers involved in any partition, the ten relays energized are operated in parallel and not in series. It will be appreciated that even if relays operating over such a wide range were conveniently available, delicate adjustments to assure proper operation during the dynamic phase of the operation (when the relays are closing and opening their respective contacts leading to the elimination of alternative or redundant paths) are made unnecessary.

It will be appreciated of course that in referring to the matrix components as upper or lower or the bus bars as bearing certain numbers, the terms have been employed as a matter of convenience for the reader following the structural principles and operation involved. As in the matrix structures previously described, it is understood that the circuit relationships and not the physical configuration or location of the conductors or other components in the wired versions of the circuit governs the definition of the matrix geometry.

At this point it may also be better appreciated that under particular conditions, certain bus bar spans are not usefully interconnected by diodes. In no case need a zero bus bar be employed in the upper matrix, although it may be wired in without affecting matrix operation if exact symmetry for upper and lower matrices facilitates wiring and maintenance on particular testing circuits. Any such path as, for example, from bus bar +4 to a bus bar zero in the upper matrix offers no possibility of continuation to a lower numbered bus bar in the lower matrix or completion of a useful path. With the particular $a_1$ values of 4 and 3 as illustrated, wiring of diode connections to bus bars —10, —11, and —12 in the lower matrix can be omitted since these bus bars differ from the highest number positive bus bar by a number less than the smallest partition element ($a_1+3$). For the general case, however, where the bus bars illustrated represent any sequence within a larger matrix, and for flexibility and versatility in case of addition of other cell blocks to the matrix, the full connections are desirable as illustrated.

(2) *Dual matrix with universal cell blocks.*—Parallel return dual matrices constructed for S-fitting in glass area partitioning have profitably incorporated universal cell block switching. FIGURE 14 illustrates a 12-span matrix having the universal switching relay of a single cell block energized for an $a_1$ of 4. Direct comparison with the similarly dimensioned cell blocks of the FIG. 6 and FIG. 13 matrices illustrates that the matrix logic and operation are the same despite the different appearance of the FIG. 14 matrix. For convenience in following the description, the same reference numerals employed in FIG. 13 have been applied to corresponding components of the FIG. 14 matrix. Auxiliary to FIG. 14, FIG. 15 particularly identifies one of the twelve similar relay subassemblies incorporated in the matrix, and FIG. 16 illustrates the universal switching relays.

Referring now to FIG. 14, a set of twelve numbered positive bus bars 102 is shown in horizontal array with their left hand ends (+1, +2, +3 . . . +12) as input terminals. Negative bus bars 105 (—0, —1, —2 . . . —12 are shown in vertical array in the matrix and are continued horizontally above the matrix (conveniently as a cable 111) to also serve as the negative return conductors for whatever lower ranking matrix cell blocks may be connected to terminals +1′, +2′, +3′ . . . +12′ to the right of the illustrated matrix block. A voltage source 112, suitably the parallel voltage distributor of FIGS. 8E and 8F is by way of example shown as connected across the entire matrix span between bus bars +12 and —0. With an A of 12 and an $a_1$ of 4, the selective partitioning solution is 4–4–4. The operation of the matrix to effect this result will become apparent as the description proceeds.

The matrix relay and diode components and connections other than those provided by the universal cell block switching arrangement are conveniently grouped as twelve subassemblies 113, one of which is outlined by a broken-line rectangle in FIG. 14 and separately shown and identified in FIG. 15. In FIG. 15 priority or read-out relay 108–*n* represents any one of the read-out relays 108–4 through 108–12 connected in circuit for $a_1$=4 (it also being the number of the number of the positive bus bar to which the readout relay link is connected). The diode 110 in series with each relay coil prevents series paths through several coils as previously mentioned. Normally closed contact pair 108*a*–*n* continues bus +*n* as bus +*n*′ to the next ranking matrix cell block. An additional contact 108*b*–*n* in FIG. 15 (not shown in FIG. 14) is available for control or indicating purposes. Positive matrix cell diode 103 connects bus bar +*n* to bus bar +(*n*–4); the negative terminal of the relay 108–*n* is connected to bus bar —(*n*–4). The negative matrix diode 106 connected to the negative terminal of each relay 108*n* is not part of any current path through relay 108*n* (its polarity opposes that of diode 110), and its positive terminal is connected to negative bus bar *n*–4.

The universal cell block switching arrangement by which the subassemblies 113 are connected to the prescribed dual matrix bus bars has its control circuit shown in FIG. 16.

Universal switching relays 115–3 through 115–12 provide switching contacts for selecting the connections of both the diodes and the relay coil of the subassemblies 113 for any one of $a_1$=3 through $a_1$=12. The desired one of series switches 116–3 through 116–12 is accordingly closed to place an energizing power source 117 across the selected size switching relay.

The multiple normally-open contact pairs of the switching relays 115*n* connections are described in the preceding subsection directed to the matrix universal cell blocks. Since similar positive and negative component matrices are required in a dual matrix the number of contact pairs required is doubled. Only a minor departure from connections required for the component matrix is involved since the zero bus bar of the positive matrix and cell connections to it are not necessary and are simply omitted in the positive matrix of FIG. 14. A first block of normally open contact pairs or switches 115*a* enclosed in a broken line triangle in FIG. 14 illustrate the switch connection of the lower (negative) terminal of the positive matrix diodes 103 to the positive bus bars 102 (lower connection of each switch). Similarly a second block of normally open contacts 115*b*, also shown in a broken line triangle, connects the lower (negative) terminals of the negative matrix diodes 106 to the negative bus bars 105.

Referring specifically to the connections of multiple contact pairs 115*a*–4 and 115*b*–4, these contacts are closed to define an $a_1$=4 cell block by the activation of relay 115–4 is indicated in FIG. 16. Thus the eight contact pairs 115*a*–4 span through diodes 103 all positive bus bar spans separated in number by four. Likewise the nine contact pairs 115*b*–4 span through diodes 106 all negative bus bar spans separated in number by four. The read-out spans consisting of each priority or read-out relay 108–4 through 108–12 plus its series path prevention diode 110 are each thereby connected between positive and negative bus bars differing in number by four to duplicate the FIG. 14 connections for the $a_1$=4 cell block. Relay 108–3, it may be noted, is not connected into the matrix but would be used if switching relay 115–3 were energized as when $a_1$=3.

With the matrix programmed for partitioning of $A$=12 by $a_1$=4, as shown in FIG. 14, the current paths through the matrix are shown by heavy lines. Positive bus bars 12, 8 and 4 place the same source potential with respect to the negative zero bus bar across the read-out relays 108–12, 108–8, and 108–4, respectively. Negative return paths are respectively provided by negative bus bars 8, 4, and 0 respectively. While only the zero bus bar is directly connected to the negative voltage supply terminal, negative bus bar 8 is connected through a diode 106 to negative bus bar 4, and negative bus bar 4 is connected through a diode 106 to negative bus bar 0. Each current path includes but one read-out relay for applied voltage of the indicated polarity, as desired for effective paralleled energization of the read-out relays. The normally closed switch contact pairs 108*a*–4, 108*a*–8 and 108*a*–12 of the three energized relays are opened to deenergize lower rank matrix connections to positive bus bars 4′, 8′ and 12′. The presence and location of the $a_1$=4 spans or numbers may also be indicated by closing of their respective 108*b* contact pairs (shown only in FIG. 15). The simple example here is selected to illustrate the operation of a dual matrix with but the one cell block shown; all the advantages of selective partitioning with a plurality of element numbers and any chosen rank are available.

(F) *Automatic reprogramming*

In a partitioning problem solution there are no remainders since partitioning by definition calls for the partitioned number to be the exact sum of the partitioning elements. In practical application, however, if the number A representing a quantity to be divided or cut is not partitionable by the given $a_1$ elements, it may be desirable to accept a small remainder. The method of reaching an acceptable solution described in this subsection is to reprogram the problem when an A is found non-partitionable by reducing the number A by one and again attempting the partitioning, these steps being repeated until a partitioning solution is possible. The eliminated remainder may, for example, represent the discarded difference between the defect-free available span and the largest length which can be partitioned.

The waste of material represented by the remainders is still usually preferred to whatever solutions are available by changing the $a_i$ elements and without changing the A value. Thus at first blush it might appear that an $a_i$ block of 1 could instead be added to a matrix. So long as the number 1 is one of the partition elements, of course, any integer could be partitioned. Generally speaking, such solutions are spurious or frivolous. They are also of dubious practical significance in sheet material partitioning in which even the smallest useful $a_i$ values are integral multiples of a minimum unit corresponding to the defect square dimension. For example, if an A of 35 were to be partitioned by a set of $a_i$ elements of number and rank 20, 17, and 1, the solution as partitioned by a selective or command matrix would be 20–1–1–1–1–1–1 1–1–1–1–1–1–1–1–1 (one 20 and fifteen 1's). The solution would be wasteful if, in the physical counterpart, the $a_i$=1 element is not useful. If the set of $a_i$ integers is instead kept at useful values of 20 and 17 in that order of rank and the A is reduced by 1 to 34, the solution by a selective matrix is 17–17. Put in general terms, given a set of $a_i$ elements, and any arbitrarily chosen number, the largest partitionable integer A within the chosen number is found by successively decreasing the number by one, as partitions are attempted, until a partitionable A is reached.

The apparatus described below automatically performs the reprogramming process by incorporation of what are called unit remainder eliminator circuits.

Referring now to FIG. 17, input and output connections are illustrated for a 12-span selective matrix of the type previously described in FIG. 14. The positive terminals 120 numbered +1 through +12 at the right hand end of the drawing represent the connections to the highest ranking matrix bus bars 102 of similar number on FIG. 14. The array arrangement of negative conductors 121 numbered 0, and 1 through 12 ending at the right hand end of the drawing are continuations of the return conductors 111 from the negative side of the FIGURE 16 dual matrix. However, the parallel-type voltage distributor 112 is not connected directly between the positive and negative bus bar terminals as shown in FIG. 14. While the negative terminals −1 through −12 of the distributor are also those of the negative bus bars, the positive terminals of the distributor are termed +1 through +12. Instead, as shown in FIG. 17, a set of 12 defect relays 123–1 through 123–12 are selectively operated by closing of one or more switches 124–1 through 124–12 to control the parallel-type voltage distributor by means of normally open contact pairs *a* and *d* and normally closed pairs *c* and *d* of each delay and which provide a double-throw, double-pole switching action for each relay. The switch arrangement shown is that previously illustrated and described in connection with FIGS. 8B and 8E, except that the relays preferably have additional contact pairs for use in a read-out circuit as later described.

Unit remainder eliminator relays 125–1 through 125–12 are in effect interposed between the voltage distributor and the matrix positive terminals 120. As shown, each relay **125–*n* is connected in series with a diode 126** between the positive voltage distributor terminal D*n* and the negative voltage distributor terminal of same *n* number and poled for positive current flow. A normally open contact *a* of each remainder relay 125 is inserted in series between each terminal D1 through D12 and the corresponding positive bus bar terminal +1 through +12 so that voltage distributor connections are not made to the positive bus bars until the representative remainder relay involved has been energized. A diode 127 is also connected between each contact pair **125*a* and the corresponding positive terminal 120 to block any possible positive current flow from a positive matrix terminal through a pair 125*a* when closed. A second contact 125*b*** of each remainder relay is normally closed and connected between each terminal D*n* and the next lower distributor terminal D(*n*−1). A diode 128 in series with each contact part **125*b*–1 through 125*b*–12** is poled for positive current flow only from higher numbered to lower numbered bus bars.

In operation when the voltage distributor applies a voltage between, for example, +D12 and −0, no voltage can be applied to positive bus bar 12 until relay 125–12 has been energized. If any partition of 12 is available as, for example, when the first $a_i$ block is connected for an $a_i$ of 4 (the particular example described in connection with FIG. 14), a path for energizing remainder relay 125–12 is provided, in the negative component matrix of the dual matrix of FIG. 14. Thus the current path may be traced from the voltage distributor terminal D12 through a diode 126 and the coil of relay 125–12, thence through negative bus bar −12 into the negative matrix, and (FIG. 14) through a diode 106 to the negative bus bar −8, through another diode 106 to negative bus bar −4 and finally through a third diode 106 to negative bus bar 0, which is the other terminal of the voltage distributor. The path through the negative matrix is that traced in heavy outline in FIG. 14.

So long as any partition is available through the low-impedance (essentially short circuit) paths provided by matrix diode cells, there is no remainder to be eliminated and the A-integer need not be changed. Accordingly, contact *a* of relay 125–12 (i.e., contact **125*a*–12) closes to apply distributor voltage across the 12-span dual matrix by connecting terminal D12 to the positive bar 12 of bus bars 120 as desired. The priority relays 108–12, 108–8, and 108–4** in the FIG. 14 matrix are thereupon energized as dictated by the matrix logic and their priority contact pairs *b* open the lower-rank extensions of the energized bus bars in the positive component matrix.

However, and it is here that the unit remainder relays perform their unique reprogramming function, there are many instances where the problem set up according to the random occurrence of defects establishes an unpartitionable value of A with the $a_i$ elements present in the matrix. One occurs when the A-span is larger than the smallest $a_i$. They may be established in two classes—when the unpartitionable A is (1) larger or (2) smaller than the smallest $a_i$ in the partitioning element set. The other is simply that the available A-span is smaller than the minimum $a_i$ in the matrix. Both can be illustrated with the simple 12-span matrix of FIG. 14 as provided with a single cell block in which $a_i$=4.

For the too-large A-span, there is always a solution, namely the limiting case where A is reduced to $a_i$. If this is the only partition available, the unit remainder circuit operation seeks it out. But the step-down or unit remainder eliminator action always stops at the higher partitionable A-span as desired. For example, if a defect were present only in the first strip or square of the 12-unit span, an A-span of 11 is established. The voltage distributor then applies a relay operating voltage between terminals D12 and −1 (FIG. 17). No path from terminal D12 exists except through normally closed remainder relay contacts **125*b*–12, 125*b*–11 and 125*b*–10 to terminal D9. Since a path exists through the 8-span negative matrix of FIG. 14 between bus bars −9 and −1 (two $a_i$ links of 4), remainder relay 125–9 is energized and voltage would be applied to bus bar +9 for operation of the matrix priority relays 108–9 and 108–5 (FIG. 14). No voltage is applied to bus bars +12, +11, or +10 since remainder relays 125–12, 125–11, and 125–10 are not energized. Units 10, 11, and 12** are 3-unit remainders subtracted one-by-one from the initial A of 11 to arrive at a partitionable value of 8.

For the too-small A-span, the problem programmed is effectively withdrawn by stepping down the A number until it is eliminated. In physical fitting problems a remainder can be cut from a too-long piece element but cannot be added to a too-short piece. For example, an A of 3 is established between voltage distributor terminals D12 and −9 for a defect existing in the ninth unit strip or square. (This is also the voltage distribution illustrative example in FIGS. 8A, 8E, and 8F.) In partitioning sheet material, the strips represented by squares 9, 10, and 11 (in addition to defect strip 12) are discards or waste. No path through the $a_i=4$ links in the negative matrix (FIG. 14) could possibly exist. Relay 125–12 is not energized; neither, in turn, are relays 125–11 nor 125–10. Relay 125–9, as the lowest relay in the A-span, is energized when the positive voltage is stepped down to terminal D9 through the normally closed *b* contact pairs of these relays, but no bus bar span remains to be energized.

If desired, contact pairs from the remainder relays and the matrix priority relays may be variously employed to identify which integers or which unit strips are involved in partitioned A-spans. A complete and convenient read-out circuit is described in the next subsection.

(G) *Automatic read-out system*

An automatic system is described in this subsection for transposing the identification of numbers involved in partitions into specific instructions for cutting sheet material in an automatic system. Such a system is especially desirable where the A-span is automatically programmed according to defect locations without regard to the availability of a partitioning solution. Performance of three functions is here described—(1) marking the boundaries of the partitioned spans, (2) marking the boundaries of each defect unit, and (3) additionally marking the boundaries of each remainder unit.

(1) *Marker relay circuits.*—Boundaries of each partition are indicated by marker relays 129–1 through 129–12. As shown in FIG. 17, each relay is connected between positive and negative bus bar terminals of the same number in series with a diode 130. Each diode permits relay-energizing current flow when its positive bar is at a positive potential to the negative one. It will be appreciated that the marker relay connections are the same as if they were shown interconnecting positive and negative matrix bus bars of the same number in the representations of the dual matrix in either FIG. 13 or 14. Accordingly, for each path in the positive and negative matrices through a matrix priority relay 108, a path also exists through the matrix marker relay 129 connected to the same positive bus bar as the priority relay. Since only the positive bus bars in the highest rank partition are energized in a multiple $a_i$-block matrix, marker relays are not required in each matrix cell block. One marker relay for each positive bus bar is sufficient for selective partitioning read-out, and the usually inconvenient collection of read-out contacts from each priority relay in each cell block of a typical matrix is unnecessary.

The marker relay system also additionally marks, through its contact pairs, the lowermost positive bus bar in a partition. For example, employing the matrix of FIG. 14, as programmed for $a_i=4$, in the absence of defects the voltage of the distributor is automatically connected between positive terminal D12 and negative bus bar 12 in FIG. 17. As previously described, remainder relay 125–12 is energized through a negative matrix path and voltage is applied to positive bus bar 12. Marker relay 129–12 is accordingly energized in parallel with remainder relay 125–12. Since positive bus bars 8, 4 are also each energized with respect to the negative zero bus bar, the corresponding marker relays 129–8, 129–4 are also energized. All bus bar numbers bounding and dividing the three lengths in the partition are indicated by operation of contact pairs of the marker relays.

The operation of the automatic remainder relays to eliminate a programmed A-span too small to partition always results in energizing the lowermost remainder relay 125 in the span. This results, of course, in the closing of its *a* set of contacts and the energizing of the same-number marker relay. This number is, of course, that of a bus bar bounding the upper boundary of a defect strip as well as the lower boundary of a remainder strip, and the energized marker relay thus marks the lower boundary of a remainder strip.

It will be appreciated that the various diodes 127, 128, and 130 isolate the remainder and marker circuits with respect to each other and the dual matrix so far as unwanted or reverse paths are concerned.

(2) *Read-out circuits employing marker and defect relay contacts.*—As particularly shown in FIG. 18, cutting read-out relays 131 are selectively energized from any suitable energizing voltage bus 132 by the operation of relay contact pairs *e, f* of the respective defect switches 123 and contact pairs *a, b,* of the marker relays 129. Each read-out relay 131–1 through 131–12 suitably actuates through one or more relay contact pairs one of a bank of slit cutters each located at a unit boundary or other indicator or control means. In this instance the relay sequence number corresponds to the bus bars. Thus to cut out the sixth defect square, relays 131–5 and 131–6 must be actuated; to divide the partition elements bounding the sixth bus bar, relay 131–6 is energized.

As further shown, each relay 131–*n* is operated by placing a potential across it with respect to its common or ground return connection. A normally open contact pair 129*a–n* of each marker relay closes a read-out relay energizing circuit when the marker relay itself is closed.

In order to cut out the remainder and defect strips unit by unit, a chain or ladder connection of additional marker defect relay contact pairs closes each read-out relays in unenergized bus bar spans not bounded by bus bars for which marker relays are energized. For this purpose each read-out relay coil 131–*n* is also connected in the energizing circuits of each adjacent read-out relay coil higher and lower in number through normally closed marker relay contact pairs 129*b–n* and 129*c–n,* respectively. The contact pairs *b* and *c* of adjacent-number marker relays are not connected directly in series but instead are linked through a normally closed contact *e* of the higher-number bus bar defect relay 123. In the event that defect relay is closed, indicating the marker relays bound a defect strip, an alternate path for energizing the lower-number read-out relay is provided by additional connection of each marker relay contact pair *b* to the energizing voltage source through the closed (normally open) defect relay contact pair *f.* Read-out relay 131–12 is connected through marker relay normally closed contact pair 129–12*b* (i.e., 129*b*–12) directly to the relay energizing bus 132. This simulates a closed defect relay for a next higher (thirteenth) bus.

In operation, if no marker relays are energized to indicate the boundaries of partitions, the marker relay normally closed contact pairs *b* and *c* remain closed and each of the read-out relays 131–1 through 131–12 is energized. Translated as cutting instructions, a 12-unit strip of glass is to be cut, or, to be marked for cutting, into 12 strips. The energizing of adjacent-number read-out relays 131 is readily distinguished as not representing the energizing of adjacent number bus bars through $a_i$ cell links. Since $a_i$ values of one are normally waste, the unit length cuts are obviously recognizable and rejected.

Following through the example previously mentioned (see FIG. 8A) where defects occur in the first and ninth squares, and with the 12-span matrix system of FIGS. 17 and 14 programmed only for $a_i=4$, partitions are limited to a single span of four, and the remainder of the sheet should be chopped into unit lengths. Such a read-out is provided. The automatic reprogramming provided by the remainder relays causes marker relays 129–1 and 129–5 to be energized. Marker relay contacts 129*a*–1 and 129*a*–5 close to energize read-out relays 131–1 and 131–5. The opening of the normally closed marker relay contact pairs 129–5b and c cuts read-out relays 131–1 through 131–5 out of the energized chain. It will be noted that the closing of the tenth unit defect relay 123–10 does not interrupt the chain of actuated read-out relays 131–12 down through 131–5.

While marker relay 129–9, representing the lowest bus bar in an initially programmed A-span, is energized to directly cause read-out relay to 131–9 to be actuated and open the chain of normally-closed marker relay contacts, the closing of defect relay contact pair 123f–9 assures the actuation of read-out relay 131–8 (the lower cut or boundary for the ninth unit) whether or not marker relay 129–8 is energized.

III.—A PARTITIONING COMPUTER

(A) *Computer overall system and functions*

(1) *Exemplary production requirements and equipment considerations.*—In accordance with further aspects of the invention, a computer employing partitioning matrices is here described. The computer incorporates, for glass Z x S or area partitioning, the Z at a time, two-cut logic previously described. The computer size and complexity is to a large extent governed by the number of choices which must be considered and the speed with which a command must be issued. In the illustrated case, the total demand program accommodates the output of a large glass factory with twenty trial Z steps, each offering the choice of Z size, six S sizes, a rank for each S, two passing quality grades (mirror and glazing), and S value independent of rank or size. Defects are located by rectangular coordinates, the unit dimension of the coordinates in this case being two inches. The glass Z by S sizes may be a minimum of 9 by 6 units to the full sheet size of 90 by 62 units as shown in FIG. 2. A glass line speed in the vicinity of 200 inches per minute is reliably accommodated.

In the particular computer about to be described, the decision-making process is sufficiently rapid to allow sequential reuse of the same computer components in making the Z and S trial partitions for each of the programmed Z lengths. Recourse to the many step arithmetic processes required for solution of partitioning problems by general purpose electronic digital computers is eliminated and sufficient speed is obtained although relatively slow but inexpensive and reliable electrical solenoid relays of conventional types are employed throughout. The ultimate decision is reached after 20 trials within the few seconds during which the glass has advanced from the transverse cutting station by a distance less than the minimum Z size. The general arrangement and system as in the computer here described may also utilize stored partitioning solutions instead of freshly recomputing each intermediate step problem posed. However, the vast storage and read-out requirements associated with the possible number of partitions here involved are avoided by employing permissive and selective partitioning matrices previously described. Indeed, a great number of modifications to fit various installation requirements can be made without departing from the broader aspects of the invention as will become evident to one skilled in the art, in reading the following detailed description of a full scale working embodiment.

(2) *Timing clock.*—FIG. 19, as a block diagram of the exemplary computer system, illustrates component portions and to some extent indicates their functional relationship and sequence of operation.

The computer clock 135 and trial stepper 136 of FIG. 19 time and order the different operations during each computer cycle. The clock as such provides trains of timed impulses synchronized with the defect record, the glass conveyor, and the location of the glass sheets on the conveyor as well as their successive leading edges as cutting decisions are made.

(3) *Trial stepper.*—The stepper, timed by the clock, establishes a series of 20 trials after which a selected trial is repeated as a 21st trial. During the 21st trial, the computations for the selected Z trial length are repeated, the results are accumulated or issued as commands, or both, and the apparatus is reset to complete the computer cycle for the next 20 trials with respect to a new leading edge. In this instance, 20 electrical channels are sequentially energized by the trial stepper, in this manner providing an energizing voltage source for the particular sizes, values, and locations associated with each of the 20 trials. The channel corresponding to the selected Z trial is energized by the trial stepper during the 21st trial. The principal connection supplying output information from the clock is to the trial stepper and from the trial stepper to the Z program panel 137. The chosen trial is fed back to the stepper as indicated by the dashed line so that the proper channel can be energized during the 21st or command step. Various connections from the clock and stepper circuits to elements of the other computer component circuits are not shown in the FIG. 19 block diagram in the interest of clarity, but are explained in the detailed description of the component circuits involved.

(4) *Demand program.*—The Z program panel 137 and the S per Z program panel 138 together define the size aspect of the computer demand program. A value is assigned to each programmed Z by S size in a value program panel 139. This information, together with the quality or grade choice, completes the demand program. The 20 trial channels sequentially energized by the stepper 136 are connected by the programming of the computer to the selected individual size and value circuits.

Thus the Z program panel 137 connects the Z circuits representing Z lengths to the trial channels and in the desired trial order. The S per Z program panel 138 connects six S-size circuits to each programmed Z. So long as a programmed Z size is contained in any possible partition of the available length of the sheet being partitioned, the stepper voltage is applied to the S-size circuits programmed with the Z-size. Each of the progarmmed S's is in turn associated with a particular value voltage level. Values are thus established for the programmed Z by S sizes involved during each Z trial.

(5) *Defect information.*—The other portion of the computer input program is the defect information. A defect detection and storage system 140 contains the defect location coordinate for each defective unit square. This information must be related to the leading edge of the glass, and to each new leading edge established by each chosen Z cut or stored cutting decision. One such system meeting the time and timing requirements for the on-line production condition outlined above is disclosed in copending application S.N. 950,460, filed Nov. 2, 1959, by William F. Galey and George W. Misson now Patent Number 3,191,857, and assigned to the assignee of the present invention. Whatever the storage system employed, defect interrogator 141 reads out the S-coordinates of the defects occurring in each trial Z as measured from the leading edge of the glass. The interrogating signal is supplied from the stepper through the Z program panel 137.

A particularly convenient and simple arrangement for programming more than one useful grade or quality is suitably provided by interrogating during each trial a pre-selected one of separate defect storage records each defining, for the grade involved, the areas for which it is defect free. Thus, for example, a mirror storage record locates as defects all unit squares unacceptable for mirror grade and a glazing quality defect storage record locates as defects the usually lesser number of squares unacceptable for glazing grade (and usually remelted as cullet glass).

(6) *Partitioning matrix and input automation.*—The two portions of the computer input program pertinent to each trial step, i.e. the (1) demand program and (2) defect information are supplied to a selective partitioning matrix 142 for fitting the S lengths programmed for each trial step into the defect free spans available for the Z-length and quality grade being considered. The matrix has six ranked blocks of cells to accommodate the six S sizes per Z and provide a selective read-out for each defect-free bus bar span.

Read-in or input switching circuits automatically translate both the size program and the demand information of each step to commands for reconnecting and energizing the matrix. Size switching for each of the blocks of cells is dictated for each trial step by the signals transmitted from the S per Z program panel 138. Also during each step, S-defect location signals from the defect interrogator 141 determine the S-matrix bus bar spans across which S matrix voltage distributor 143 applies matrix voltage sources. A unit remainder eliminator circuit 144 as an adjunct of the S-matrix reprograms the voltage source connections to defect-free matrix bus bar spans which are not partitionable by progressively reducing the energized span.

(7) *Partition value comparator.*—A value comparator system 145 matches each S-partition element readout of the S matrix 142 with the value voltage for that S size as supplied from the value program panel 139 and sums the value voltages for each step. Since the sets of S partition elements and values generated during a trial step are related to the Z size through the Z program panel, each value voltage sum is a Z x S value total for a tentative Z cut with respect to the leading edge. The comparator further selects the highest value sum and discards the partitioning solution accompanying it.

(8) *Chosen step memory and commands.*—A value memory circuit 146 records only the step during which the highest value voltage total from the comparator is received. The Z size programmed during that trial is the chosen Z. This value is recorded as a cutting decision and also supplied to a Z cutter 147. The S partitioning information is not retained and instead, as a 21st trial step, the high-value Z-trial channel is again energized.

During the twenty-first step the S matrix 142 is automatically supplied with the S-program and defect location information accompanying the chosen Z. The readout signals are not correlated with the value assignments but are instead switched to an S marker system 148. Here the S partitions are recorded as cutting instructions for the chosen Z length. Ultimately, after the Z cut is made, the S cut information is employed to slit the Z length.

The cycle is thus completed and the next one is started with a new leading edge. As dictated by the two cut logic, all of the waste is taken in the S cuts, and the value and rank instructions are automatically executed. By definition the total waste, i.e., all the glass in excess of the defective unit squares, is minimized for the entire glass tonnage presented for cutting under any given demand programmed and defect distribution encountered.

(9) *Z-permission.*—With relatively short sheets of glass, left over end portions may be an appreciable proportion of the length. As a further part of the minimum waste definition, the chosen Z lengths are totaled in an accumulator 149 which signals the remaining sheet length to a Z-permission matrix 150. The matrix has numbered bus bars corresponding to the length being considered and are selectively energized from the accumulator terminals. The matrix cell blocks connect bus bar spans equal to the respective Z program sizes for read-out of all Z sizes in any possible partition.

With the matrix output signals fed back to the Z program panel 137, programmed Z sizes not in the Z-partitioning solution are switched out of the Z-program. No further test for fit of the Z-size need ever be made after the Z is chosen. For continuous ribbon or any other installation where the total sheet length is very long with respect to any Z sizes programmed, the value of unfitted end pieces is insignificant and the Z permission matrix may be omitted without materially increasing the waste.

(B) *Computer clock*

As shown in the block diagram of FIG. 20, a clock control circuit 151 for the computer clock 135 starts and stops a constant repetition rate pulse generator 152 which is the basic timing element of the clock. A sequence of relay stages 153 provides timed switching means for actuation of intermediate relays in the pulse-to-pulse period that controls the sequence of voltage application. A flip flop or bistable multivibrator 154 is actuated from the pulse generator through the intermediate relay stages. It is employed to alternately energize odd and even relay stages 155 and 156 in response to generator impulses. The contact pairs of odd and even stepping relays 157 and 158 are alternately energized to actuate the computer trial stepper (sequencing switch) 136. If a single input stepper switch is employed, as may be elected without departing from the spirit of the invention, the flip flop and separate odd and even stepping relays may be eliminated and replaced by a single relaying stage.

For details of the clock circuit, reference may be made to FIG. 21 which illustrates the circuitry of a computer clock in a working embodiment. As there shown, the pulse generator 152 is siutably a conventional vacuum tube free-running multivibrator which is the basic timing element, which in this case is adjusted to provide a five millisecond pulse every 120 milliseconds. Two multivibrator triodes 159 and 160 have their respective control grids and anodes conventionally cross coupled and deserve no further description here. A normally closed contact pair **161*a* of a clock start relay 161 (FIG. 38) in the clock control circuit 151 (later described in connection with FIG. 38) provides a negative bias potential to the grid of triode 160, thus shutting off the multivibrator until the relay 161 is energized and its contacts 161*a*** are opened. This occurs when the defect record has advanced to the proper position for interrogation and readout to the computer S-partitioning matrix. Alternatively the starting signal may be derived from the Z cutter or other station on the glass line.

Intermediate relaying stages 153 are two conventional one-shot multivibrator circuits. In the first, triode 162 is normally cut-off and triode 163 is conducting. In the second, triode 164, driven from the anode of triode 162, is normally cut-off and triode 165 is conducting. The first multivibrator is adjusted for a 30 millisecond pulse duration following termination of a generator pulse and energizes the coil of a timing relay 168 through a cathode follower stage 169. The second multivibrator is adjusted for 20-millisecond pulse duration following termination of the pulse from the first one shot multivibrator and energizes the coil of second timing relay 166 through a cathode follower stage 167.

Still referring to FIG. 21, the flip-flop circuit 154 has a normally conducting triode 170 and a normally non-conducting triode 171 at the beginning of each computer cycle. Upon application of a timed signal derived from the pulse generator the opposite states of conduction of the flip-flop tube 170 and 171 are reversed. In this instance, a normally closed contact pair **181*a* of the first auxiliary timing relay 181 of FIG. 21A connects a capacitor 172 in the grid circuits of both flip-flop tubes to a negative bias voltage, and a diode 173 and resistor 174 both shunt the capacitor to ground. When contact pair 181*a* opens the negative charge on the capacitor 172 is discharged through the diode 173; when the contact pair closes again a few milliseconds later, a negative charge pulse is developed across the resistor 174** to reverse conduction states.

The odd and even relaying stages 155 and 156 coupled respectively as conventional one-shot multivibrators to the tubes of the flip-flop circuit each produce a 15-millisecond output pulse. As shown in this particular instance, the anode of flip-flop tube 171 is connected to the grid of the first of the odd-step multivibrator tube 175 to produce a positive pulse in the output of the second odd-step multivibrator tube 176. Similarly the anode of the first flip-flop tube 170 is coupled to the grid of the first tube 177 of the odd step multivibrator 156 to produce a positive output pulse on the anode of the second tube 178 of the odd-step multivibrator. The respective odd and even multivibrator circuits are coupled by cathode followers 159 and 160 to drive the odd and even stepper actuating relays 157 and 158 respectively. The relays need not be actuated for the 120-millisecond step duration, a 15-millisecond actuation being employed.

The auxiliary timing circuits illustrated in FIG. 21A employ contact pairs of the sensitive intermediate timing relays 166 and 168 shown in FIG. 21. It will be appreciated that not all of the switching functions taking place during each step are desirably simultaneously timed.

As shown, for example, the coil of a first auxiliary relay 181 is energized in the auxiliary timing circuit by closure of normally open contact pair **166*a* of the first timing relay. Contact pair 181*a* of the relay 181 is conveniently employed in the input of the flip-flop circuit 154 of FIG. 21 and is illustrative of the various means by which time delays may be introduced since the contact pair 181*a* does not open until several milliseconds after contact pair 166*a* closes. A normally open contact pair 181*b*** is employed for sampling the accumulated value voltage in the circuit of FIG. 33.

As further shown, a second auxiliary relay 182 is energized from a control voltage source by closure of normally opened relay contact pair **168*a* of the second intermediate relay. The coil of relay 182 is also connected through a diode 183 to the relay contact pair 166*a*. In this way, the auxiliary relay 182 is first energized for approximately 30-milliseconds when relay 168 closes and is continued energized for approximately 20 milliseconds more when relay contacts 166*a* are closed. Ten normally open contact pairs 182*a* of the second auxiliary relay employed to close the S matrix voltage distributor supply circuits shown in FIG. 31 thus energize the matrix for value read-out and accumulation in readiness for the value sampling upon later closure of contacts 181*b*** (shown in FIG. 34).

It will be appreciated that while provisions have been made for accommodating various recognized good engineering practices in avoiding unnecessary contact wear and minimizing relay duty requirements, the description of such circuitry details has been for the most part omitted from the description in the interest of clarity and conciseness. It is, however, obvious that known techniques can be superimposed or substituted within the spirit and scope of the invention.

(C) *Trial stepper*

A stepper circuit 136 functions as a 26-step timed sequence switch with step relays successively energized and remaining energized as the stepping proceeds. The additional relay contact pairs beyond the first twenty facilitates completing the 21st or selected Z step and preparing the computer for the next cycle.

As shown in FIG. 22, a ladder-type arrangement of 26 step relays 186–1 to 186–26 are sequentially actuated from a source 187 as contact pairs of the odd and even stepper actuator relays 157 and 158 (relay coils shown in FIG. 21) energize the respective odd and even numbered step relays in sequence. The positive terminal of the voltage source remains normally connected to an odd-number or positive latching bus 188 and is briefly connected to an odd number switching bus 189 when odd stepper relay contact pair **157*a* closes. Correspondingly, the negative terminal of the power supply (which may also be grounded) is permanently connected to an even number latching bus 190 and to an even numbered switching bus 191 when even number contact pair 158*a*** closes.

The step relays 186–1 to 186–26 are suitably mercury wetted relays having multiple sets of double-throw contact pairs in which the normally open contact pair of each closes before the normally closed pair breaks. Normally open contact pair **186–1*a* to 186–26*a* and the normally open contact pair 186–1*b* to 186–26*b*** are employed in the stepper itself.

The stepping connection for the first 25 relays in FIG. 22 is the same. The common contact of each of the contact pairs *a* and *b* is connected to one of the terminals of its relay coil. As may be seen, the end terminals of the normally closed *a* contact pairs of each odd numbered step relay are connected to the positive switching bus 189 while the end terminals of the normally open *b* contact pair of each odd numbered step relay are connected to the positive latching bus 188. The *a* and *b* contact pairs of the even number step relays are correspondingly connected to the negative even number switching and latching busses 191 and 190. The other terminal of each relay coil is connected to the common terminal of the preceding step relay *a* and *b* contact pair. The first step relay 186–1 is not connected to a preceding relay but has one coil terminal connected directly to the odd number switching bus 190. Thus, as shown, each step relay coil is connected between the common terminal of its own switching pair *a* and *b* representing its own latching circuit and the common terminal of the preceding step relay switching pair representing the opposite polarity.

In the first 25 steps both the odd and even latching circuit number latching busses 188 and 189 remain energized. According, when the odd number switching bus 189 is first briefly energized, the coil of step relay 186–1 is first energized from source 187 through its normally closed *a* contact and then latched upon closure of its normally open *b* contact pair. This also connects one coil terminal of the next step relay 186–2 to the odd number latching bus 188. On the next step when the even number switching bus 191 is energized step relay 186–2 is energized and latched in, thus also latching in one terminal of the coil the next relay to 186–3. This sequence continues, with each relay remaining energized, until step relay 186–26 is energized during the 26th step.

Relay 186–26 is employed for resetting the step relays at the end of a computer cycle. Its coil is connected to the positive side of the power supply 187 through a normally-closed reset contact pair **157*b* of the odd-step relay 159. The other terminal of the coil is connected to the ground terminal of the power supply or latching bus 190 through one of its own normally open contact pairs 186–26*b* and to the even-number switching bus 191 through the normally preceding step contact pair 186–25*b*. Upon closure of the even-number stepping actuator relay contact pair 158*a* during the 26th step, the relay 186–26 is energized and then latched in. Until the next odd step, when the reset contact pair 157*b*, opens, the relay 186–26 in series with the coil of clock start relay 151 (and tact pair 186–26*a* connecting the positive voltage terminal to the odd number latching bus 188 is opened during the 26th step to drop out relay 186–1 through 186–25**.

Because the computer clock is itself turned off by the opening of another normally closed contact pair *c* of relay 186–26 in series with the coil of clock start relay 151 (and particularly shown and described in connection with FIG. 38), no further impulses from the stepper actuating relays are received and the stepper circuit remains in standby condition with the 26th step relay energized. Not until the computer clock is again started upon signal that the paper defect tape is in read-out position is the odd number stepping actuator relay energized at which time normally closed contact pair **157*b* is opened to de-energize relay 186–26 and the odd number latching bus 188** is again energized.

Additional time may be required during each computer cycle for auxiliary functions. The clock and stepper have been designed to accommodate such added time requirements without redesign of installed equipment. One system calls for opening the clock start relay circuit with one of the step relay contact pairs during the twenty-second step for the time required. When the clock pulse generator 152 resumes, the stepper continues its normal function.

Stepping circuits operated by contact pairs from the step relays 186–1 through 186–23 are illustrated in FIG. 23. One of these, shown in the upper portion of FIG. 23, is the source of stepped trial voltages and employs a second one of the sets of double throw switches of the step relays, namely, normally closed pairs *c* (as contact pairs 186–1*c* to 186–21*c*) and normally open pairs *d* (as contact pairs 186–1*d* to 186–21*d*). These successively connect stepper conductors or channels 192–1 to 192–20 and a chosen-Z or 21st trial relay 193 to a stepping voltage source 194. The stepper busses are in turn wired to stepper jacks 1–20 on a stepper patch panel (FIG. 24). The positive terminal of a grounded voltage supply 194 in FIG. 23 is connetced to a chain of normally open contact pairs 186–1*d* through 186–21*d* starting with 186–1*d*. The series connection is made from an end terminal of each normally open contact pair *d* to the common terminal of the next higher numbered set of contact pairs. Each *c* and *d* contact pair common terminal of each step relay is connected to the trial stepper bus of the next lower step number by the normally closed contact pair *c*. It will be appreciated that upon actuation of stepper relay 186–1 in FIG. 22, voltage of source 194 will be applied to stepper bus 192–1 through now-closed normally open contact pair 186*d*-1 and through still normally closed contact pair 186*c*–2. When step relay 186–2 is energized, stepper trial bus 192–2 is likewise energized but stepper bus 192–1 is de-energized through the opening of contact pair 186*c*–2. The bus bars are thus progressively each energized for a 120-millisecond step as the stepper runs through its cycle.

No separate 21st trial bus is employed and normally-open step relay contact pair 186–21*d* is connected through normally-closed contact pair 186–23*c* to one terminal of the coil of the 21st trial relay 193. The other coil terminal is grounded so that relay 193 is energized during timed steps 21 and 22 of the stepper. Contact pairs of this relay are in the latter described 21st trial circuits of FIGS. 23 and 26.

(D) *Demand program patch panels*

Patch panels are shown in FIG. 24 for programming a group of Z x S sizes in the desired Z-trial order. Uppermost in FIG. 24 is the stepping order panel 196 having a set of jacks 197 numbered 1 to 20 to which the respective voltage step busses 192–1 to 192–20 of FIG. 23 are connected. A second patch panel 198, termed the main Z-patch panel, carries a set of terminals or jacks 199, consecutively numbered 9 to 90. These represent the possible Z lengths in units. Z sizes of 82 to 89 units are not programmed for glass sheets of 90 units length since remainders less than the minimum Z of 9 units would have to be wasted. The full wiring is provided, for flexibility, as where the circuits are to be changed for accommodating sheets trimmed to less than 90 units or continuous ribbon to be cut. Patch cords 200 provide the sole connection between the stepping order and Z patch panels.

A further Z patch panel 201, termed a permitted-Z panel, likewise bears a complete set of Z-size jacks 202 numbered 9 to 90 to accommodate patch cords to the S-size selection for each programmed Z size. For convenience panel 201 is preferably duplicated by five additional panels (not shown) wired in parallel with it so that a separate Z jack is provided for each possible S choices per Z. Six separate S-size patch panels 203–1 to 203–6 carry respective sets 204–1 to 204–6 of 57 jacks. Each set of jacks is numbered to represent the possible S-unit sizes of 6 through 62. Patch cords 205 connect each programmed Z size jack 202 on the permitted-Z panel 201 to one jack of each of the S-size panels 203–1 to

203–6 for a full program. With the single permitted Z panel 201 as shown, each set of six Z to S patch cords 205 is connected together at a single Z jack 202. The S panels 203–1, –2, –3, –4, –5, –6 are also ranked in that order and the relative priority of the six S-sizes per Z is selected by the rank of the S-panel to which a Z by S size is patched.

As further shown in FIG. 24, a Z of 50 is selected for the first trial step by a patch cord 200 from the number 1 jack on the stepping order panel 196 to the Z-size number 50 jack on the main Z-patch panel 198. Accompanying S-sizes 55, 53, 52, 51, 45, and 9 are ranked in that order by patch cords 205 between the Z size number 50 jack on the permitted Z panel 201 and the S-size jacks numbers 55, 53, 52, 51, 45, and 9 in the S-patch panels 203–1, –2, –3, –4, –5, and –6 respectively.

Connections between corresponding size jacks or terminals of the main Z patch panel 198 and of the permitted Z patch panel 201 are made by behind-the-panel wiring which includes a normally closed Z matrix permission switch in each transfer conductor (this wiring is shown in FIG. 26).

The value program accompanying the size program 139 is shown in FIG. 25. A set of six S value patch panels 207–1 to 207–6 are portrayed. Each has a set of 57 jacks numbered 6 to 62 as in the case of the S size patch panels 203–1 to 203–6 of FIG. 24. The sets of jacks are identified as 208–1 to 208–6, respectively. A value voltage panel 209, also shown in FIG. 25, has a set of jacks 210 numbered 1 through 75. These represent particular values with which the programmed S sizes are associated by patch cords 211 between the S value and value voltage patch panels.

A value voltage potentiometer 212 has taps 213 located at equal resistance intervals to define in this case 75 uniform incremental voltage steps. The taps are wired to the value voltage jacks 210 to provide voltage at the jacks which correspond to the value number of the jack. With the potentiometer connected across a stabilized voltage source 214, the voltage increment at each tap is in this instance in the order of one-half volt.

A value program for the first step Z by S size program shown in FIG. 24 is illustrated by the patch cord connections of FIG. 25. As shown in FIG. 25, the ranked S sizes 55, 53, 52, 51, 45, and 9, are patched to value jacks 212 having the same value number as the S size. Such a one-to-one value to size correspondence need not be followed but is usually adequate and provides a reference program in assessing the likely waste in a given demand program. All of the S-sizes and values associated with one Z-step are further selected as for either mirror or glazing quality glass. Selector switch circuits for this aspect of the demand program are described in the following subsection in connection with FIG. 26.

The value voltages of the FIG. 25 patch panels are not directly connected to the Z by S size patch panels of FIG. 24. Instead, the association of each value with a Z by S size, is accomplished in the value accumulator circuits as later described in connection with FIGS. 32, 33, and 34.

(E) *Defect interrogation*

The control stage of the S defect per Z interrogator 141 is shown in FIG. 26. The left hand file of numbered terminals 9 to 90 in FIG. 26 is the set of panel jacks 199 of the main Z panel 198 and the right hand similar file is the set of jacks 202 of the permitted Z-panel 201 in FIG. 24. The horizontal conductors connecting the same number terminals are subject to interruption by the normally closed switch shown in line. A set of interrogating relays 216–9 to 216–90 have one terminal respectively connected of their coils to the main Z panel busses leading to the jacks of the same number. The other coil terminal of each coil is grounded so that the relays 216 corresponding in size number to the Z-sizes programmed for the first twenty steps are successively energized from the step voltage source 194 (FIG. 23).

Also shown in FIG. 26 are the mirror-glazing quality selector switches 217–9 to 217–90. Each switch connects a permitted Z bus of the same Z-size number in series with a diode 218 to one coil terminal of a single quality selector relay 219. The other coil terminal is connected to ground so that the relay is energized during any trial step of a Z size of *n* for which the selector switch 217–*n* is closed. During trial Z steps for which the corresponding selector switch 217–*n* is open, the Z interrogating relay 216–*n* directs a glazing defect record read-out; when the switch 217–*n* is closed, a mirror defect record read-out is provided through the circuits controlled by the control pairs of the selector relay 219.

Before proceeding with the description of the defect record interrogating and quality selective read-out circuit shown in FIG. 28, a clearer understanding of the operation may be gained by reference to an exemplary defect storage system 140 such as that disclosed in the previously mentioned Galey and Misson copending application S.N. 850,460.

As shown in FIG. 27, a paper tape 20 is the defect storage record. It is fed at a rate scaled from the glass conveyor speed and defect locations are read-in by punching holes 221 in the tape. For purposes of illustration here, the paper tape may be considered to have two side by side 62 by 90 unit matrix or mosaic patterns which are scaled-down representations of the glass sheet for coordinate location of glazing and mirror grade defects respectively. As shown, the tape is drawn from a feed roll 222 having an escapement mechanism 223 which releases the paper a scale Z-unit length at a time for defect read-in. A sprocket-drive 224 for the paper is powered by a tape advance motor 225. The tape is stopped at a precise position for read-out when an electric clutch and brake 226 is energized by a control signal.

A defect read-in mechanism comprises glazing and mirror grade defect punches 227G and 227M which punch tape received from the feed roll at locations indicated by defect signals received from a glass inspection station. A leading edge punch 228 provides a reference hole (near one side of the paper tape) to indicate the leading edge of each sheet of glass. Read-out mechanisms 229G and 229M just below the drive sprocket 224 sense the glazing grade and mirror grade defect locations when circuits are completed through the punched holes between transversely arrayed Z and S conductors on opposite sides of the paper tape. A laterally-movable tensioning roll 230 intermediate the read-in and read-out devices has sufficient range of movement to maintain paper tension with respect to both the feed roll and drive sprocket.

As further shown in FIG. 27, a lengthwise array 231 of leading edge contact fingers 232 is numbered from 90 down to 0 to correspond with the Z-length of a glass sheet remaining for cutting. A conductive bar 233 on the opposite side of the paper from the leading edge fingers is contacted in turn by each finger of decreasing Z number as a leading edge hole advances during the tape drive. The paper tape fingers are selectively placed at a potential above ground by the Z accumulator described in connection with FIG. 37. The coil of a paper brake rely 234 is connected between the conductive bar 233 and ground. This relay has contact pairs in the energizing circuit for the paper brake and other circuits as later described. With finger 90 energized, for example, to indicate that the full length of a glass sheet is to be cut, the tape stops when its leading edge hole reaches finger 232–90 and the tape portions containing the mirror and glazing mosaic patterns are alined with the read-out mechanisms 229M and 229G.

A reset relay 235 has its coil connected between a separate downstream contacting bar 233A and ground. The bar 233A is aligned under a downstream leading edge finger 232–0 in the finger bar array 231 which carries a resetting potential from the Z accumulator as subsequently described.

The electrical circuitry of the read-out mechanism 229M and 229G for mirror and glazing quality defect read-out is shown in FIG. 28. Referring first to the glazing defect read-out device 229G, a numbered set of 62 conductors alined with the direction of the paper tape movement are shown as 236G. These are the S bars and the number assigned to each is the number of its unit as counted from a reference side edge of the glass. A second set of conducting bars 238G arranged transversely with respect to the paper tape movement are numbered 1 to 90, which is the number of their respective Z units as counted from a given edge. With the paper tape poistioned between the set of S bars 236G and Z bars 238G, contact between respective Z by S intersections is established through defect punch holes corresponding to glass defects of the same Z by S dimensions with respect to the same leading edge. The Z bars 238G are connected together by a flexible or jointed conductor 239G. With a positive control voltage 240 connected to the common conductor 239, defect-determined ones of the S bars in turn are placed at a potential above ground.

A suitable mechanical arrangement for effecting reliable electric contact through the defect punches is shown in FIG. 29. In this fragmentary view, the spaced S bars 236G are positioned behind the paper tape 220. The transverse Z bars 238G in front of the paper each carry an array of spaced resilient contact fingers 241 alined with the respective S-bars. These fingers are sufficiently small to individually make contact with an S bar when a tape portion bearing a defect hole in that S-row advances along the S bar and under the corresponding defect finger on a Z bar. The Z bar is suitably mounted for a small angle of rotation to lift its fingers out of contact with the paper without disconnecting the raised Z bar from the others.

The Z bar movement is provided by respective ones of rotary actuators 242–1 to 242–90 shown as solenoid coils in FIG. 28. When a solenoid is energized, the corresponding Z bar is lowered against the paper in the contacting or read-out position. The read-out device 229M for mirror quality read-out is similar to device 229G. It has S bars 236M and 238M, Z bars and a common Z bar conductor 239M. The voltage source 230 is suitably common to both sets of Z finger bars 238G and 238M, but the two sets are otherwise electrically separate. As shown, corresponding number Z bars 238G and 238M are shown connected by dotted lines to indicate that the bars are both lifted when the same Z-number actuator 242 is de-energized.

To read-out particular Z value *n*, all Z finger bars 238G and 238M of *n* Z number or less must be lowered to the real-out position by energizing the corresponding solenoids. 242. The solenoids each have one terminal grounded and a power supply 243 is suitably connected through a normally closed contact pair 234*a* of the paper brake relay 234 (FIG. 27) to a solenoid input terminal 235. The input terminal 235 is in turn connected to the low-number end of a chain of normally closed contact pairs 216–1*a* through 216–90*a* of the interrogator control relays of FIG. 26.

With each Z bar solenoid 242 connected to the chain just below the interrogator contact pair of the same number, all of the solenoids 242–1 to 242–90 are energized if no interrogator relays of lesser number than 216–90 is energized. The chain is broken by the actuation of a particular Z number interrogating relay to de-energize all solenoids 242 of higher Z number. All the finger bars are lifted while the paper tape is moving to establish a new leading edge position as assured by the opening of the paper brake relay contact pair 234*a*. As a matter of desirable practice, from the standpoint of minimizing wear on the Z finger bar lowering mechanism, if the Z's are programmed in order of size, a computer cycle can start with a highest number of Z bar solenoids actuated, and the solenoids can be progressively de-energized to successively raise the higher number Z bars 238M and 238G. With the given sheet Z length of 90 units and minimum Z cut of nine units, at least the first nine finger bars are always lifted or lowered together, but the full complement of interrogator relays and Z bar solenoids is shown as a matter of adaptability and convenience.

Defect relays 246–1 to 246–62 are energized to readout the S location of all defects occurring in a given Z length. Each relay coil is normally connected to the same number S bar 236G of the glazing quality read-out device through a normally-closed contact pair 219*a* of quality selector relay 219 (coil shown in FIG. 26). The same terminal of each defect relay coil 246–1 to 246–62 is also connected to the same number S bar 236M of the mirror quality read-out device through a normally open contact pair 219*b* of relay 219. If a trial step has been programmed for mirror quality readout, the selector relay 219 is energized and the particular defect relays 219 energized indicate the S locations of all unit squares in that trial Z length which do not meet mirror quality standards.

Since mirror grade is a higher quality than glazing quality, the mirror read-out for a given Z contains all of the glazing defects plus additional defects. For a given program of S-sizes and values in a given Z step, the summed value of the useful glass in that step is likely to be higher as glazing quality than mirror quality. If the demand for mirror quality is high, an increase in the assigned value for S-sizes in Z-trials interrogated as mirror quality is in order. Contact pairs of the defect relays 246–1 to 246–62 are employed in the S-matrix voltage distributor of FIG. 31 and the S-marker circuits of FIG. 39 as subsequently described.

(F) *The S partitioning matrix and input automation*

The S-partitioning matrix 142 shown in FIG. 30, its size relay actuating circuit shown in FIG. 30A, and its parallel voltage distributor 143 and unit remainder eliminator 144 shown in FIG. 31 correspond closely to the circuits described in Section II.

The S matrix of FIG. 30 is the dual matrix parallel return type with a universal cell block as previously described in FIG. 14. The six cell blocks ranked as $S_1$ to $S_6$ are identical.

The S matrix has a set of 62 positive bus bars 250 numbered 1 to 62 to represent the S unit number or dimension with respect to the side edge of the glass sheet. As indicated in the partial representation of the S block in FIG. 30, cell subassemblies 252 are provided corresponding to that shown in FIG. 15. Each subassembly contains a one of 57 priority relays 253–6 to 253–62, the relay normally closed contact pair *a* for interrupting the positive bus bar connection to the next lower rank cell block when the relay is energized, and the diodes for the positive and negative partitioning matrix circuits. A second normally open contact pair *b* of each relay is employed in the value read-out circuit described in connection with FIG. 32. The identifying S-number of each relay 253–6 to 253–62 is the higher number bus bar to which the relay is permanently wired.

A matrix size relay circuit shown in FIG. 30A contains for each of the six matrix blocks a set of size relays 254–6 to 254–62, the identifying numbers of the relays representing the associated S-size. As shown, one terminal of each size relay coil is connected to ground and the other terminal of each is connected to an S-size jack 204 of the same S number on the S-size patch panels 203–1 to 203–6 of the same rank in FIG. 24. In that way, one of the S-matrix size relays 254–6 to 254–62 is energized by the stepping voltage in each of the S blocks during each of the 20 trial steps when a full program has been patched on the panels of FIG. 24.

The contacts of the size relays are employed in a universal S size-switching circuit in the S matrix cell blocks. As shown in FIG. 30, the normally-open size contacts 254–6*a* to 254–62*a* of the size relays link the diodes and relay of each cell subassembly 252 between bus bar spans equal to the S-size number of the size relay. An additional normally open contact pair *b* of each of the size relays 254 are also employed in the value circuit as subsequently described in connection with FIG. 33.

Referring now to FIG. 31, the voltage distributor 143 for the S matrix applies a voltage to defect-free matrix bus bar spans as determined by the condition of respective contact pairs *a*, *b*, *c*, and *d* of each of the defect relays 246–1 to 246–62 of FIG. 28. The distributor is the parallel type such as previously shown and described in connection with FIG. 8E but economically departs therefrom to the extent that some of the power supplies can be safely omitted. This follows the fact that the largest nnmber of partitions possible is ten spans of 6 (since an S size of 6 units is the minimum which can be programmed). No more than 10 power supplies are necessary therefore, and, as shown, the sources 256–1 to 256–10 are located at every 6 bus bars along the voltage distributor with the two remaining bus bars included in an end span. Also shown in series with each power supply is a normally open contact pair 182*a* of the auxiliary timing relay 182 shown in FIG. 21A. The relay is energized during each stepping trial a short interval after the appropriate matrix size relays have closed and the defect interrogation information has resulted in operation of the defect relays 246.

The unit remainder circuit of FIG. 31 also operates as previously described to automatically reprogram the voltage initially applied to bus bar spans which are not partitionable.

As shown and previously described in connection with the remainder of circuits of FIG. 17, each voltage distributor negative terminal is directly connected to same-number S matrix negative bus bar while each positive voltage distributor terminal is connected to the same-number positive S matrix bus bar through a normally open contact pair of the corresponding one of the unit remainder relays 258–1 to 258–62. With each unit remainder relay coil connected between each positive and negative voltage distributor terminal of the same S number, the unit remainder relay normally open contact pairs close to connect a voltage distributor to the same-number positive S matrix bus bar if the span is partitionable. The positive voltage is switched to the next lower positive bus bar if the span is not partitionable. Also located in the FIG. 31 circuit are the S marker read-out relays 259–1 to 259–62. Each of these is connected directly between the positive and negative matrix bus bars of the same S number. As is subsequently described, the read-out derived from the closing of the marker relays 259 is employed during the 21st step for S-size marking while the read-out from the matrix priority relays 253 (shown in FIG. 30) is employed during the initial 20 steps for S-value determination.

(G) *Value accumulator and comparator*

The value read-out during each trial step is indicated by the closure of contact pairs *b* of the S matrix priority relays 253–6 to 263–62 in each of the six S blocks. To accumulate the various size partitions thus indicated and correlate them with the particular voltage patched for the S-size involved, calls for a large number of switching circuits. An economy in equipment requirements is effected as shown in FIG. 32. Since the minimum S span in the S-matrix is for a minimum S size of six, contact pairs *b* of matrix priority relays 253–62 down to 253–57 are connected in parallel for each of the six cell blocks as the first register; 253–56 through 253–51 as the second register, 253–50 through 253–45 as the third register, and so on with the tenth register consisting of the contact pairs from 253–8, 252–7, and 253–6. Sixty registers thus serve the 342 sets of S-matrix priority relay contact pairs.

Closure of a contact pair in any register is indicated by inserting the register of paralleled contact pairs in circuit with a register value relay coil and power supply. As shown in FIG. 32, each register has one end grounded, and a positive voltage is applied to one terminal of all the value relays. For the ten registers for the first matrix cell block of $S_1$ size, the value relays 261–1 to 261–10 are employed. Registers for the remaining $S_2$, $S_3$, $S_4$, $S_5$, $S_6$ blocks are correspondingly termed 262–1 to 262–10, 263–1 to 263–10, 264–1 to 264–10, 265–1 and 265–10, and 266–1 to 266–10. A single power supply 267 serves the sixty relays.

Inasmuch as the energizing of a matrix priority relay in a given register for one of the six S blocks also precludes the possibility of the energizing of a priority relay in the same register of any of the other S-blocks, a second simplification in the value accumulation switching is illustrated in the FIG. 33 value adding circuit. As shown voltage busses 270–1 to 270–6 carry the value voltage for each of the respective S blocks 1 to 6 respectively and for whatever S is programmed during a given trial step. This is readily accomplished in the first $S_1$ block, for example, by connecting each S size value jack 208–1 on the $S_1$ value panel 207–1 of FIG. 25 through a same S-number normally open contact pair *b* of the $S_1$ matrix size relays 254–6 to 254–62. Since only one $S_1$ size is programmed for any Z trial step, only one of the size relays 254–6 to 254–62 is energized and a single value voltage appears on the value voltage bus 270–1. The size relay contact pairs *b* for the other ranked S blocks similarly each connect each sets of 57 S value jacks 208–2 to 208–6 to the respective value voltage busses 270–2 to 270–6.

The value voltages associated with each register are summed in an operational or adding amplifier 271. Its input network comprises 10 resistors 272–1 to 272–10 of equal value, one for each of the ten value registers. One terminal of each resistor is connected to the amplifier input terminal and the other terminal of each register is connected either to ground or to one of the 6 value bus bars as directed by the contact pairs *a* and *b* of the value register relays of FIG. 32. Thus for the first register, for example, a series chain of normally closed *a* contact pairs extends from resistor 272–1 to 266–1*a*, 265–1*a*, 264–1*a*, 263–1*a*, 262–1*a*, 261–1*a*, and then to ground. Each normally open *b* contact pair of the first register value relays 261–1 to 266–1 is connected between a value bus 270–1 to 270–6 and the common terminal of the normally closed contact pairs *a* of the same S rank and next lower-rank in the chain of normally closed contact pairs. Energizing a first register value relay 261–1 to 266–1 connects the value for that rank to the chain and breaks the chain from ground. Only one first-register relay can be closed during a trial step, and thus only one value voltage per register is applied to the register resistor.

The contact pairs *a* and *b* of the other register value relays similarly connect the value voltage either to ground or to the respective register resistor.

Each register resistor 272–1 to 272–10 of the adding amplifier input network is thus either connected to ground or supplied with a particular value voltage. No more than one S value voltage is connected to any one register during any one step, the adding function being performed entirely in the resistance network and amplifier. Whether or not different value voltages appear across the different ones of the registered resistors that are energized depends upon the partitioning solution; in normal programming the same value of voltages would appear only when more than one S size of a particular S block is involved in a partition.

In the design and operation of the amplifier 271, pains are taken to accommodate the wide range of input summed voltages. Accuracy is needed to distinguish small voltage variations in the sum of the voltages across the 10 input registers and a negative feedback resistor 273 is provided for this purpose. A Philbrick K2–X operational amplifier is a particular equipment found satisfactory in this application. Such a linear D.C. amplifier has a very high gain and in this instance was designed with negative feedback to provide a gain factor of around 25. With linear amplification for a range in this instance of .03 to 4.0 volts, the output voltage range may vary from 0.8 to over 100 volts.

Turning particularly to the block diagram portion of FIG. 33, the over-all comparison system for selecting the highest value during the 20 trial steps is shown. The sum voltage appearing at amplifier output terminal 274 is applied first to a capacitive comparator 275 which transmits a pulse during the first trial step for which any value is obtained. An amplifier 276 and pulse shaper 277, and one-shot multi-vibrator 278, and cathode follower 279 shape and amplify the pulse which energizes a value memory relay 280. During succeeding trials no impulse is transmitted by the comparator 275 unless the voltage is greater than that to which it has been previously charged. The ultimate information to be derived is the last or highest number trial step for which the maximum value step relay is energized and the value sums themselves are not stored.

Reference may be profitably made to a particular embodiment as shown in FIG. 34 of the over-all comparison circuit, and particularly its value comparator 275, illustrated by the block diagram in FIG. 33. A negative output voltage of the operational amplifier 271 appears at output terminal 274. This voltage is placed across a series combination of a diode 281, a low-leakage capacitor 282, a resistor 283 and a grounding diode 284 upon closure of a normally open contact pair 181*b* of the first auxiliary relay 181 shown in FIG. 21*a*. The diode 281 prevents the storage capacitor 282, which is charged to the negative potential of the amplifier output, from discharging back into its charging circuit. To eliminate switching transients the charging circuit also includes a normally closed contact pair 181*c* of the same auxiliary relay which connects the charging line to ground through a resistance-capacitance network 285, 286.

The negative pulse developed across the second or grounding diode 284 upon discharge of the capacitor is applied to the grid circuit of the first normally conducting triode 287 of three resistance coupled amplifier stages constituting the amplifier 276 of FIG. 33. A second resistor 288 shunts the series combination of the first resistor 283 and grounding diode 284, and the relatively small voltage pulse to be amplified does not change appreciably with the amplitude of the capacitor charging voltage. If, however, the capacitor 282 has been charged during a previous step, no pulse whatever is transmitted to the grid of triode 287 unless the negative amplitude of the voltage received at terminal 274 is larger than that which previously charged the capacitor. Low leakage of the circuit components is necessary.

At the end of a computer cycle, the capacitor 282 is discharged to ground by a normally open contact pair 186–26*a* of the 26th step relay in the stepper circuit of FIG. 22.

The remainder of FIG. 34 circuit represents a conventional means of sufficiently amplifying a small pulse so that it can positively energize a relay coil. The one-shot multivibrator is suitably adjusted for a 10-millisecond output pulse for energizing the memory transfer relay 280 during the trial steps that the operational amplifier output voltage exceed that of any previous step.

It will be appreciated that where the same summed value voltage is obtained as in the highest preceding value voltage step, the capacitor 282 is not further charged and the transfer relay 280 is not energized.

Value ties are thus automatically resolved in favor of the first or the lower step number program.

(H.) *Maximum value Z memory*

The maximum Z-value memory shown in FIG. 23 associates the actuation of memory transfer relay 280 of FIG. 33 with the particular one of the trial steps. The number of the highest step so indicated is stored for recomputation as the 21st or selected Z step with the Z by S sizes previously programmed for that trial.

As shown in FIG. 23, 20 value memory relays 291–1 to 291–20 each have one coil terminal connected to ground and the other connected to one of respective memory buses 292–1 to 292–20. Normally closed contact pairs *a* and normally open contact pairs *b* of each memory relay are employed in a latching circuit for energizing the highest number memory relay and its associated memory bus from a voltage source 293 which is the primary source of voltage for the twenty-first step computation. The latching circuits contacts *a* and *b* are shown adjacent their respective memory relay coils 290–1 to 290–20 in FIG. 23. As may be seen, a chain of normally closed *a* contact pairs of the memory relay extends from an emergency terminal 294 through contact pairs 290–1*a*, –2*a*, –3*a* . . . –20*a* and then through a normally closed contact pair 186–23*c* of the 23rd step relay 186–23 of FIG. 22 to the positive terminal of the twenty-first step source 293. Connections from the chain of normally closed contact pairs is made by the individual ones of the normally open contact pairs *b*. Thus contact pair 291–1*b* is connected to the common terminal of normally closed contact pairs 291–1*a* and 291–2*a* of the chain; and so on through the connection of the latching voltage end of the chain to memory bus 292–20 through normally open contact pair 291–20*b*. Upon applying a voltage to memory bus 291–1 from another source, memory relay 291–1 is energized and latched in by source 293. Upon energizing a higher number memory bus, its corresponding memory relay latches itself in and opens the chain to drop out any lower numbered memory relays.

To selectively energize the memory buses 292–1 to 292–10 for the trial step having the highest summed partitioned value, the stepper voltage source 194 is employed with a series or chain of normally open contact pairs *f* of step relays 186–1 to 186–21 in which the chain is successively connected to the memory of buses 292 by normally closed contact pairs *f* of the respective step relays 186–1 to 186–21. Such a step voltage per arrangement is identical to that also shown in FIG. 23 which employs normally closed contacts *c* and normally open contacts *d* of the respective step relays for applying the step source voltage 194 to the respective stepper buses 192–1 to 192–20. The normally open contact pair 280*a* of the memory transfer relay is connected between the positive terminal of the voltage source 194 and the beginning of the chain of normally open contact pairs 186–*f* to 186–20*f*. The stepper contact pairs open and close irrespective of the state of relay 280, but a memory bus 292–1 to 292–20 is only energized when the contact pair 280*a* closes. If later during the series of 20 trials, contact pair 280*a* again closes, the corresponding step number memory bus is energized, and the memory relay latching circuit drops out the earlier energized relay while latching in the higher number memory bus and relay.

At the end of the twenty trial steps only one of the memory buses 292–1 to 292–20 can remain energized through the memory relay latching chain. If no value was accumulated for any of the trial steps, none of the memory relays is energized and the latching chain of normally closed contacts *a* of the memory relays 291–1 to 291–20 leaves the emergency terminal 294 at the potential of source 293. The voltage at the emergency terminal can be employed for various alarm circuits, and a compulsory Z selection circuit employing this voltage during such computer cycles as it occurs is shown in FIG. 26 and described in connection with the Z-permission matrix.

When the 21st step relay 193 of FIG. 23 is closed, normally open contact pairs 193*a* connect the respective memory busses 292–1 to 292–20 to the stepper busses 192–1 to 192–20. The voltage of the source 293 is thus transmitted to the stepper jack on the stepping patch panel in FIG. 24 corresponding to the Z step during which the highest accumulated value was received.

For convenience in translating the chosen step to a command signal representing the Z size programmed in the chosen step, a decimal to binary converter 297 having a 21st step output may be connected to the Z panel Z size jacks. Such a converter is shown in FIG. 26 and is representative of conventional practice.

As shown in FIG. 26, the Z size jacks 202 (also shown in FIG. 24) represent in order the horizontal decimal bus bars of the converter matrix 297. Vertical binary matrix busses 298–1 to 298–7, respectively represent seven successive places in a binary number. Each place being successively higher power of 2 (i.e., $2^0$, $2^1$, $2^2$, $2^3$, $2^4$, $2^5$, $2^6$). The binary busses 298–1 to 298–7, when energized, thus indicate respectively as addends in a decimal sum, the decimal numbers 1, 2, 4, 8, 16, 32, and 64. This code is employed in the location of diodes 299 for connecting the respective decimal number Z jacks to the binary bus bars. If bus bar 88, for example, is energized during the 21st step, binary bus bars 299–4, –5, and –7 are energized. Since these three bus bars have decimal equivalents of 8, 16 and 64 respectively, their sum is 88.

The binary bus bars are in turn connected to chosen Z binary output terminals 300–1 to 300–7 during closing of the normally-open contact pairs 193*a* of the 21st step relay in FIG. 23. These terminals represent computer output terminals so far as the chosen Z sizes are concerned They may suitably be connected to binary storage registers or to a binary input system of a Z cutter. They are also connected to a Z accumulator included in the computer circuit as described in the following subsection.

(I) *Chosen Z accumulator*

To total the Z sizes as they are cut from a sheet and relocate the glass leading edge in interrogating the defect record during each computer cycle, the chosen Z's are totaled during each computer cycle.

A chosen Z accumulator system is illustrated in FIG. 35 in which the binary chosen Z output terminals 300–1 to –7 from FIG. 26 are respectively connected to accumulator input relays 301–1 to 301–7. As shown in the figure, one terminal of each input relay coil is returned to ground so that different combinations of the input relays are energized from the 21st step voltage source as the binary equivalent of the chosen Z decimal length. Seven binary counter stages 302–1 to 302–7 represent successive places in the accumulated binary number as successive powers of 2. For convenience the seven counter stages 302–1 to 302–7 are indicated successively as counters "1," "2," "4," "8," "16," "32," and "64" respectively. Each counter is connected to a single pulse generator 303 through the normally open contact pair 301–1*a* to 301–7*a* of its respective input relay. Carry-over pulses from each counter stage to the next higher counter stage are indicated by the "carry." Any counter stage beyond the first may thus receive a pulse from the preceding stage as well as the pulse from the generator. No carry pulse from the last stage 302–7 back to the first counter 302–1 is employed as the counter is stopped at 90 and is not employed to its full count of 128. Output binary accumulator relays 304–1 to 304–7 of each counter stage accumulate the Z lengths as they are cut. A reset means 305 is connected to each counter stage to wipe out the count after a total of 90 is reached to prepare the accumulator for the Z choices of the next 90-unit sheet.

The accumulator function may be served by various known digital adding circuits. Since the adding speed required is not high as compared with speeds often required of binary accumulators, the choice of components is not critical. By way of example, reference is made to FIG. 36 which illustrates the circuitry of a typical pulse generator 303 and one of the seven counter stages 302 employed here. Thus the pulse generator is essentially a one-shot multivibrator employing triodes 307, 308 followed by a conventional cathode follower triode 309. The generator is turned on for its single pulse delivery during the 21st step suitably by the closing of a normally open contact pair 186–22*d* of the 22nd step relay in the stepping circuit of FIG. 22. (The generator starting pulse may also be later timed from a contact pair of the 23rd step depending upon the time delay involved in operating the binary input relays.) The generator output pulse is delivered to an output bus 310.

Each counter stage 302 in FIG. 36 is a bistable circuit which is actuated from a reference position at the beginning of a new count. A first triode amplifier 311 is conducting when the accumulator input contact pair closes. When amplifier 311 conducts a flip-flop stage employing triodes 312, 313, which initially has tube 312 cut off and tube 313 conducting, changes its state. An output cathode follower stage employing triode 314 energizes the accumulator output relay 304–1 to 304–7 if one pulse has been received in that counter. Carry pulses are received as input pulses from the previous stage in the flip-flop circuit, and carry pulses from the flip-flop circuit of the counter stage are transferred to a one-shot multivibrator employing triodes 315 and 316 connected to the trigger input circuits of the flip-flop circuit of the succeeding counter stage.

If a counter stage receives both a trigger pulse from the pulse generator and one from the preceding stage, the flip-flop circuits operates twice and a carry-over pulse is transmitted. The accumulator output relay 304–1 to 304–7 has a relatively slow response and does not change states when two pulses are received per stage. At the end of the count of 90, a normally closed contact pair *a* of a reset relay 235 (relay coil shown in FIG. 27) opens to remove a negative bias from the grid of triode 313 so that it is rendered conductive and to thereby render the triode 314 non-conductive. The flip-flop circuit is returned to its initial stable state, and the accumulator output relay is de-energized in readiness for a new count of 90.

While the binary count accumulated is indicated by conduction or non-conduction of the respective accumulator output relays 304–1 to 304–7, it is more usefully placed in decimal form. The binary to decimal converter 320 of FIG. 37 illustrates the conversion through use of normally open and normally closed contact pairs *a* and *b* of each of the accumulator output relays 304–1 to 304–7, using a conventional Christmas tree expansion.

A positive voltage source terminal 321 of the converter in FIG. 37 applies a voltage to the common terminal of the normally closed and normally open *a* and *b* contact pairs of reset relay 305–7. When the reset relay is not energized, the accumulated count is less than 64 and when the relay is actuated, the count is 64 or greater. Each of these contact pairs is in turn connected to the common terminal of a normally closed and normally open contact pair *a* and *b* of the reset relay 305–6 to indicate the presence or absence of a count of 32. This series progresses with the last place of the binary number represented by output relay 304–1, which for a full expansion controls 128 contact pairs. In this instance, the entire expansion is not wired.

The developed end of the converter at the end of the chain of seven normally closed contact pairs *a* of the seven accumulator output relays is numbered as terminal 90. It corresponds to zero Z count. The remaining terminals are numbered in a downward direction to terminal zero. If the accumulator has received no pulses, the input voltage appears across terminal 90 with respect to ground. The energized terminal is stepped down down as each Z size is chosen during a computer cycle. When a count of 90 has been accumulated, the zero terminal then bears the potential with respect to ground.

An accumulator reset relay 235 having its coil connected between zero terminal and ground (as shown in FIG. 27) is energized when the paper tape leading edge hole reaches the zero leading edge finger 232–0 of FIG. 27. Its normally closed contact pair 235*a* in the counter stages 302 as shown in FIG. 36 is then opened to reset the accumulator so that all of the accumulator output relays 304–1 to 304–7 are de-energized.

The output terminals 323 of the binary to decimal converter 320 provides the signal for shifting the leading edge of the defect record being interrogated as a new leading edge of the glass is located by each chosen Z size with respect to the previous leading edge. One such way of automatically employing the converter output is shown in simplified form in the paper tape defect storage system illustrated in FIG. 27. The leading edge fingers 232–9 to 232–90 of the leading finger array 231 in FIG. 27 are respectively connected to terminals 9 to 90 of the converter in FIG. 37. With the defect finger 232–90 located at the upstream end of the finger array, a leading edge hole in the paper tape must first pass under finger 232–90 and then under the remaining finger in succession. With the accumulator reset to place a positive voltage on finger number 90, a circuit is not completed to the leading edge contact bar 233 and thence to ground through the coil of the paper brake control relay 234 until the paper is advanced sufficiently to bring a leading edge hole under the number 90 finger.

As further shown in FIG. 38, the solenoid control coil of the paper brake 226 is in series with a normally open contact pair 234*a* of the paper brake control relay across a control voltage source. Until the brake relay 234 is energized therefore, the brake is released and the paper tape advances until a leading edge hole passes under the finger 232–90.

During the next computer cycle, the brake remains energized during the first 20 trials. After the chosen Z is accumulated, however, the tree input voltage is switched to a lower terminal. The paper brake relay is 243 again de-energized, the brake 226 is released, and the paper travels until the leading edge hole comes under the next leading edge finger having a potential with respect to ground. The paper tape is then stopped by the brake with a new leading edge established for the defect readout.

It will be appreciated that the leading edge finger array can be expanded. Similarly, where the S per Z storage interrogation does not require a paper tape storage, other synchronizing means may be employed.

(J) *Z-permission matrix*

The Z permission matrix shown in FIG. 39, apart from its larger dimensions, corresponds to the permission matrices previously described. A set of Z bus bars 326, numbered 9 to 90 represents a maximum Z length of 90 presented for cutting down to a minimum remaining Z length of 9 before the last Z cut is made. Diodes 327 connect each span of Z bus bars for each of the Z size of spans 9 to 90. Since a maximum of 20 Z's is programmed at any one time, a universal switching means as previously described is employed in which each diode span is completed by selected ones of contact pairs 328–9*a* to 328–90*a* of matrix size relays 328–9 to 328–90. Respective switches 329–9 to 329–90 in the size relay coil energizing circuit are employed to select the Z size program. While the switches are shown as manually operated, they may be, if desired, automatically closed upon patching of the Z by S program panels.

The Z-permission read-out relays 330–9 to 330–90 are selectively energized by the voltage applied to the matrix bus bar terminals. As shown, each relay coil has one terminal connected to ground and the other connected to a corresponding Z number bus bar 326 through a corresponding Z number normally open contact **328–9*b* to 328–90*b*** of the matrix size relays. For all paths involving a diode span of particular number, the corresponding number read-out relay is energized.

The principal employment of the read-out relays is the interconnection by means of their normally open contact pairs **330–9*a* to 330–90*a* between the respective Z size main panel jacks 199 and the Z size permitted panel jacks 202** as shown in FIG. 26. Accordingly, unless a contact pair *a* for a particular Z number is closed by the operation of the permission read-out relay for that Z number, the permitted Z panel jack is not energized by the stepper during any of the 20 trial steps. In this way, any Z size which will no longer fit as a possible partition of the remaining Z length to be cut is automatically excluded from any of the 20 value trials. It cannot, therefore, be chosen and the Z cut lengths always total to 90 for each sheet.

Another use of the Z-permission read-out is for a compulsory Z selection. In the event that none of the Z choices results in a value read-out during the 20 Z trials, no Z is chosen during the 21st step. Rather than repeat the series of 20 trials and in effect, stall the computer, the defect storage tape is desirably advanced so that defects may be interrogated with respect to a new leading edge.

This emergency condition is reflected by the presence of voltage on emergency terminal 294 of FIG. 23 during the 21st trial step. The compulsory Z choice circuit shown in FIG. 26 connects this emergency voltage to the lowest number permitted Z size in the program. A small Z length can be cut and discarded so that the program can continue. Additional normally open *b* contact pairs and normally closed *c* contact pairs of the permission read-out relays 330–9 to –90 are employed in an automatic switching circuit. As shown the emergency terminal 294 in FIG. 26 is connected to Z panel jack 199 of Z size 9 through contact pair **330–9*b*** and to the succeedingly higher number Z jacks through each preceding Z number normally closed *c* contact pair and the same Z number normally open pair *b*. The lowest permitted Z size indicated by the partitioning matrix closes the circuit to the corresponding Z size jack and opens the circuit to the higher numbered jacks.

(K) *S-cutting read-out*

The results of the S partitioning solution in the 21st or chosen Z trial are referred to the S-cutting read-out circuit shown in FIG. 40. Such a circuit corresponds closely with that previously described and shown in FIG. 18. A positive voltage terminal 331 is connected to S-cutting read-out relays 332–1 to 332–61 through the normally open contact **186–22*b* of the 22nd step relay 186–22 in FIG. 22. The control network includes both contact pairs of the read-out relays 259–1 to 259–62*b* in FIG. 31 and contact pair of the defect relays 246–1 to 246–62 shown in FIG. 28. As previously described, the cutting read-out relays provide information for slitting or slicing the glass; actuation of marker relay 332–55**, for example, calls for a cut to be made along the boundary between the 55th and 56th strip with respect to the zero reference edge. Spans of glass less than the minimum size programmed are chopped into pieces recognizable as waste.

The cutting information is stored until the S cut is made, and as a convenient form of storing the information is to mark the glass itself with the S-cut locations. If desired, the cutting read-out system may be partially disabled to avoid transmitting cutting or marking instructions which would chop remainder spans to unit widths.

It will be appreciated that the foregoing computer circuitry description has been simplified to an extent necessary for clarity of presentation. It is obvious that such features as test circuits, emergency and synchronizing circuits, disabling circuits for using only part of the computer, standby components, and transfer switching may be variously employed within the scope and spirit of the invention.

IV.—A PREFERRED APPARATUS EMBODIMENT

With the benefit of the preceding description of the inventive method and the partitioning matrices and related circuits included in the computer for computing the partitioning solution by which the glass is divided into programmed sizes, the following description of a full scale apparatus as incorporated in a modern plate glass factory can be readily appreciated. The perspective view of FIG. 41 illustrates, in semi-schematic fashion, that portion of an exemplary production line in which the invention is incorporated. A series of sheets of ground and polished plate glass 400 are carried horizontally on the rolls of a main conveyor 402 from right to left in the figure to glass cutting apparatus by means of which the glass sheets 400 are severed transversely into Z lengths **406*a–g* by means of glass cutting apparatus herein called a Z cutter. In the production line shown the Z lengths are shunted onto side lines 408, 410** where suitable glass cutting apparatus, herein called S cutters, are located for making longitudinal slit cuts to divide the Z lengths into smaller programmed sizes.

The glass sheet in this industrial apparatus embodiment may, for example, be quarter-inch plate produced as sheets 180 inches long and 124 inches wide, or as a continuous ribbon of this width at a rate in the vicinity of 200 lineal inches per minute. After the Z cuts are made, S marks 412 are placed on the individual Z lengths of glass to locate the longitudinal slit cuts. The slit cuts follow at the margins of the programmed S widths of usable glass between which are the defective portions and waste excluded by the cutting procedure. This is the two-cut logic.

As a preliminary step to making the partitioning calculations and decisions, the glass production is inspected at an inspection station 414 upstream of the Z cutter and S marker, where both internal and surface glass defects are noted. Information as to these defects is supplied to the computer which is functionally shown in the block labeled "computer." The computer makes the partitioning calculations based on the defect information in pace with the glass production which, even though the glass is in the form of separate sheets, is essentially a continuous flow process.

While the specific construction of the apparatus for inspection of the incoming glass for defects at the incoming end of the system, and of the S marker and cutters for executing the partitioning decisions at the outgoing end, is not part of the present invention, such equipment plays a role in the overall decision making combination, as well as illustrating how the practical realities of an economic installation are accommodated. The details of the glass inspection, glass marking and glass cutting apparatus schematically shown in FIG. 41, as well as of the portions of the apparatus functionally indicated by blocks, are found in the copending applications of William F. Galey and George W. Misson, Serial No. 850,460, filed November 2, 1959, entitled Glass Partitioning Process and Apparatus; and of Charles O. Huffman, William F. Galey and George W. Misson, Serial No. 769,223, filed October 23, 1958, now Patent No. 3,146,926, entitled Glass Cutting Apparatus; and Serial No. 785,510, filed January 19, 1959, now abandoned, entitled Glass Cutting Apparatus. In general, the apparatus as depicted provides means for locating the positions of defects in the glass sheet and for preparing a secondary record of the defect location according to severity level, which defect information is supplied to the computer when required to make particular calculations.

The defect containing sheet or ribbon of glass constitutes a primary record of the defects contained in it. With this apparatus, however, in order to make the defect information available upon command for computation purposes, a secondary record is made of the defects in the glass in defect storage apparatus, the record taking the form of a perforated paper tape as shown in FIG. 27. With defect information supplied upon command from the secondary record, and pre-established desired grades and sizes, the usable areas are pieced out by the following two-cut logic and excluding the defect containing portions of the glass.

In order to provide the requisite information as to defects appearing in the glass, the glass is first manually inspected for the presence of defects and those of such severity as to affect its quality are dimensionally located by colored crayon marks placed on the surface of the glass sheet. For the purpose of usefully relating the defect locations to given desired sizes of the glass, a basic dimensional unit is established for which all the length and width requirements are integral multiples. With a ribbon or sheet 124 inches wide, a unit of 2 inches has been chosen, giving the glass an effective width dimension of sixty-two units (S dimension). The glass is measured in units back from the leading edge along the length of Z dimension, a glass sheet being, therefore, 90 units in length, and the width or S dimension of 62 units is measured between the side edges. The glass thus is measured, and the defect located, by means of a matrix or mosaic of 2-inch squares on the glass.

In the foregoing manner, by means of marks the information as to defect location is stored directly on the glass which thus comprises a primary record. The secondary record of the defect location information also contains the dimensional location of each defect square with respect to the leading edge and the side edge, and thus comprises an analogue of the defect marked glass. As previously indicated, the present apparatus involves partitioning of the glass sheet or glass ribbon into desired sizes which are graded as to quality. In order to accomplish this, separate secondary records are prepared on paper tape in the defect storage apparatus as shown in FIG. 27 so as to provide separate sources of glazing and mirror defect location information. In the manual inspection of the glass sheets or ribbon for defects, the location of the defect as well as its severity is marked on the glass. This its done by using different color crayon marks to indicate the difference in severity. Thus "glazing" or "total" defects, which are of a severity that would lower the grading quality of an area containing them so that it would be judged below glazing grade, and which is remitted as cullet, are marked on the glass using a black crayon. On the other hand, defects which would be acceptable in glazing grade glass pieces, but not in mirror grade pieces, are marked in red on the glass by the inspector.

Therefore, one of the separate secondary records is prepared to contain information giving the location of total defects, while the other secondary record is prepared to contain glazing defect location information. This is represented schematically in FIGURE 27 which shows two separated read in units 227M, 227G and two separate read out units 229M, 229G. The "M" units read in and read out the total or mirror defect information and the "G" units read in and read out glazing defect information.

The information as to defect location is recorded on the continuously moving paper tape shown in FIG. 27 by punching holes in the tape by means of the punch units 227M and 227G which are dimensionally located with respect to imaginary crosslines corresponding to the glass sheet leading edge, and lateral longitudinal lines adjacent the margins of the tape, corresponding to the glass side edges. In effect the mosaic of 2-inch squares on the glass is transposed to the paper tape, shrinking in the process so as to permit the use of a narrow tape such that a defect in a 2-inch mosaic square on the glass is represented by a rectangular defect punch hole 1/6 inch long by 3/32 inches wide on the tape.

In this manner, the information as to location and severity of defects on an entire sheet of glass, or a predetermined length of ribbon glass, may be made available in a readily usable form to the computer. While the secondary record is made in pace with the movement of the glass on the conveyor, the computer may receive the accumulated information as to given lengths of the glass to permit the systematic fitting of all programmed widths and lengths into the available defect-free areas, in carrying out the two-cut logic followed in this partitioning method.

In the present apparatus a photosensitive defect detection apparatus shown in FIG. 41 at the inspection station 414 examines the glass sheet on the conveyor for the presence of defect marks as it moves along the conveyor past the bridge on which the defect detection apparatus is mounted. The detection apparatus provides dimensional information as to the location of the defects in the form of the coordinate positions of the defects with respect to the leading edge and one side edge of the glass sheet. For this purpose the photosensitive defect apparatus on the bridge includes sixty-two photosensitive elements 416 in two rows of 31 elements each, each element 426 positioned to view a band of glass one mosiac or unit square wide as it passes the bridge. Each photosensitive element is therefore responsive to a defect appearing in one unit square at a given S distance from one edge of the glass sheet. A signal variation from a photosensitive element, produced by the passage of a defect mark, is used to control the defect storage apparatus to produce a record of the defect. The actuation of the punch mechanism 227M, 227G of the defect storage apparatus is controlled in accordance with defect caused signals received through information supply channels from the photosensitive apparatus.

The punch mechanism of each defect storage unit, as shown in FIG. 27, includes sixty-two selectively operated punches mounted in two transverse rows of thirty-one punches each. This provides one punch for each longitudinal mosaic or unit strip. Thus the elements 416 of the photosensitive defect detection assembly as shown in FIG. 41 which includes sixty-two photosensitive elements 416, one corresponding to each punch, are mounted in a like manner to the punches in the punch mechanism. Each photosensitive element 416 is positioned to view one 2-inch unit or mosaic of glass and in this manner is responsive to a defect appearing only in the square at a given S coordinate. A signal variation from the photosensitive element, produced by a defect mark, is used to control the corresponding punch causing it to operate and produce a perforation in the mosaic in the paper tape recording the defect.

Turning now to FIGS. 19 and 41, the information required to make the computations for partitioning the glass is the location of the leading edge of the glass, the location of the defects, the severity of the defects, that is, "mirror" or "glazing," and the program of sizes to be cut.

With this defect information available on the mirror and glazing defect paper tape portions in the defect storage apparatus the information on the different tape portions can be read out into the computer to supply data as to defect severity as well as presence. The computer receives the data and by size programming pieces out the required sizes from the defect-free areas of the glass.

Size programming here is the quantitative demand description covering both the absolute sizes and the relative demand for them. As to the sizes themselves, the lengths and widths of the various rectangles to be cut are arranged to group the respective width dimensions sharing a common length dimension. All of the length dimensions are thus grouped, each associated with one or more width dimensions. The relative demand for different length by width is preferably presented in a two-part anaylsis. Thus, a numerical value is established for each size so that values of groups of sizes can be accumulated and compared. Further, a rank or order of priority is established for the respective width dimensions associated with each length dimension. The block in FIG. 41 labeled "Demand Program" indicates that the size program and order of priority is required for the computer to operate.

The defects location information derived by the photosensitive defect detection apparatus over the conveyor is electrically transmitted to a control room containing the defect storage means, and which is preferably (but not necessarily) located near the glass line. The computer is preferably also located in the control room and is electrically connected to the S marker and Z cutter apparatus so that the command decisions may be electrically transmitted to these components of the apparatus. The block labeled "Buffer Storage" in FIG. 41 represents apparatus also located in the control room and provided for temporary storage of defect location information. Buffer storage apparatus is provided because with the particular photosensitive defect detection apparatus shown, information as to the presence of defects in a 2-inch mosaic or unit square of glass is not obtained until the full length of the unit square is viewed or scanned by the photosensitive element positioned over the unit square on the bridge. Each photosensitive element views a minute area of the glass lying along the center line of the unit square over which the photosensitive element is positioned. Thus buffer or temporary storage is provided to save up the information about defects until the full unit square has been scanned.

In order to provide the separate records, as shown in FIG. 27 according to defect severity level means is preferably included for detecting not only the presence of defects in the glass sheet, but also for discriminating between the severity level of defects so that separate "mirror" and "glazing" defect records may be made in the defect storage means. One means for providing severity level information includes separate channels for transmitting defect information from each photosensitive element 416 of the apparatus on the bridge to the buffer storage apparatus including circuitry for discriminating between photosensitive element response signal variations caused by the defect marks of different character on the glass. In the inspection of the glass sheet upstream of the defect detection apparatus, different colored crayons are used to make the marks applied on the glass to indicate defects of different severity level. In this manner not only the presence, but the severity of the defects may be accommodated by the detection apparatus. In the defect storage means shown in the copending application of William F. Galey and George W. Misson, entitled Glass Partitioning Process and Apparatus, and referred to hereinbefore, separate records are made of the positions of defects of each severity level. By selective read out of the different records, severity level information as well as defects location information may be supplied to the computer.

The block labeled "Defect Read Out" represents the apparatus for reading out the defect information from the record of the defect storage means as required by the computer in making partitioning calculations. In the defect storage apparatus as shown in FIG. 27, separate read out mechanisms 229M, 229G are provided for interrogating separate data on the tape as to "mirror" and "glazing" defects respectively. Similarly, the defect read in mechanism shown in FIG. 27 comprises separate glazing and mirror grade defect punches which punch the tape at locations indicated by defect signals received from the buffer storage apparatus. In addition to the defect punches shown, a leading edge punch 228 is also provided to make a hole (near one side of the paper tape) to indicate the leading edge of each sheet of glass.

Furthermore, the apparatus of FIG. 27 includes an assembly of leading edge fingers 232–1, 232–90 which are selectively connected to the computer and in cooperation with the leading edge hole in the tape coordinate the movement of the paper tape through the read out section with the operation of the computer. Through a control shown in FIG. 38 for the brake and clutch 226 associated with the tape advance motor 225, the tape is advanced as desired and stopped in response to coincidence between a selected leading edge finger 232 and the leading edge hole to permit read out of selected portions of the data containing tape.

To supply defect information to the computer respecting on line timing considerations, and yet permitting the consideration of successive trial Z lengths before the Z cut is chosen, selected portions of the paper tapes in the defect storage units are interrogated for defect information. This is achieved in the present apparatus by coordinating the operation of the computer and the defect storage means through the leading edge fingers 232 of FIG. 27. Thus as the paper tapes containing defect information of different severity level advance from the read in to the read out sections of the defect storage means, by selective energization of the fingers 232 and coincidence between the latter and the leading edge hole in the tape is stopped for read out first when the portion containing defect data for a full uncut glass sheet lies entirely within the read out means. When this occurs the computing cycle is started in the computer. Trial Z lengths on the paper tape record are considered thereby for defect data in an order determined by the demand program.

The defect information with the apparatus of FIG. 27 is supplied to the computer in the form of the S coordinates of defects appearing in the trial lengths. The electrical circuitry of the read out mechanism for mirror and glazing quality defect read out is shown in FIG. 28. The read out mechanism shown diagrammatically in FIG. 27 includes a numbered set of sixty-two conductors or S bars aligned with the direction of the paper tape movement. Defect-determined ones of the S bars are placed at a potential above ground and connected to the computer thus supplying the S coordinate of the defect location.

While the apparatus represented schematically in FIG. 41 requires preliminary manual inspection of the glass in order to have marks susceptible to detection by the photosensitive detection apparatus hereinbefore described, it will be understood that the defect storage means used to prepare a record of defect information so that the latter may be supplied as required by the computer, may be operated by other suitable glass inspection apparatus. For example, inspection apparatus providing means for directly detecting by optical or other devices the presence of internal and surface defects in the glass may be used along with means for transmitting the information directly to the defect storage means.

Moreover, since the requisite defect location information is the S locations of the defects in a given Z length, the computer is not limited to a particular form of defect storage means. Accordingly, the defects location information may be stored in any suitable manner, for example, by electrically operated means for retaining data magnetically on a magnetic material such as a tape or drum. It has been found, however, that the form of record is preferably an analogue of the defect containing glass sheet since such a record form facilitates the use of the simplest read in and read out procedures.

The exemplary quantity and time demands have been previously alluded to. Briefly, each sheet is quarter-inch thick plate glass, 124 inches wide and 180 inches long. The defects of the entire sheet, as assigned to a mosaic of 2-inch unit squares, are considered in terms of the possible size cuts that could be made before the first Z cut is chosen. The entire remaining part of the sheet is reconsidered afresh before the second Z cut is chosen, and the procedure is repeated until the sheet is completely partitioned, and the next sheet is presented. The maximum time for making each Z cut decision is limited by the conveyor speed and the minimum allowable Z cut. Thus with the conveyor subject to adjustment in speed to somewhat in excess 200 inches per minute a permissible minimum Z cut of 18 inches leaves about three seconds per decision. That is, since the glass production is essentially a continuous process, despite the cutting of the glass into 180-inch sheets for polishing, and since the computing is effectively on-line operation, an entire computing step must be completed and a command decision reached during the three seconds that the leading 18 inches of a glass sheet is sliding under the Z cutter. While the time considerations to be respected are obviously more stringent for a continuous ribbon of sheet material, the present apparatus is adapted for partitioning a continuous ribbon of quarter-inch thick plate glass. Indeed, the steps of the computing cycle are somewhat simplified where continuous ribbon is partitioned since there is no requirement that the trial Z lengths considered once the sheet has been cut, fit into the remainder of the sheet. With ribbon glass, after each command decision is made, the entire program of Z lengths is considered from the new leading edge and the best fit of programmed Z by S sizes chosen.

Following each computing cycle during which the computer considers the demand program of trial Z lengths and chooses trial Z's providing Z by S sizes that give the preferred fit, the Z cutter is operated, as shown in FIGURE 41, upon command by the computer to make the successive Z cuts. These commands are transmitted through a cable to the Z cutting apparatus. In order to make the longitudinal S cuts on which the calculations depended for choosing the Z lengths, without interfering with the flow on the conveyor, the severed Z lengths of glass are marked for the S cuts and then shunted onto side lines where suitable slit cutting apparatus, such as disclosed in the copending application of Charles O. Huffman, William F. Galey and George W. Mission, filed October 23,1958, Serial No. 769,223, entitled Glass Cutting Apparatus, may be located to make the S cuts. S marks 412 are shown on the glass pieces downstream of the Z cutting apparatus. Referring again to FIGURE 41, a preferred means is there shown for placing these marks on the glass pieces at the requisite locations. These S marks are used to control the cutting pattern of the slit cutters on each of the side lines by a suitable slit cut mark detector or by some other like means located just upstream of the S cutting apparatus. To facilitate S mark detection, the marks are made by suitable marking devices, herein shown as crayons 418, which preferably contain a fluorescent material which is activated by an ultraviolet light source and emits visible light during passage through the slit cut mark detector.

As indicated diagrammatically in FIG. 41, the S marker apparatus is carried on a fixed bridge over the conveyor 402, and is connected by a cable to the computer so that the command signals may be suitably transmitted. In the present case, the bridge carries sixty-three individually operable markers for making marks on the glass defining the locations for the S cuts. These markers include a crayon holder pivotally mounted on the bridge so that the holder may be moved from a normally latched position wherein the tip of the crayon is above the glass, to a marking position wherein the tip of the crayon is in glass contact, the movement of the glass producing the mark thereon.

In the present case a solenoid is provided for unlatching each holder, and is connected individually to the computer so that the command to make an S mark at a particular location may be received and the command carried out by unlatching and dropping the markers onto the glass.

We claim as our invention:

1. A method of converting sheet material containing variously located defect areas into programmed defect-free rectangular sizes having assigned values which comprises collecting the widths of each programmed size having a common length, fitting the programmed widths corresponding to each programmed length across the defect-free width spans of the sheet and for a length equal to the corresponding programmed length measured from the leading edge of the sheet, totaling the value of the programmed sizes fitted for each such length, choosing for the first cut of each cutting operation the programmed length for which the total value is highest, slitting the chosen length in accordance with the fitted programmed widths, and repeating the process with respect to each new leading edge defined by the location of each first cut.

2. A method of converting rectangular sheet material bearing defects into desired defect-free sizes of given length and width, which comprises, determining the available defect-free widths for each programmed length as measured from a leading edge of the sheet, fitting the width dimensions for each such length into its available widths, locating a first cut with respect to the leading edge at the length accompanied by the best width fit, slitting the cut length into the fitted width sizes, and repeating the procedure with respect to the new leading edge.

3. The process of partitioning into programmed Z by S sizes glass sheets having scattered defects therein of a pre-established severity level, including the steps of applying the coordinate Z by S location to a record, reading out defect S coordinate location information from the record for selected trial Z lengths from the leading edge of the glass sheet, determining the most valuable fit of the programmed S widths into defect-free areas in each of said selected Z lengths, choosing the trial Z length for which the value of the Z by S glass sheets fits is highest, cutting the glass sheet transversely at the Z length chosen according to said preferred fit producing a new leading edge, reading out defect S coordinates location information from the record for selected trial Z lengths from the new leading edge, determining the most valuable fit of S widths into defect-free areas in each of the selected Z lengths as measured from the new leading edge, choosing the Z length for which the value of Z by S fits is highest, and cutting the glass sheet transversely at the Z length chosen according to said latter preferred fit.

4. The process of partitioning into programmed Z by S sizes glass sheets having scattered defects therein of a pre-established severity level, including the steps of applying the coordinating Z by S defect locations to a record, reading out defect S coordinate location information from the record for selected trial Z lengths from the leading edge of the glass sheet, fitting the programmed S widths associated with each Z size into defect-free S spans in each of said selected Z lengths as measured from the same leading edge, selecting the preferred fit of programmed S widths in one of said trial Z lengths, and cutting the glass sheet transversely at the Z length chosen according to said preferred fit.

5. The process of partitioning into programmed Z by S sizes glass sheets having scattered defects therein of a pre-established severity level, including the steps of associating the programmed S sizes sharing a common Z size, determining the defect S coordinate location information with respect to one side edge of the glass for selected trial Z lengths from the leading edge of the glass sheet, tentatively fitting the programmed S widths into defect-free S-spans in each of said selected Z lengths, choosing the Z trial length for which the tentatively fitted Z by S sizes are most valuable, cutting the glass sheet transversely at the Z length chosen according to said chosen fit producing a new leading edge, and repeating said steps of determining, tentatively fitting, choosing, and cutting all with respect to each new leading edge.

6. Apparatus for converting a rectangular sheet having a leading reference edge across its width bearing defects into programmed rectangular defect free sizes including means for fitting the programmed widths corresponding to each programmed length across the defect free width spans of each such length as measured with respect to its leading reference edge, means totalling the value of the programmed sizes so fitted for each such length, and means for selecting the highest value total to determine the length to be cut.

7. A method of dividing a glass sheet having variously located defect areas into defect-free rectangular sizes corresponding to combinations of various predetermined widths and lengths comprising arranging size groups of width dimensions sharing identical length dimensions, trying possible combinations of widths in each group fitting the defect-free glass sheet width spans available for each length dimension as measured from the same leading edge of the glass, selecting the least wasteful width fit for each length dimension of the group containing the combination of widths representing the most valuable total of sizes, subtracting the selected value of glass sheet length, and repeating the process with respect to the remaining glass sheet length.

8. A method of dividing a defect-spotted glass sheet having a leading edge into defect-free rectangular sizes corresponding to combinations of various predetermined width and length dimensions comprising arranging the sizes into groups of width dimensions sharing an identical length dimension, assigning a numerical value to each size, determining possible combinations of widths in each length group not exceeding the defect-free glass sheet width spans available for the length dimension being considered as measured from the leading edge, totalling the size values for a combination of widths for each length dimension considered, selecting a length dimension of the group containing the combination of widths having the highest total size value, and subtracting the selected dimension from the glass sheet length.

9. Apparatus for dividing a defect-spotted glass sheet having a reference leading edge across its width and having a given length into defect-free rectangular sizes selected from a programmed group of predetermined width and length dimensions, which comprises, means for locating each defect bearing width strip in each glass sheet length as measured from the leading edge, means for associating the width dimensions in size groups sharing an identical length dimension, means for determining in succession on a trial basis the fit of combinations of width dimensions of a size group into the glass sheet width available for each associated length dimension, and means for selecting the length dimension accompanied by the least wasteful width fit.

10. Apparatus for computing the partitioning of a rectangular area having a leading edge across the width thereof and a side edge as reference coordinates and containing coordinate located unit defect squares into smaller programmed defect-free rectangular areas having respective length and width dimensions which are integral multiples of said unit squares comprising means for ascertaining the width coordinates of all defect squares appearing in each of said respective programmed length dimensions as measured from the leading edge, means for fitting the respective programmed width dimensions associated with each programmed length dimension into the defect-free width spans available for that length dimension, means for determining the most valuable programmed size fit for each such length, means for selecting the length for which the size value is highest, and means for subtracting the chosen length to create a new leading edge.

11. Apparatus according to claim 10 including means for dividing the subtracted length area into defect widths corresponding to the programmed size fits determined for that length.

12. A method of partitioning a defect-spotted glass sheet having a reference leading edge from which lengths are measured and a reference side edge from which widths are measured into defect-free programmed rectangular sizes having various predetermined width and length dimensions, which method comprises (1) arranging the sizes into groups of width dimensions sharing an identical length dimension, (2) tentatively determining possible combinations of widths in each group fitting defect-free width spans available in the length dimension under consideration as measured from the glass sheet leading edge, (3) selecting the length dimension of the group containing the combination of widths representing the most valuable total of sizes, (4) repeating the length selection process with respect to the remaining glass sheet length as measured from the new leading edge based on the termination of the seelcted length, and partitioning each terminated length of said sheet in accordance with the previously tentatively determined fit of said width combinations for that length.

13. A method according to claim 12, in which numerical values for respective programmed sizes are assigned and associated with the widths in each length group, and the total values of combinations of widths for different length groups are compared in selecting the length dimensions.

14. A method according to claim 12, in which a selected length dimension is rejected if that length is not a possible partition element of the length of the glass sheet.

15. Apparatus for partitioning into defect-free programmed desired rectangular sizes of respective given values a glass sheet having a leading edge from which length dimension units are measured and a side edge from which width dimension units are measured, said sheet being subject to randomly scattered defects, comprising:

means for programming in a given trial sequence the different lengths occurring in the length by width dimensions of the desired sizes, means for grouping for the same trial sequence the width dimensions of the desired sizes sharing each of the programmed lengths, means for assigning to each width dimension in each group a value signal of amplitude representing the relative value of the corresponding glass rectangular size, means for grouping defect-bearing width spans in terms of width distance from the glass side edge for each of the programmed lengths as measured from the same leading edge of the glass, means for deriving the defect-free width spans in the overall glass sheet width for each such programmed length in the trial sequence, means for determining the closest fit of combinations of programmed widths in each defect-free width span for each length dimension trial, means for summing the value signals corresponding to the widths fitted into the defect-free width spans for each programmed length to provide a total value signal for each trial, means for storing the total value signal for each programmed trial and selecting the length dimension of the trial for which the total signal is greatest, means for partitioning the selected length from the leading edge of the glass to create a new leading edge for subsequent grouping of defect width locations and partitioning determinations, and means for controlling the partitioning of each partitioned length into defect-free widths of the preferred width fit associated with that length.

16. The apparatus of claim 15 including a timed trial stepping means for actuating the means associated with each programmed length in the trial sequence.

17. The apparatus of claim 15 including means for preventing selection of trial lengths which would leave a remaining length of glass from the new leading edge to the end of the glass sheet incapable of being evenly partitioned by any combination of the programmed lengths.

18. The apparatus of claim 16 in which the means for determining the closest fit of combinations of programmed widths is an electrical width partitioning matrix having a sequential array of conductors corresponding to the units of width of the glass sheet for selective energization of conductor-to-conductor spans corresponding to defect-free widths of the glass.

19. The apparatus of claim 16 in which the means for preventing selection of trial lengths includes a length partitioning matrix having a sequential array of conductors corresponding to the unit of length of the glass sheet for selective energization of conductor-to-conductor spans corresponding to the remaining length of the glass sheet.

References Cited by the Examiner

UNITED STATES PATENTS

| | | | |
|---|---|---|---|
| 1,970,932 | 8/1934 | Drake | 49—48 X |
| 2,158,900 | 5/1939 | Goffaux | 49—48 |
| 2,309,343 | 1/1943 | Farrow | 83—371 X |
| 2,474,074 | 6/1949 | Sunstein | 235—184 X |
| 2,508,017 | 5/1950 | Echter et al. | 49—77 |
| 2,570,405 | 10/1951 | Tandler et al | 83—27 X |
| 2,575,034 | 11/1951 | Tyler et al. | |
| 2,764,847 | 10/1956 | Buell | 49—77 |
| 2,764,848 | 10/1956 | Atkeson | 49—77 |
| 2,834,156 | 5/1958 | Oberlin | 49—48 |
| 2,849,703 | 8/1958 | Bindon et al. | 340—166 |
| 2,856,597 | 10/1958 | De Motte | 340—347 |
| 2,866,506 | 12/1958 | Hierath et al. | 164—115 |
| 2,876,650 | 3/1959 | Sangster. | |
| 2,886,797 | 5/1959 | Gardberg | 340—116 |
| 2,924,380 | 2/1960 | Demer et al. | 235—61.115 |
| 2,942,778 | 6/1960 | Broido | 235—61.115 |
| 2,944,737 | 7/1960 | Cail et al. | |
| 2,948,991 | 8/1960 | Walters et al. | 225—96.5 |
| 2,959,775 | 11/1960 | Marcus | 340—347 |
| 3,020,033 | 2/1962 | McCreanor et al. | 148—9.5 |
| 3,020,034 | 2/1962 | Laycak et al. | 266—23 |
| 3,027,080 | 3/1962 | Thorsson | 340—347 |
| 3,141,589 | 7/1964 | Jochim | 225—2 |

FOREIGN PATENTS

| | | |
|---|---|---|
| 1,114,405 | 12/1955 | France. |

WILLIAM W. DYER, Jr., *Primary Examiner.*

CHARLES R. HODGES, DONALL H. SYLVESTER, HUNTER C. BOURNE, Jr., WILLIAM S. LAWSON, *Examiners.*